(12) United States Patent
Orlow

(10) Patent No.: US 12,377,354 B2
(45) Date of Patent: *Aug. 5, 2025

(54) PLATFORM FOR ENHANCED CHANCE-BASED GAMES WITH FIXED ODDS PAYOUTS

(71) Applicant: Vetnos, LLC, New York, NY (US)

(72) Inventor: Daniel K. Orlow, New York, NY (US)

(73) Assignee: Vetnos, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,466

(22) Filed: Jun. 24, 2024

(65) Prior Publication Data

US 2024/0350924 A1 Oct. 24, 2024

Related U.S. Application Data

(63) Continuation-in-part of application No. 18/635,971, filed on Apr. 15, 2024, which is a continuation of
(Continued)

(51) Int. Cl.
*A63F 13/792* (2014.01)
*A63F 13/828* (2014.01)

(52) U.S. Cl.
CPC .......... *A63F 13/792* (2014.09); *A63F 13/828* (2014.09)

(58) Field of Classification Search
CPC ...... A63F 13/828; A63F 13/35; A63F 13/792; G07F 17/3288
See application file for complete search history.

(56) References Cited

U.S. PATENT DOCUMENTS 5,935,002 A 8/1999 Falciglia
6,805,629 B1 10/2004 Weiss
(Continued)

FOREIGN PATENT DOCUMENTS

CA 2853257 A1 10/2022
WO 2009089246 A2 7/2009

OTHER PUBLICATIONS

Fielding, Roy Thomas, "Architectural Styles and the Design of Network-based Software Architectures," Dissertation, University of California, Irvine, 180 pages (2000).
(Continued)

*Primary Examiner* — Thomas H Henry
(74) *Attorney, Agent, or Firm* — Greenberg Traurig, LLP

(57) ABSTRACT

A system for presenting a chance-based game. The system includes at least one server having a processor configured to execute machine-readable code. The processor is configured to cause the server to create and provide a set of 3D chance-based games to the plurality of presentation devices of the users, which each present the set of 3D chance-based games on a respective display. Each game of the set having an assigned fixed odds payout structure based on winning user selections. The server receives, over the wide area network, data from the presentation devices characterizing a set of user-selected or computer selected winners of the 3D chance-based games. The server updates the event data pertinent to participants in the actual events associated with the 3D advanced choice games. The server uses the updated data to calculate and assign payouts to the users based on the fixed payout structure.

20 Claims, 49 Drawing Sheets

Related U.S. Application Data application No. 17/968,702, filed on Oct. 18, 2022, now Pat. No. 11,957,985, which is a continuation-in-part of application No. 17/112,054, filed on Dec. 4, 2020, now Pat. No. 11,471,776, which is a continuation-in-part of application No. 16/997,206, filed on Aug. 19, 2020, now Pat. No. 11,465,057.

(60) Provisional application No. 63/056,907, filed on Jul. 27, 2020.

(56) References Cited

U.S. PATENT DOCUMENTS

| | | |
|---|---|---|
| 7,563,162 B2 | 7/2009 | Lawson |
| 8,099,113 B2 | 1/2012 | Morrison |
| 8,126,479 B2 | 2/2012 | Morrison |
| 8,126,480 B2 | 2/2012 | Morrison |
| 9,098,883 B2 | 8/2015 | Asher |
| 9,424,717 B2 | 8/2016 | Alexander |
| 9,466,178 B2 | 10/2016 | Saffari |
| 9,721,434 B2 | 8/2017 | Coleman |
| 9,824,543 B2 | 11/2017 | Alexander |
| 10,013,851 B2 | 7/2018 | Inamura |
| 10,140,803 B2 | 11/2018 | Carson |
| 10,353,543 B2 | 7/2019 | Morrison |
| 10,607,488 B2 | 3/2020 | Jang |
| 11,207,588 B1 | 12/2021 | Orlow |
| 11,433,295 B1 | 9/2022 | Orlow |
| 11,482,079 B2 | 10/2022 | Berman |
| 2002/0065566 A1 | 5/2002 | Aronson |
| 2002/0147040 A1 | 10/2002 | Walker |
| 2002/0153656 A1 | 10/2002 | Maksymec |
| 2003/0067116 A1 | 4/2003 | Colton |
| 2003/0114211 A1 | 6/2003 | White |
| 2004/0229671 A1 | 11/2004 | Stronach |
| 2006/0038342 A1 | 2/2006 | Lomedico |
| 2007/0026934 A1 | 2/2007 | Herbrich |
| 2007/0054718 A1 | 3/2007 | Del Prado |
| 2007/0112706 A1 | 5/2007 | Herbrich |
| 2007/0249420 A1 | 10/2007 | Randall |
| 2008/0113781 A1 | 5/2008 | Soltys |
| 2008/0228511 A1 | 9/2008 | Barden |
| 2009/0026706 A1 | 1/2009 | St Clair |
| 2009/0054127 A1 | 2/2009 | Sweary |
| 2009/0209233 A1 | 8/2009 | Morrison |
| 2009/0233575 A1 | 9/2009 | Morrison |
| 2009/0233633 A1 | 9/2009 | Morrison |
| 2011/0207524 A1 | 8/2011 | Simon |
| 2011/0306427 A1 | 12/2011 | Pawson |
| 2012/0086583 A1 | 4/2012 | Morrison |
| 2012/0196625 A1 | 8/2012 | Morrison |
| 2012/0283858 A1 | 11/2012 | Lapadula |
| 2012/0289340 A1 | 11/2012 | Pawson |
| 2013/0337921 A1 | 12/2013 | Butz, Jr. |
| 2014/0113713 A1 | 4/2014 | Fontaine |
| 2014/0357351 A1 | 12/2014 | McDowell |
| 2015/0018082 A1 | 1/2015 | Kim |
| 2015/0050988 A1 | 2/2015 | Nichols |
| 2015/0352449 A1 | 12/2015 | Nangia |
| 2015/0360133 A1 | 12/2015 | MacCallum |
| 2017/0136364 A1* | 5/2017 | Hwang ............ G07F 17/3244 |
| 2019/0221080 A1 | 7/2019 | Reetz |
| 2019/0346978 A1 | 11/2019 | Morrison |
| 2020/0067998 A1 | 2/2020 | Pilnock |
| 2021/0065517 A1 | 3/2021 | Dillon |
| 2021/0248706 A1* | 8/2021 | Huke .................. G06Q 50/34 |
| 2022/0092911 A1 | 3/2022 | Katz |
| 2022/0148388 A1 | 5/2022 | Katz |

OTHER PUBLICATIONS

International Search Report and Written Opinion of the International Searching Authority; PCT/US2015/048970, 12 pages, dated Dec. 8, 2015.

\* cited by examiner

VARIABLE PAYOUT EXAMPLE

CARD TITLE $25 ⊕

SELECT 4 OR MORE MATCHUPS TO PAY — MATCHUP PICKS
1 Player Name  Player Name
2 Player Name  Player Name
3 Player Name  Player Name
4 Player Name  Player Name — 408

SELECT PURCHASE AMOUNT
$2  $5  $10  $15  $20
OTHER AMOUNT $5 — 410

CURRENT PAYOUT INCREASES DAILY

| MATCH | PAYS | CURRENT PAYOUT |
|---|---|---|
| 4 PICKS | 10 FOR 1 | $50 |
| 5 PICKS | 18 FOR 1 | $90 |
| 6 PICKS | 30 FOR 1 | $175 |

CANCEL   BUY — 412

SQORR POINTS
PLAYER STATS
FPTS PLAYER NAME VS TEAM IN # TIME — 402

SQORR POINTS
PLAYER STATS
FPTS PLAYER NAME VS TEAM IN # TIME — 404

SQORR POINTS
PLAYER STATS
FPTS PLAYER NAME VS TEAM IN # TIME — 406

FPTS PLAYER NAME VS TEAM IN # TIME
FPTS PLAYER NAME VS TEAM IN # TIME
FPTS PLAYER NAME VS TEAM IN # TIME

In Order of Predicted Success, Sequentially Assign Selections from Rows 1, 2 and 3 Below into Expected First, Second and Third Place Performance Relative to their Predicted Performance Against Other Two Choices in Row 1, 2 or 3.

Customer Selects which Player or Team will have Best Risk Adjusted Prediction of Performance Based on Fantasy or Performance Scoring, or of Total Points Scored for Team Sqorr Example:
1. 1A to Have Higher Sqorr than 1B and 1C
2. 2C Higher than 2A, 2B
3. 3B Higher than 3A, 3B
4. Ranks Selections in Order of Which has Highest Marginal Sqorr, i.e. Which will Beat Their Own Projected Score by Most, in Order of Highest(1), Next (2), Lowest (3)

Prize Payouts

Fixed:
Win on All Three Matchups and Rank Them All Correctly Returns 25-1

Fixed Progressive:

Win on All Three Matchups and Rank Them All Correctly Returns 15-1

Win on All Three Matchups but Only Rank One of Three Correctly Returns 3-1

Win on All Three Matchups but Rank None Correctly is a Free Play

|  | 1 | 2 | 3 |
|---|---|---|---|

| Column 1 | Column 2 | Column 3 |
|---|---|---|
| 1A | 1B | 1C |
| 2A | 2B | 2C |
| 3A | 3B | 3C |

Row 1, Row 2, Row 3

| 2019 Academy Awards | Select 4 or more Packs to Play | | $25 |
|---|---|---|---|

Best Picture — 930

| Cll Me by Your Name xxxx xxxxx xxx xxxxx xxxx xxx xxx xxxx | Xxxxxx xxx xxx xxx xxx xxxx xx xxx xxxx xxx xxxx xxx xxx xxxx | Xxxxxx xxxxx xxxx xxx xxxxx x xxx |
|---|---|---|
| Get Out xxx xxxxx xxxx xxx xxxxx xx xxxxx xx xxx xxxxx xxxx | Lady Bird xxx xxx xxx xx xxxxx | Xxxxxxx xxxxx xxxx xxxx xxx xxxx xxx |
| xxx xxxx xxx xxxx xxxx xxxx xxxx xxxx xxxx xxxxxx xxxxxx | xxx xxxx xxx xxx xxxxx xx Xxxx x xxx xxx | Xxx xxx xxx xxxxx xxxx xxx xxxxx |

Best Direction — 940

| Xxxxxx xxx xxxx xxx xxxx x xxx | Xxxxxxx xxxx xxxxx | Xxxxxx xxxxx xxxx |
|---|---|---|
| Xxxx xxxx xxxx xxx | Xxxx xxxxx xxxxxx xxxx xxxx | |

My Picks

| #1 Best Picture | Lady Bird |
|---|---|
| #2 Best Director | xxxxxxxx xxxxx |
| #3 Best Actor | xxxxx xxxxxx |
| #4 Best Original Score | xxxxxxxx xxxxx | — 960

Select Purchase Amount

| $2 | $5 | $10 | $15 | $20 | $50 |

OtherAmount $5

| MATCH | PAYS | WINS |
|---|---|---|
| 4 PICKS | 10 FOR 1 | $50 |
| 5 PICKS | 18 FOR 1 | $90 |
| 6 PICKS | 30 FOR 1 | $175 |

| CANCEL | BUY |

| Elections Games | Matchup Game | | | |
|---|---|---|---|---|
| Race | Selection (or Mixed with Over Under) | | | |
| 1. President Electoral | Republican "X" % | ☐ | Democrat 1- "X" % | ☐ |
| 2. President Popular | Republican "X" % | ☐ | Democrat 1- "X" % | ☐ |
| 3. Senate | Republican "X" % | ☐ | Democrat 1- "X" % | ☐ |
| 4. House | Republican "X" % | ☐ | Democrat 1- "X" % | ☐ |
| 5. Governors | Republican "X" % | ☐ | Democrat 1- "X" % | ☐ |
| 6. State Houses | Republican "X" % | ☐ | Democrat 1- "X" % | ☐ |
| 7. State Senates | Republican "X" % | ☐ | Democrat 1- "X" % | ☐ |
| 8. SPX | Vs Other Asset Y or Index "X" % | ☐ | 1- "X" % | ☐ |
| 9. Unemployment | Vs Other Economic Indicator Y or "X" % | ☐ | 1- "X" % | ☐ |
| 10. N. Other | Vs Other Correlated "X" % | ☐ | 1- "X" % | ☐ |

*FIG. 10A*

| Elections Games | Over Under Game | |
|---|---|---|
| Race | Selection as Over Under(or Mized with Matchup) | |
| 1. President Electoral | Over Under R or D at Poll "X" | ☐ |
| 2. President Popular | Over Under R or D at Poll "X" | ☐ |
| 3. Senate | Over Under R or D at Poll "X" | ☐ |
| 4. House | Over Under R or D at Poll "X" | ☐ |
| 5. Governors | Over Under R or D at Poll "X" | ☐ |
| 6. State Houses | Over Under R or D at Poll "X" | ☐ |
| 7. State Senates | Over Under R or D at Poll "X" | ☐ |
| 8. SPX | Over Under at Time "Y" | ☐ |
| 9. Unemployment | Over Under at Time "Y" | ☐ |
| 10. N. Other | Over Under at Time "Y" | ☐ |

*FIG. 10B*

| Buyer | Seller | |
|---|---|---|
| | 0 | 1 |
| 1 | 0,1 | 1,1 (Ask) |
| 0 | 0,0 (Bid) | 1,0 |

*FIG. 15A*

| Buyer | Seller | | |
|---|---|---|---|
| | 0 | .5 | 1 |
| 1 | 1,0 | 1, .5 | 1,1 |
| .5 | .5, 0 | .5, .5 | -5, 1 |
| 0 | 0,0 | 0, .5 | 0, 1 |

| VETNOS | | | | | | xxxxx xxxx |
|---|---|---|---|---|---|---|
| ⬦ Dashboard | Matchups | | | | | |
| ⬦ Cards | Current 28542 Active Matchups | Weakly 192 Points Matchups | Weakly 20 Totals Matchups | Daily 0 New Matchups | Weakly 212 New Matchups | Monthly 745 New Matchups |
| ☐ Accounts | | | | | | |
| ⬦ Transactions | All Matchups | | | | | ▽ |
| ▦ Rosters | | Player A | | Player B | | Actions |
| ▤ Reports | | Tyrell Hatton | | Abraham Abraham | | ⊙ Xxxxxx |
| ⊛ Sports Details | | Xxxx Xxxx | | Dustin Dustin | | ⊙ Xxxxxx |
| ⊛ Games | | Matt Kuchar | | Daniel Daniel | | ⊙ Xxxxxx |
| ⟳ Matchups ⌄ | | Alex Noren | | Matt Matt | | ⊙ Xxxxxx |
| ⚲ Players | | Xxxxx Xxxxx | | Jon Jon | | ⊙ Xxxxxx |
| ⚲ Users | | Jhonatton Vegas | | Dec Dec | | ⊙ Xxxxxx |
| ⏱ Promos | | Xxxx Xxxx | | Adam Adam | | ⊙ Xxxxxx |
| ▦ Videos | | Xxx Xxxxxxx | | Brian Brian | | ⊙ Xxxxxx |
| ▦ Support | | Xxxx Xxxxxx | | Xx Xx | | ⊙ Xxxxxx |
| ▭ Pages | | Chessan Hayey | | Andrew Andrew | | ⊙ Xxxxxx |
| ⌸ Event Logs | | Lucas Giever | | Maverick Maverick | | ⊙ Xxxxxx |
| ◊ Notifications | | Charl Schwedtd | | Mark Mark | | ⊙ Xxxxxx |
| Copyrights 2022 Videos | | | | | | |
| All Rights Reserved | | | | | | |

*FIG. 17C*

| SPORTS | LEAGUE | TEAMS | PLAYERS | | | | GAMES |
|---|---|---|---|---|---|---|---|
| Search by PlayerName... 🔍 | | | | | | | ▽ |

| Player | Team | League | Active | Injured | Suspended | Cancelled |
|---|---|---|---|---|---|---|
| Pablo Gozalbez (forward) #42 | CF Valencia (VCF) | LA-LIGA | ✓ | X | X | X |
| Jose Haulde (midfielder) #35 | CA Osmania (OSA) | LA-LIGA | ✓ | X | X | X |
| Jarrad Branthwite (midfielder) #32 | Everton FC (EVE) | EPL | ✓ | X | X | X |
| Kike Perez (midfielder) #32 | Real Valladolid (VLL) | LA-LIGA | ✓ | X | X | X |
| Collin Johnson (WR) #0 | Jacksonville Jaguars (JAC) | NFL | ✓ | X | X | X |
| Pablo Perez (defender) #40 | FC Sevilla (SEV) | LA-LIGA | ✓ | X | X | X |
| Jesus Ruiz Suarez (goalkeeper) #27 | RCD Mallorca (MAL) | LA-LIGA | ✓ | X | X | X |
| Kike Saverio (forward) #38 | FC Barcelona (FCB) | LA-LIGA | ✓ | X | X | X |
| Nathan Tella (midfielder) #52 | Southampton FC (SOT) | EPL | ✓ | X | X | X |
| Julian Blackmen (DB) #0 | Indianapolis Colts [IND] | NFL | ✓ | X | X | X |
| Michael Pittman (WR) #0 | Indianapolis Colts [IND] | NFL | ✓ | X | X | X |
| Ivan Amores (midfielder) #0 | CD Leganes [LEG] | LA-LIGA | ✓ | X | X | X |
| Romero Luka (midfielder) #41 | RCD Mallorca [LEG] | LA-LIGA | ✓ | X | X | X |
| James Davison 0 #77 | Spire Motorsports (SM) | NASCAR | ✓ | X | X | X |
| Zack Moss (RB) #0 | Buffalo Bills (BUF) | NFL | ✓ | X | X | X |
| David Ramos (midfielder) #38 | Real Betis Balomple (RBB) | LA-LIGA | ✓ | X | X | X |
| Angel Banea (forward) #29 | Real Betis Balomple (RBB) | LA-LIGA | ✓ | X | X | X |
| Javier Hernandez 0 #39 | Real Madrid (RMA) | LA-LIGA | ✓ | X | X | X |
| Jacobo (forward) #29 | RC Celta de Vigo (RCC) | LA-LIGA | ✓ | X | X | X |
| Roberto Lopez Alcaide (midfielder) #28 | Real Sociedad (RSO) | LA-LIGA | ✓ | X | X | X |
| Jon Pachoco Dozagarat (defender) #26 | Real Sociedad (RSO) | LA-LIGA | ✓ | X | X | X |

*FIG. 17D*

Sports Details

| | SPORTS | LEGUE | TEAMS | PLAYERS | GAMES |
|---|---|---|---|---|---|

Search by Title...

| TITLE | SETTLEMENT | ACTIVE | FINISHED | CANCELLED | POSTPONED | SUSPENDED | GAME DATE |
|---|---|---|---|---|---|---|---|
| Granada CF at CD Leganes | NOT FINISHED | X | X | X | X | X | 6/22/2020 1:00 PM |
| Burnley FC at Manchester City | NOT FINISHED | X | X | X | X | X | 6/22/2020 12:00 PM |
| FC Sevilla at CF Villarreal | NOT FINISHED | X | X | X | X | X | 6/22/2020 10:30 PM |
| Real Madrid at Real Sociedad | NOT FINISHED | X | X | X | X | X | 6/21/2020 1:00 PM |
| Genco 500 | NOT FINISHED | X | X | X | X | X | 6/21/2020 12:00 PM |
| Chicagoland 400 | NOT FINISHED | X | X | X | X | X | 6/21/2020 11:30 AM |
| Liverpool FC at Everton FC | NOT FINISHED | X | X | X | X | X | 6/21/2020 11:00 AM |
| CA Osasuna at CF Valencia | READY | X | X | X | X | X | 6/21/2020 10:30 AM |
| Chelsea FC at Aston Villa | READY | X | ✓ | X | X | X | 6/21/2020 8:15 AM |
| RBC Heritage Round 4 | NOT FINISHED | X | ✓ | X | X | X | 6/21/2020 6:00 AM |
| Sheffield United at Newcastle United | READY | X | ✓ | X | X | X | 6/21/2020 6:00 AM |
| U.S. Open Round 4 | NOT FINISHED | X | X | X | X | X | 6/21/2020 5:00 AM |
| Deportivo Alaves Sad at RC Celta de Vigo | READY | X | ✓ | X | X | X | 6/20/2020 1:00 PM |
| Real Valladolid at Atletce Madrid | READY | ✓ | ✓ | X | X | X | 6/20/2020 11:45 AM |
| Crystal Palace at AFC Bournmouth | READY | X | ✓ | X | X | X | 6/20/2020 10:30 AM |
| SD Eibar at CF Getafe | READY | ✓ | ✓ | X | X | X | 6/20/2020 9:30 AM |
| Wolverhampton Wanderers at West Ham United | READY | X | X | X | X | X | 6/20/2020 9:30 AM |
| Real Betis Balompie at Athletic Bilbao | READY | ✓ | X | X | X | | 6/20/2020 8:00 AM |
| Arumal FC at Brighton & Hove Albian | READY | X | X | X | X | X | 6/20/2020 7:00 AM |
| Germany Borussia Mochengladhach at Germany SC Paderborn 07 | NOT FINISHED | X | X | X | X | X | 6/20/2020 6:30 AM |
| Germany Eintracht Frankfurt at Germany 1. FC Cologne | NOT FINISHED | X | X | X | X | X | 6/20/2020 6:30 AM |
| Germany VfL Wolfsburg at Germany FC Schalive D4 | NOT FINISHED | X | X | X | X | X | 6/20/2020 6:30 AM |

Navigation:
- Dashboard
- Cards
- Accounts
- Transactions
- Rosters
- Reports
- Sports Details »
- Games
- Matchups
- Players
- Users
- Promos
- Videos
- Support
- Pages
- Event Logs

*FIG. 17E*

| Customer | Liquidity Model | Principal | Operator | % Price or Quantity | Game Model |
|---|---|---|---|---|---|
| Buyer, Seller * | + [Plus] Centralized | Seller, Buyer | "_" [Minus] "x" [Times] | % Variable % Fixed | Rake, Pari Mutuel |
| Buyer, Seller | Centralized | N/A | "_" [Minus] "x" [Times] | % Variable % Fixed | Comission |
| Buyer, Seller Auction | + [Plus], / [Divide] Centralized | Seller, Buyer Auction | "_" [Minus] "x" [Times] | % Variable % Fixed | Spread, Rebate |
| Predictive | Dispersion | Model | "_" [Minus] "x" [Times] | % Variable % Fixed | Vetnos |

*Same as Loser Pays Winner

*FIG. 21*

Method 2300

- 2310 Receive selected winning components
- 2320 Determine that selected component is winning
- 2330 Determine fixed odds prize based on asymmetrically weighted outcomes
- 2340 Automatically trigger settlement if winning

*FIG. 23*

2400 — Asymmetrically Weighted Outcomes (2404)

| 2401 | 2402 | 2403 |
|---|---|---|
| Matchup 1 | Component A (51%) | Component B (49%) |
| Matchup 2 | Component A (52%) | Component B (48%) |
| Matchup 3 | Component A (58%) | Component B (42%) |

*FIG. 24*

2500 — Asymmetrically Weighted Outcomes (2504)

| 2501 | 2502 | 2503 |
|---|---|---|
| Matchup 1 | Component A (49%) | Component B (43%) |
| Matchup 2 | Component A (46%) | Component B (49%) |
| Matchup 3 | Component A (45%) | Component B (45%) |

Asymmetric Prizes

| Matchup 1: | Component A | Fixed Odds Prize A |
|---|---|---|
| | Component B | Fixed Odds Prize B |

Asymmetric Prizes

| Matchup 1: | Component A (49%) | Fixed Odds Prize ($100) |
|---|---|---|
| | Component B (46%) | Fixed Odds Prize ($120) |

*FIG. 26B*

PLATFORM FOR ENHANCED CHANCE-BASED GAMES WITH FIXED ODDS PAYOUTS

RELATED APPLICATIONS

The present application is a continuation-in-part of U.S. patent application Ser. No. 18/635,971, filed on Apr. 15, 2024, which is a continuation of U.S. patent application Ser. No. 17/968,702, filed on Oct. 18, 2022, which is a continuation-in-part of U.S. patent application Ser. No. 17/112,054, filed on Dec. 4, 2020, which is a continuation-in-part of U.S. patent application Ser. No. 16/997,206, filed on Aug. 19, 2020, which claims the benefit of U.S. Provisional Application Ser. No. 63/056,907, filed on Jul. 27, 2020. The present application is also related to U.S. patent Ser. No. 14/847,795, filed on Sep. 8, 2015, which is published as U.S. Patent Application Publication No. 2016/0071355 and now issued at U.S. Pat. No. 10,353,543. Each of these applications is incorporated herein, in its entirety, by reference.

TECHNICAL FIELD

The present invention relates to methods of presenting and playing chance-based gaming activities.

BACKGROUND ART

Sports wagering is a very popular activity because it increases fan interest and excitement in sports events. With a wager at stake, a fan's interest in the outcome of a sports event is heightened. Also, sports wagering increases a fan's interest in a sport as the fan tracks teams and players in an attempt to place wagers that they believe will be winning. Sports wagering both land-based and internet-based have been established to offers such services and depend on jurisdictional laws.

Sports wagering, however, is not legal in many locations. As a result, other types of activities have been created to increase fan interest and excitement associated with sporting events. As one example, fantasy sports have been created. These activities correlate the performance of players or sets of players involved in actual sports events to a non-wagering entertainment activity.

Skill-based games that allow a player to participate with real money purchases with resulting prizes based on the fan's skill have become popular. Such games allow a fan to engage in a skill where they compete and play against other users. Examples of such skill-based games include games such as Diamond Strike, poker, and fantasy sports leagues (e.g. baseball, football etc.).

In one implementation of a fantasy football league, a fan forms a fantasy football team comprised of a collection of individual players from a set of different football teams. For example, a fan may pick a quarterback from one football team, a running back from another football team, and so on, in order to create an imaginary or "fantasy" team comprising a collection of players who do not actually form a real team.

Generally, fans pit their fantasy teams against the fantasy teams of other fans usually over the course of professional football season. Commonly, fans pay an entry fee to participate in the fantasy activity and winnings are paid from a pool formed from the entry fees. The winner(s) of the fantasy activity may be determined in a number of fashions. In one common configuration, scores are assigned to each player based upon their performance in an actual game. A fan's fantasy team score then comprises the aggregate of the scores of each of the players on their team. The winner(s) of a particular fantasy activity are the fan(s) whose team(s) achieves the highest score. Winners may be paid at the end of each week of play or at the end of the season.

While fantasy sports activities are popular, there are several reasons why the popularity of such activities is limited. The primary drawback to participating in such fantasy sports activities is the time, effort and understanding of creating teams or selecting players involved in forming and managing a fantasy team. For example, a group of fans may form a fantasy sports pool. Initially, the fans draft or pick players to form their teams. The fans may pick players one at a time in order, in similar fashion to current actual player drafts. In some cases, fans of the same pool are not permitted to select the same players. Thus, each fan must carefully form a fantasy team by evaluating the best players still available when considering the prior picks of other fans. The process of picking the teams may take hours or days and involve spending large amounts of time evaluating available players to be picked. For example, a fan may spend a significant amount of time analyzing statistics, predicted performances, and many other factors for each potential player the fan may wish to draft. The fan may also take into account past performance of each player, the current health status of each player, and so on, to make draft selections.

When the fantasy activity spans multiple games, such as an entire season, a fan may adjust their fantasy player roster to address issues such as injury to the actual players, team matchups and other factors that may affect a player's performance. There are different variations of these types of fantasy team-type activities, each having their own rules. However, in general, participation in these activities is time consuming, often deterring fans from participating in the activities.

Other drawbacks may keep fans from participating in these activities. For example, with traditional fantasy sports activities, a fan must be ready to participate before a season of a particular sport begins, or else the fan risks being left out and must wait until the next season. Further, it may be difficult for a fan to join multiple leagues or to buy multiple entries from the same provider. Traditional fantasy sports may be difficult for a fan to play casually or a quickly as a fan may desire. Finally, from the perspective of an operator, it may be difficult to attract casual sports fans with traditional fantasy sports.

It is thus desirable to develop a new fantasy type activity that overcomes the limitations of existing activities as previously described.

SUMMARY OF THE EMBODIMENTS

In accordance with one embodiment of the invention, a system presents a chance-based game. The system includes a non-transitory storage medium storing machine-readable code. The system also includes an activity server system that includes a processor configured to execute the machine-readable code and to communicate over a wide area network with a plurality of presentation computing devices. Each distinct one of the presentation devices associated with a distinct one of a plurality of users, and to receive information from the plurality of presentation devices. The system further includes a device storage system coupled to the activity server system, storing (i) information concerning the plurality of users, each user identifiable by a user account, and (ii) event data pertinent to a set of events and participants in the set of events. The machine-readable code, when executed by the activity server system, causes performance of computer processes that include, separately responsive to communications initiated from each of the presentation devices, serving, over the wide area network, to the presentation devices, a set of 3D advanced choice games. Each game of the set being a skill-based game having an assigned fixed odds payout based on winning user selections, so that the activity server system offers separately through each of the presentation devices an opportunity to select to play at least one of the 3D advanced choice games. The computer process also include receiving, separately, over the wide area network, from the presentation devices of each user who has selected at least one of the 3D advanced choice games to play, user roster data characterizing, with respect to the selected 3D advanced choice games, a set of user-selected winners. The computer process further include updating the event data pertinent to participants in the actual events. The computer processes also include using the updated data to calculate and assign payouts to the users based on both the set of user-selected winners and the fixed odds payout, wherein determination of whether a given user is a winner or loser is based solely upon the given user's selections and not on those of other users.

Optionally, the computer processes further include, with respect to each presentation device of each user who has selected a 3D advanced choice game to play, such game associated with a representation of a 3D object, causing a graphical display of a first set of active surfaces of the 3D object in such representation, each active surface configured with a set of entries for the game, so that the user can make selections and view play of the game. Alternatively or additionally, the 3D object comprises a 3D shape selected from the group consisting of a cube and a pyramid. Alternatively or additionally, the computer processes further include causing a graphical display, of a second set of active surfaces of the 3D object, in response to a graphical input from the user. Alternatively or additionally, the computer processes further include causing, responsive to a graphical input graphical rotation of the 3D object, about a set of axes, in the representation thereof so as to display the second set of the active surfaces. Alternatively or additionally, the computer processes further include receiving graphical selection of at least one entry on an active surface being displayed for play in the game.

Optionally, the computer processes further include causing a user to configure the set of entries by selecting a set of game components from the group consisting of an over-under, a matchup, a parlay matchup, and combinations thereof. Alternatively or additionally, the computer processes further include causing the user to configure a user-selected winner for each of the selected game components. Alternatively or additionally, the computer processes further include causing the user to select a ranking for each of the selected set of game components. Alternatively or additionally, the computer processes further include presenting information about a set of participants associated with the selected set of game components, including presenting expected fantasy points for a given participant for an upcoming event in which the given participant is expected to participate. Alternatively or additionally, the computer processes further include the selected 3D advanced choice games are associated with a plurality of events in which the participants are expected to participate. Alternatively or additionally, the computer processes further include each of the participants is selected from the group consisting of a sport, a team, an athlete and combinations thereof. Alternatively or additionally, the computer processes further include each of the participants is associated with a distinct performance scoring method.

Optionally, the computer processes further include a risk tool process that reduces payout risk. The risk tool process includes determining a total possible payout based upon the user-selected winners for the set of 3D advanced choice games. The risk tool process also includes comparing the total possible payout with a predetermined threshold. The risk tool process further includes, if the total possible payout exceeds the threshold, removing game components, associated with the user-selected winners, from the set of 3D advanced choice games. Alternatively or additionally, the risk tool process determines payout risk as a single expression of expected probability of win for a given one of the set of 3D advanced choice games. Alternatively or additionally, the risk tool process determines the payout risk by calculating a relationship between payout, game components, and game types based on levels of activity by the users.

Optionally, the fixed odds payout is selected from the group consisting of a simple fixed odds payout, a fixed odds progressive payout, a dynamic fixed odds payout, and a dynamic fixed odds progressive payout. Optionally, the computer processes further include dynamically pricing the dynamic fixed odds payout and the dynamical fixed odds progressive payout using a technique selected from the group consisting of artificial intelligence (AI), machine learning, other algorithmic data analysis of reward, risk, volume, and total risk, and combinations thereof. Optionally, the fixed odds payout is in a form selected from the group consisting of cash, free play token, promotional token, loyalty token, and combinations thereof.

Optionally, the computer processes include causing the presentation devices to present the set of 3D advanced choice games in a display selected from the group consisting of a 2D display, a 3D display, and combinations thereof. Alternatively or additionally, the 3D display is of a type selected from the group consisting of augmented reality and virtual reality. Optionally, the computer processes further include presenting the advanced choice game for play in a bingo format.

BRIEF DESCRIPTION OF THE DRAWINGS

The foregoing features of embodiments will be more readily understood by reference to the following detailed description, taken with reference to the accompanying drawings, in which:

FIG. 4C shows an exemplary user interface screen, displayed on a presentation device of a user, showing the user's selected matchups based on the matchup screen layout in FIG. 4A;

FIG. 7C shows that a tic-tac-toe screen layout of FIG. 7A configured with a set of matchups, over-unders, or a mix of matchups and over-unders, in accordance with an embodiment of the present invention;

FIG. 8 shows a ranking array screen layout for presenting matchups and over-unders selectable by a user, in accordance with an embodiment of the present invention;

FIG. 9C shows an exemplary user interface screen, displayed on a presentation device of a user, based on the layout of FIG. 9A, showing the categories of participants for selection by the user;

FIG. 9D shows an exemplary user interface screen, displayed on a presentation device of a user, based on the layout of FIG. 9B, showing a participant selected by the user in each presented category;

FIG. 10A shows an exemplary user interface screen, displayed on a presentation device of a user, presenting a set of matchups with participant selections related to an election, according to an embodiment of the present invention;

FIG. 10B shows an exemplary user interface screen, displayed on a presentation device of a user, presenting a set of over-under with selections related to an election, according to an embodiment of the present invention;

FIGS. 15A-15C are block diagrams showing the determination of risk used to assign fixed odds payout to matchups and over-unders, in accordance with an embodiment of the present invention;

FIGS. 17A-17F are exemplary user interface screens used by an operator to configure sets of matchups and over-unders for presentation to users, in accordance with an embodiment of the present invention;

FIG. 21 is a chart showing sports gaming revenue models used in the prior art in comparison with a sports gaming revenue model used in an embodiment of the present invention.

FIG. 23 shows a flow diagram of an exemplary method for providing a skill-based game having asymmetrically weighted outcomes.

FIG. 24 shows a plurality of different asymmetrically weighted outcomes that may occur in a skill-based game.

FIG. 25 shows an alternative plurality of different asymmetrically weighted outcomes that may occur in a skill-based game.

FIGS. 26A and 26B show a plurality of different asymmetrically weighted prizes that may be paid out in a skill-based game.

DETAILED DESCRIPTION OF SPECIFIC EMBODIMENTS

Figure 1:
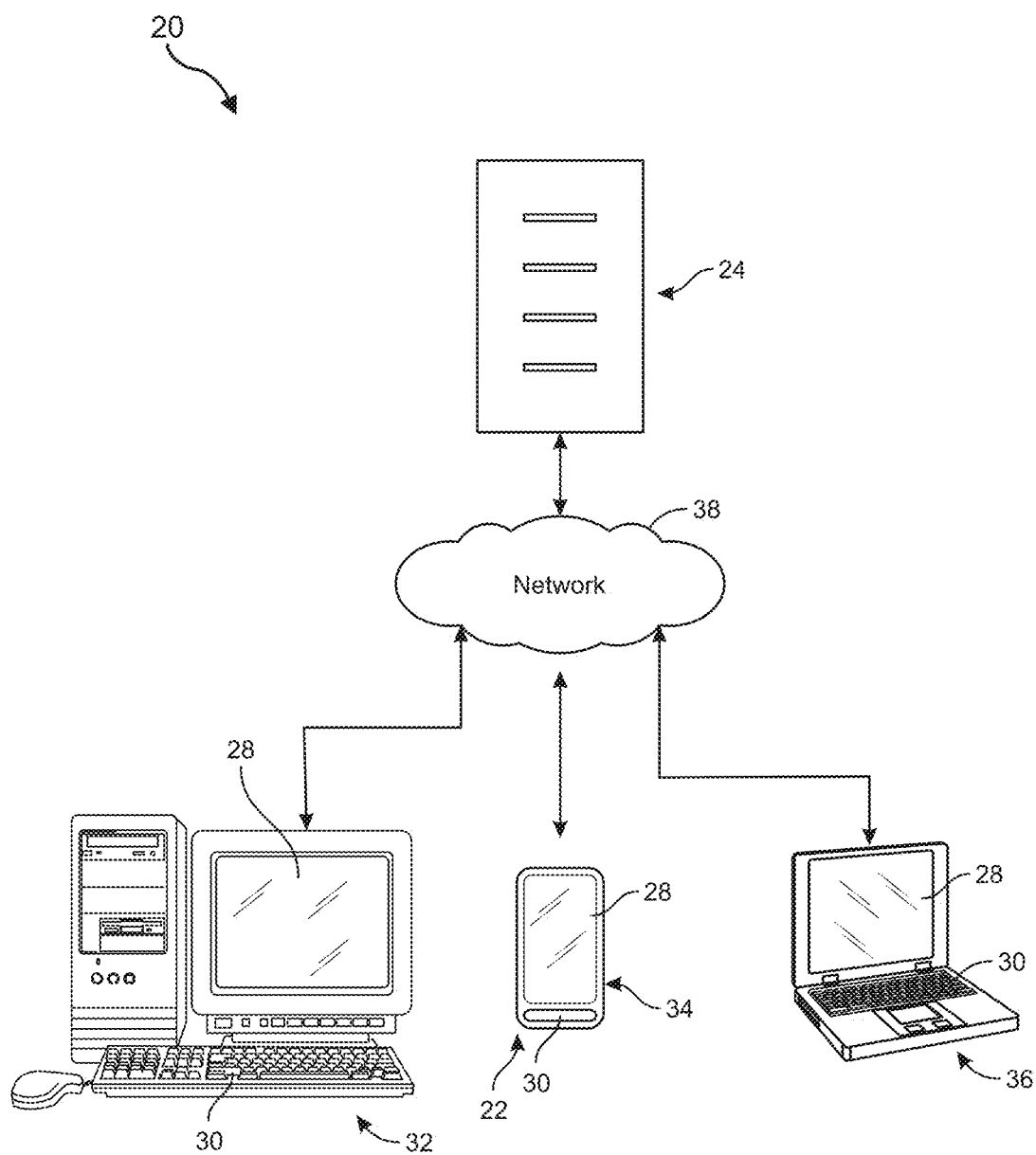
FIG. 1 is a block diagram of a computing environment for implementing embodiments of the present invention.

Definitions. As used in this description and the accompanying claims, the following terms shall have the meanings indicated, unless the context otherwise requires:

A "set" includes at least one member.

A "skill-based game" shall mean a game that allows a user to use a skill such as the selection of participants based upon statistics and personal knowledge prior to occurrence of a set of events, such as sporting events, wherein, for the skill-based game, a determination will be made based upon a set of preexisting scoring rules for scoring the one or more of the participants based upon actual performance in the set of events. As used herein, a "skill-based game" shall be understood to operate in a manner as to be exempt from regulation under provisions of the Unlawful Internet Gambling Enforcement Act of 2006 (UIGEA), 31 U.S.C. §§ 5361-5366, as a "fantasy or simulation sports game or educational game or contest in which (if the game or contest involves a team or teams) no fantasy or simulation sports team is based on the current membership of an actual team that is a member of an amateur or professional sports organization (as those terms are defined in section 3701 of title 28)" and that additionally meet the enumerated criteria of 31 U.S.C. § 5362(1)(E)(ix). Specifically, (I) All rewards offered to winning participants are established and made known to the participants in advance of the game or contest and their value is not determined by the number of participants or the amount of any fees paid by those participants. (II) All winning outcomes reflect the relative knowledge and skill of the participants and are determined predominantly by accumulated statistical results of the performance of individuals (athletes in the case of sports events) in multiple real-world sporting or other events. (III) No winning outcome is based—(aa) on the score, point-spread, or any performance or performances of any single real-world team or any combination of such teams; or (bb) solely on any single performance of an individual athlete in any single real-world sporting or other event.

A "user" means an individual playing the skill-based game.

A "participant" refers to an item, for example, a "player," such as an "athlete" or a "team" within an event (e.g. sporting event such as professional football or other event etc.), on which a skill-based game is based.

An "advanced choice game" is a game selected from the group consisting of an over-under, a matchup, a parlay matchup, an array choice, an array choice-plus-ranking, a category choice, and other types of element choice games, each game being assigned a fixed odds payout based on winning user selections within the game.

A "three-dimensional (3D) advanced choice game" is a type of advanced choice game wherein a set of elements with respect to which the user makes choices are represented as positioned on a 3D object. Each element is selected from the group consisting of a matchup, a parlay matchup, and an over-under, and, the user chooses a predicted outcome associated with such element. The user is credited with a win when the actual outcome matches the predicted outcome for each element of a specified pattern of the set of elements. The game is assigned a fixed odds payout based on the winning user choices within the game. A three-dimensional (3D) advanced choice game is similar to the other advanced choice games described herein, subject to the exception that the 3D advanced choice game is played over a plurality of surfaces represented in display of the 3D object. Because a three-dimensional (3D) advanced choice game is played over a plurality of surfaces of the 3D object, it is a feature of this embodiment of the present invention that the user is provided a means by which can be selected a set of active surfaces of the 3D object with respect to which the user is to be making selections or viewing play of the game.

An "over-under" is a game in which the user is presented a predicted score for a participant in an event and selects whether the actual score will be over or under the presented score.

A "parlay matchup" is a game that presents to the user a first participant and a choice from a plurality of second participants to pair against the first participant in a matchup.

An "array choice" is a game that includes an array of elements, each element being selected from the group consisting of a matchup, a parlay matchup, and an over-under, wherein, for each element, the user makes a selection of a predicted outcome associated with the element. The user is credited with a win when the actual outcome matches the predicted outcome for each of a specified pattern of elements in the array, such as a row, a column, or a diagonal.

An "array choice-plus-ranking" is an array choice game in which, besides selecting a predicted outcome for each element of an array, the user additionally ranks the selected predicted outcome in relation to the outcomes of other elements in the array.

A "category choice" is a game that includes multiple categories of matchups and the user selects a set of participants from each matchup category.

An "operator" means a person or group that operates the system for presenting the skill-based game to a user. In certain contexts, the operator refers to a person or group of people that are skilled at determining matchups of players of equal sport skill that will likely produce similar fantasy points during a given game and scores of players that will likely be produced during a given game. The operator may receive matchup, over-under, and score suggestions from a suggestion engine and may use a matchup/score tool for making the final assigned matchups/scores. The operator of the system for presenting the skill-based game to the user, manages the activity management server, the platform and the distributed computer application for playing the skill-based game.

A "fixed odds payout" is a fixed amount of a reward assigned and presented to a given user based solely upon the given user's purchase amount paid and selections made in an advanced choice game, and not altered based upon the participation and selections of other users. There are four types of a fixed odds payout, each separately defined herein: a simple fixed odds payout, a fixed odds progressive payout, a dynamic fixed odds payout, and a dynamic fixed odds progressive payout.

A "simple fixed odds payout" is a fixed amount reward assigned to a given user based solely upon the given user's purchase amount paid and selections made in an advanced choice game, and not altered based upon the participation and selections of other users nor subject to variation in level based on a series of winning occurrences or on dynamic conditions.

A "fixed odds progressive payout" is a fixed odds payout having graduated levels based on a series of winning occurrences in the advanced choice game.

A "dynamic fixed odds payout" is a dynamically priced fixed amount reward assigned to a given user based solely upon the given user's purchase amount paid and selections made in an advanced choice game, and not altered based upon the participation and selections of other users, the fixed amount being dynamically priced using a technique selected from the group consisting of artificial intelligence (AI), machine learning, other algorithmic data analysis of reward, risk, volume, and total risk, and combinations thereof.

A "dynamic fixed odds progressive payout" is a dynamic fixed odds payout having graduated levels based on a series of winning occurrences in the advanced choice game.

A "risk inventory" is a set of game components, each associated with a user preference and a calculated unit measurement of risk, that in combination produce an advanced choice game having an assigned fixed odds payout.

A "reward" is a benefit conferred upon an individual for service, effort, or achievement, such benefit including, among other things, any of a prize, a payout, and an award, and may be denominated in a form selected from the group consisting of cash, a token, a currency that is, among other things, promotional, social, cryptographic, or convertible, and combinations thereof.

A "computer process" is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Embodiments of the present invention are related to U.S. patent Ser. No. 14/847,795, filed on Sep. 8, 2015, which is published as U.S. Patent Application Publication No. 2016/0071355 and now issued at U.S. Pat. No. 10,353,543, and which is incorporated herein, in its entirety, by reference.

Embodiments of the present invention include methods and systems for presenting pure skill-based advanced choice games, including 3D advanced choice games, to users. The embodiments present the games on fixed odds payout using a parlay structure in an array set $\{A_{n,x}\}$ including performance based scoring ("fantasy/projected performance") of sport and other data enabled performance activities. The skill-based games may relate to sports activities or other entertainment-based activities or other events for fixed odds payout. In some embodiments, each of the games is provided in a computational platform that produces a single expression of risk as an event market for all the activities associated with such game. In some embodiments, the skilled-based games are available for all sports, including all North American stick and ball (professional leagues, NCAA, tennis golf etc.), NASCAR (and formula 1), soccer (futbol), cricket, rugby, bass fishing, etc. Some embodiments uniquely provide skill-based games for horse-racing in which each game component is based on a horse, a jockey, or a trainer for fixed odds payout. In some embodiments, the activities relate to fantasy-sports type activities. Some embodiments allow multiple participants to be formed into a single game with a single reward format that is consistent despite the participants being from different sports, sports events, or other events.

In some embodiments, the 3D game is a chance game, wherein each of the games amounts to a lottery draw. In such embodiments, this 3D chance-based game has a plurality of lottery plays. Each play is on one section of the 3D game. In various embodiments, the lottery plays are a ball drop or a number draw. In a number draw embodiment, each section of the 3D game can have its own pool of numbers or there may be a single pool of numbers for the entire 3D chance-based game.

In some embodiments, the skill-based advanced choice games are offered in real-time to simultaneously occurring events or a single event on which the games are based.

Some embodiments of the present invention generate a set of "matchups." Each matchup pairs an activity participant against one or more other activity participants. In some embodiments, each activity participant is a sports event, and in some embodiments, each activity participant is a player in a sports event.

Some embodiments generate a set of matchups, such that each matchup pairs a first activity participant against a second activity participant. The matchups may include one or more participants from selection by the user. The set of matchups are presented to the user as game components, and the user selects from the set to form a game.

Some embodiments generate a set of parlay matchups (A versus B or C), such that each matches a first activity participant to multiple second activity participants. The set of parlay matchups are presented to the user as game components, and the user selects from the set to form a game. For each selected parlay matchup, the user then selects which of the second activity participants to pair against the first activity participant in the matchup.

Some embodiments of the present invention generate a set of "over-unders." Each over-under presents a score for an activity participant, together with the choice of whether the actual score of the activity participant will be over or under the presented score. The set of over-unders are presented to the user as game components, who selects from the set to form a game. For each selected over-under, the user then selects whether the actual score will be over or under the presented score.

Some embodiments generate a set that includes a mixed set of matchups (e.g., matchups, parlay matchups, or a combination thereof) and over-unders. The mixed set is presented to the user as game components, and the user selects from the set to form a game. For any parlay matchups in the set, the user then selects which of the second activity participants to pair against the first activity participant in a matchup. For any over-unders in the set, the user then selects whether the actual score will be over or under the presented score.

In some embodiments, the matchups, parlay matchups, and over-unders, are used to produce a game within a game, including any event based competition or game of skill and entertainment. For example, a category choice, an array choice, an array choice-plus-ranking games are produced by selecting game components from presented matchups, over-unders, and parlay matchups.

Some embodiments present a category choice game in which a set of categories is presented to the user, and each category includes a set of participants for selection by the user.

Some embodiments present a set of matchups, a set of over-unders, or a mixed set as a tic-tac-toe game, or other such array choice game. In these embodiments, a tic-tac-toe board is presented to the user, who selects a game component of either a matchup, a parlay matchup, or an over-under for each square of the tic-tac-toe board. In other embodiments, the system presenting the tic-tac-toe board automatically selects a matchup or over-under for each square in a row of the array. For any square that has a parlay matchup, the user selects which of the second activity participants to pair against the first activity participant in the parlay matchup. For any square that has an over-under, the user selects whether the actual score will be over or under the presented score.

In embodiments, the tic-tac-toe game may create more possible entries than the 9 required squares (entries) of the tic-tac-toe board. In some embodiments, the platform uses a random or algorithmic method for selection of the game components for the entries of the tic-tac-toe board. In some embodiments, the platform also uses a random or algorithmic method for determining the placement of the game components into the entries of the tic-tac-toe board.

In some embodiments, a "diamond dough" variant of the tic-tac-toe game is presented to the user. The diamond dough game variant is also referred to as the "X's and O's" game. For diamond dough, the tic-tac-toe board is rotated for presentation as a diamond. The above descriptions of selection of game components for the entries of the tic-tac-toe board is the same for the diamond dough board.

In some embodiments, a 3D advanced choice game is presented to the user in a 2-dimensional (2D) display and, in other embodiments, a 3D advanced choice game is presented to the user in a 3D display, such as in an augmented reality or a virtual reality environment. The 3D game may comprise a shape, such as a cube, a pyramid, etc. For embodiments of the 3D cube game, each face of a 3D cube is divided into game entries (e.g., squares, triangles, etc.). The user rotates the cube about a set of axes to allow the user to select a set of faces, and the game is played using the entries on the selected set of faces. In embodiments of the pyramid game, the game includes a base pyramid with smaller pyramids positioned within the base pyramid. Each face of the base pyramid and small pyramids is a game entry. The user selects a set of pyramids, from among the base pyramid and smaller pyramids, and the game is played using the game entries (faces) on the selected set of pyramids. The selection of game components (matchup, parlay matchup, or over-under) and corresponding winning picks for each entry of these 3D games is the same as described above for each entry of the tic-tac-toe board.

Some embodiments present a set of matchups, a set of over-unders, or a mixed set as a ranking array game (array choice-plus-ranking game). In these embodiments, the array is presented to the user, who selects a game component of a matchup or over-under for each square in a row of the array. In other embodiments, the system presenting the array automatically selects a matchup or over-under for each square in a row of the array. For any selected entry that is a parlay, the user selects which of the second activity participants to pair against the first activity participant in the parlay matchup. For any selected entry that is an over-under, the user selects whether the actual score will be over or under the presented score. The user then provides an ordered ranking of the selected entries. The user then ranks each square in the row from 1 . . . N, indicating how the user expects the matchup or over-under associated with that square to perform with respect to the matchups or over-unders associated with each other square in the row, multiple rows, or the entire array. In some embodiments, the platform uses a random or algorithmic method for selection of the game components for the entries of ranking array. In some embodiments, the platform also uses a random or algorithmic method for determining the placement of the game components into the entries of the ranking array.

In some embodiments, the matchups and over-unders are selected prior to the activity participants participating in the corresponding event (e.g., playing in a professional sporting event or other events). The set of selected matchups, set of selected over-unders, or set of mixed selections and the corresponding participants is referred to as "user roster data".

In some embodiments, these skilled-based games may be created based on single team performance projections associated with their game components, such as matchups, over-unders, parlay matchups of a selected advanced choice game, such that these games are created for individual teams by mathematically calculating the portfolio of participants based on single participant prediction and statistical optimization. In some embodiments, these games may also be created based on single participant performance projections by prediction and statistical optimization of the scores of such participant.

The outcomes of the matchups may be determined with reference to the first and second participants' actual performance in one or more actual sports events or other events according to a predetermined scoring criterion. In one embodiment, the first or second participant(s) with better statistics in predetermined, weighted, statistical categories (e.g., a better fantasy sports score) in the one or more actual sporting event(s) may be determined as the "winner" of each matchup. The winners of the matchups may be compared to the user's picks.

The outcome of the over-unders may be determined with reference to the participants' actual score in one or more actual sports events or other events. In one embodiment, the predetermined, weighted, statistical categories (e.g., a fantasy sports score) may be determined as the participants' actual score compared to the user's pick of over or under the score presented to the user.

In a straight matchup, over-under, or mixed games, if the user has made a sufficient number of winning picks, then the user may be declared to be a winner of the activity. In the tic-tac-toe game, if the user made winning picks that form a sufficient number of rows, columns, or diagonals, then the user may be declared a winner of the activity. In the ranked array game, if the user made a sufficient number of winning picks and rankings of the winning picks, then the user may be declared to be a winner of the activity. In the diamond dough game, if the user made winning picks that form one of the defined patterns shown in FIGS. 18A-18E, then the user may be declared a winner of the activity and receiving a corresponding fixed odds payout. In the 3D shape games, if the user made winning picks that form a defined pattern within the game entries, then the user may be declared a winner of the activity and receive a corresponding fixed odds payout. The fixed odds payout may be based on the number of faces that the user selected for playing the game.

Accordingly, embodiments require a fixed odd payout table and each user has an opportunity to win against the system. The fixed odd payout table indicates varying fixed odds payouts based on the number of matchups/over-unders selected, etc. This is in contrast to other games, such as pari-mutuel games, where users play against other users and payouts are based upon the amount of money that users associates with their selections. The payout may be based on a fantasy-based scoring which is "performance-based scoring" and in the context of teams the scoring may include points scored as presented within these unique games and on the system that scores both participants and teams through a single risk management system.

When the user is a winner of a game, the user may be awarded a reward according to a fixed odds payout table, which may be predetermined fixed odds, dynamic fixed odds, fixed odds progressive, and dynamic fixed odds progressive. For dynamic fixed odds and dynamic fixed odds progressive payouts, the system may dynamically price the payouts using techniques selected from the group consisting of AI, machine learning and, other algorithmic data analysis of reward, risk, volume, and total risk, and combinations thereof.

In games in which winning is based on forming at least one of a defined set of patterns, the set of patterns may be successive "X" patterns, namely, pattern 1, pattern 2, pattern 3, pattern 4, pattern 5, etc. Each of the set of patterns may be assigned with a fixed odds payout or a dynamic fixed odds payout. Such fixed odds payout or dynamic fixed odds payout may be determined based on whether the corresponding pattern is formed using game components of type matchup (A vs B), parlay matchup (A vs B, A vs. C), and/or over under.

In some embodiments, the user may win a fixed cash award or other fixed reward for correctly picking all of the selected matchups and over-unders, or for correctly picking a predetermined number of winning matchups, over-unders, or mixed over-unders and matchups (e.g., for getting close). The awards may vary depending on the number of selected matchups and over-unders. In another example, the user may win such fixed award for correctly picking winning matchups, over-unders, or a mix of over-unders and matchups that form a row, column, or diagonal in a tic-tac-toe board, or a defined pattern in a diamond dough board (as shown in FIGS. 18A-18E), or defined patterns in the entries of the 3D shape games, etc. The fixed award may vary depending on the number of rows, columns, and diagonals formed by the winning matchups/over-unders. In a further example, the user may win such a fixed award for correctly picking and ranking winning matchups or over-unders in a row of an array. The award may be progressive, such that winning all matchups in row wins a reward, and progressively higher rewards are given based on the number of those matchups are correctly ranked within the row.

In some embodiments of the 3D advanced choice games, an insurance payout option is provided for each 3D game. With this option, if a user's winning selections among the game entries do not form one of the defined patterns for winning the game, but a certain number of winning selections were made among the game entries, then the winning selections are reformatted on the set of faces of the 3D game object. If the reformatted winning selections form a defined pattern, then an fixed odds payout reward is awarded to the user. For example, if the user's winning picks do not form a defined pattern for winning a 3D cube game, a color scheme (e.g., red) is applied to the losing picks, a color scheme (e.g., green) is applied to the winning picks, or both. The picks with the same applied color scheme are positioned together on a single cube face and a reward (cash, token, promotion, free game, etc.) may be awarded based on the picks forming a defined pattern on the single cube face.

Some embodiments include business-to-business (B2B) content, marketing, attribution, and social media. Some embodiments support advertising technology as game content also supports cost per click traffic trading on both publisher and advertiser models. Some embodiments uniquely assign proprietary data inputs to create the projections based on performance scoring and other projections. Some embodiments uniquely aggregate risk from proprietary games and proprietary projections to desktop interface of risk reporting.

The use of fixed odds payout games in some embodiments of the present invention is a pronounced innovation over prior art because it reduces the complexity of multiple sports (or other events) and multiple teams and multiple athletes to single application of the game as a user interface across multiple clients. Accordingly, in these embodiments, events can be virtualized, i.e., turned into a game. In these embodiments, the consumer, perhaps the audience, a spectator, or a fan is presented with an objective expectation of rewards with a single set of rules for each game no matter what the athlete, team or sport. In the case that the fantasy sports examples used herein are used as aspects of the user interface, in these embodiments, the performance scoring of the particular event may be based on the reduction of the performance data to an application programming interface and then used to score the new games described herein. The fixed odds payout simplifies the performance expectations to concrete expectation of reward based on the calculations of the event result. Further, in some embodiments, the platform's production of a new class of games (further described herein) takes all events and reduce them to a single expected prizing format. Such prizing format is completely unlike "Totes" or pari-mutuel where the odds of success depend on the actual vs advertised rewards. Creating a finality of the expectation at the time of reward entry radically, in these embodiments, changes the idea of the value of the event as a prizing tool for fan or audience engagement. These embodiments described herein provide:

1. a game or set of games
2. within one or more events,
3. with one or more choices (matchups, over-unders, conditional/parlay matchups, etc.)
4. with multiple game formats,
5. that can be across sports, teams, or athletes,
6. with multiple reward forms (cash or token, free to play, promotional, loyalty, etc.),
7. multiple forms of fixed odds (simple fixed odds, fixed odds progressive, dynamic fixed odds, dynamic fixed odds progressive, etc.),
8. on a single platform risk tool,
9. that calculates the relationship between prizing, entries, and game types based on levels of activity,
10. as a single expression of expected probability of win,
11. of all games, over all over multiple sports, athletes, and teams, each with different performance scoring systems.

FIG. 1 is a block diagram of an exemplary computing environment 20 for implementing embodiments of the present invention. The computing environment 20 includes an activity management server 24 communicatively coupled to presentation devices 22 that present, via applications executed on the presentation devices 22, game activities of skill-based game to corresponding users. The applications include user interfaces that present visual aspects of the game activities to the users.

In the environment of FIG. 1, the presentation device 22 is communicatively coupled, via a computer network 38, to the activity management server 24. The computer network 38 may be the Internet, a cellular network, a satellite communication network, or any other networks or communication systems or devices known in the art. In some embodiments, the communication link through the network 38 is a dedicated link, such as a dedicated wired link between the presentation device 22 and activity management server 24. In some embodiments, the communication link through the network 38 includes one or more local area network, wide area network, or any other networks linked together to form the computer network 38. The network 38 may include a public network, a private network, and combinations thereof. Communication over the network 38 may use different communication channels, such as secure and unsecure channels.

Each presentation device 22 includes a video display 28 configured to display game activities, and an input device 30 configured to receive input related to the game activities. Each presentation device 22 further includes a communication interface configured to communicative, via network 38, with the activity management server 24. Each presentation device 22 also includes a main processor for executing program instructions, memory for storing data such as program instructions, a video processor, an audio processor, other processors, input and output ports, etc. In some embodiments, a presentation device 22 is configured within a game console, smart television, kiosks, gaming tables, gaming tablets or other such device. In some embodiments, the presentation device 22 is a desktop computer 32, a telephone, including cellular, wireless or wired telephones or smart phone 34 (e.g., iPhone® or Android® device), a laptop or notebook computer 36, a tablet, or any other computing device without limitation.

The input device 30 may include a keyboard, mouse, joystick, touch-screen, buttons, track-balls, microphones, voice and gesture recognition components, or any other component known in the art to be capable of receiving input from a user. The communication interface of the presentation device 22 may be configured to permit data to be transmitted and received from components of the presentation device 22. The communication interface may support wired or wireless communications using various protocols, such as 3G, 4G, IMT, GSM, TCP/IP, Bluetooth, 802.11xx, etc.

The activity management server 24 includes one or more processors for executing program instructions, memory for storing data such as program instructions, and at least one communication interface for forming a communication link to at least one presentation device 22. In some embodiments, the activity management server 24 is communicatively coupled to a data storage device, such as a hard drives or database. The activity management server 24, or coupled data storage device, may store data, such as participant statistics, event schedules, images of participants, data regarding matchups, data regarding scores, data regarding rankings, data regarding game configurations, user account information (see FIG. 16), and other data. The server 24 may also be configured to communicate, via its communication interface, with other devices to obtain data, such as configured to communication with another server or device to obtain game schedule information, updated player rosters, etc. In some embodiments, the activity management server 24 includes a user station that permits an operator to interface with and manage the activity management server 24, such as to change operator settings.

Aspects of the invention may be implemented via a distributed architecture, a cloud server architecture, a client-server architecture, or using any other system architecture known in the art.

Aspects of the invention may also be implemented as an "app" (e.g., downloadable, installable or installed software) which runs on the presentation device 22. For example, embodiments may include a "mobile client" that comprises a downloadable app. For example, a user may download an app from the operator or from an app store. The app may be stored on the user's presentation device 22 and then be executed by one or more processors thereof. One advantage of the downloadable app is that a much more engaging and rich media experience may be provided to the user. Further, enhanced security features including authentication and verification of identity, location, and other factors may be implemented on the app to deliver a compliant and secure experience for the user. The mobile client may be configured to interface with the activity management server 24, such as to receive information from that server 24 and to transmit information to that server 24, as well as implement other functionality.

Figure 2:
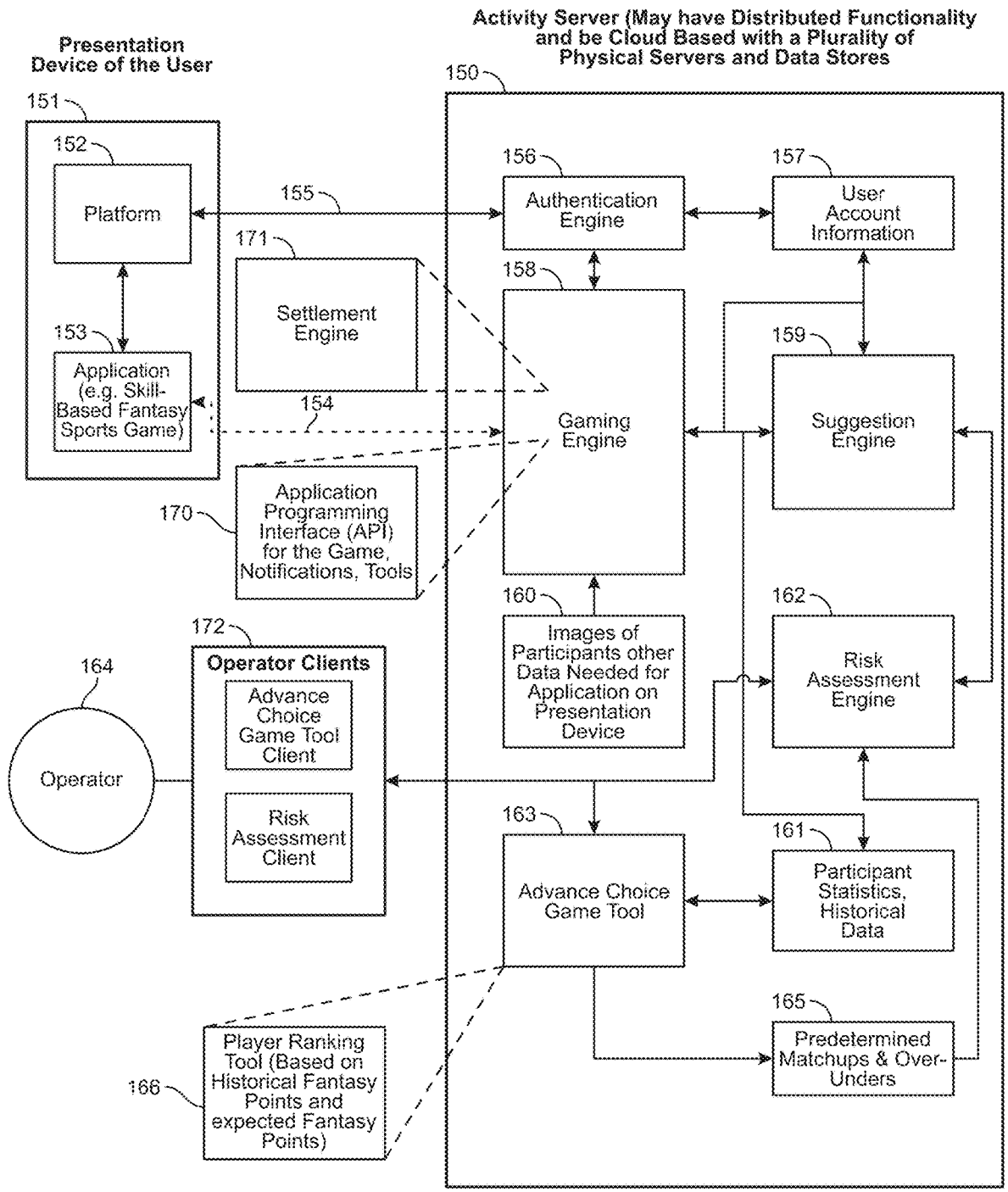
FIG. 2 is a block diagram of a platform, implemented in the network environment of FIG. 1, for performing skill-based games, in accordance with an embodiment of the present invention.

FIG. 2 is a block diagram of a platform, implemented in the network environment of FIG. 1, for performing skill-based games (e.g., advanced choice games), in accordance with an embodiment of the present invention FIG. 2 shows some of the internal components within the activity server system 150 and within the presentation device 151 of a user. In some embodiments, the activity server system 150 is the activity management server 24 of FIG. 1 and the presentation device 151 is one of the presentation devices 22 of FIG. 1.

The user first communicates through the presentation device 151 with the activity server system 150 and downloads a platform 152. The platform 152 is then run on the presentation device 151. The platform 152 provides an interface between the activity server system 150 and any platform-specific game application 153 that is downloaded to the presentation device 151. The platform 152 may perform some or all of the authentication processing and determines if the user meets with a set of compliance criteria to use the platform 152. The user downloads a platform specific game application 153 to the presentation device 151 from the activity server system 150. The platform specific game application 153 includes hooks, such as API function calls to the platform. Thus, the game application 153 only operates if authorized by the platform 152.

The compliance criteria may be based upon local or national laws and determining whether the user complies with such laws. For example, the platform 152 may have access to GPS information, or IP-based location information and may use this information to select the compliance criteria based upon location. Additionally, the age of the user may be pertinent as jurisdictions may have various age requirements. Thus, the platform 152 interfaces with the presentation device 151 and extract information from one or more sources (e.g. GPS data, IP information) or may require the user to enter a password or answer a series of questions to validate the user's identity. Once the platform 152 determines that the user is an authorized user and one that meets the compliance criteria, the platform 152 grants access to the application game and allow the application game to either communicate 154 directly with the activity server system or communicate 155 with the activity server system 150 through the platform 152.

The activity server system 150 may include one or more servers (e.g., management server 24) and may operate in a distributed computing environment. Thus, the functionality performed by the computer-based modules of the activity server system 151 may be distributed across processors or devices. The presentation device 151 (e.g., presentation device 22) of the user interfaces with one or more computer-based modules of the activity server 150 through a communications network. The activity server system 150 receives a request to play a game from the presentation device at an authentication engine 156 and receives a key that indicates that the platform 152 has confirmed compliance. The authentication engine 156 accesses a user's account information module 157 and obtains the account information for the specified user. The authentication engine 156 may perform additional authentication based upon data passed from the platform and the user's account information.

Once the authentication engine 156 is satisfied, the authentication engine 156 accesses the gaming engine 158. The gaming engine 158 provides game information (e.g., matchup data, over-under data, graphical images, statistics, etc.) to the game application 153 on the presentation device 151. The game engine 158 is in communication with a suggestion engine 159, an image database 160, a participant statistics and historical information database 161. The game engine 158 gathers this information and formats the information in accordance with a protocol that is recognized and understood by the game application 153. The game application 153 receives the data and incorporates the data into one or more templates for presentation to the user. Additionally, the application program 153 provides an interface for the transmission of selection data and other game related data to the game engine 158.

The suggestion engine 159 provides a series of matchups, over-unders, or mix to the game engine 158 based upon a plurality of factors including: the specific user and his likes and dislikes (e.g., as to teams, particular participants, etc.), a risk assessment engine 162 determination, and a set of predetermined matchups, over-unders, or mix. The predetermined matchups, over-unders, or mix are determined by an operator, who is knowledgeable about the specific activity associated with the fantasy activity of the game, or automatically determined by the suggestion engine 159 based on various criteria, including statistics and historical data associated with the activity or activity participant and accessed from database 161. With respect to FIGS. 2 and 3, reference to "matchups" mean both matchups and parlay matchups.

An advanced choice game tool 163 is provided to the operator for assisting the operator in his selections. The tool 163 may include a graphical interface and accesses participant statistics and historical data in a database 161. The operator 164 determines these matchups, over-unders, or mix, and stores them in a matchup database 165. In some embodiments, each of the advanced choice games, including 3D advance choice games, the risk tool produces a single expression of risk as an event market for all the activities associated with such game.

The suggestion engine 159 communicates with a risk assessment engine 162. The risk assessment engine 162 receives all of the predetermined matchups and over-unders from the database 165 and determines whether certain ones should be eliminated based upon a criteria set. As expressed above, the risk assessment engine 162 may eliminate matchups and over-unders based upon player injuries, or if a determination is made that the matchup is no longer an even match or the predicted score of the over-under is no longer a likely score. The risk assessment engine 162 may receive data from one or more locations about matchup and over-under selection by users. If the matchup selections reach a predetermined percentage in favor of one of the participants, the risk assessment engine 162 may remove the matchup from the list of possible matchups. If the over-under selections reach a predetermined percentage in favor of going over or under the presented score, the risk assessment engine 162 may remove the over-under from the list of possible over-unders. It should be understood by one of ordinary skill in the art that other analytical tools may be used for assessing risk and making determinations about, which matchups and over-unders to eliminate from presentation. Additionally, it should be recognized that the risk assessment engine 162 continues to operate during the playing of the sports games or other events and can causes the matchups and over-unders displayed between end-users to change. The risk assessment engine may allow for an operator to respond to the identification of a risk and to take action based on that risk by instructing the activity server and 150 to change the predetermined matchups and over-unders as stored in data source 165. Risk can be identified based upon information, such as a report about an athlete, an injury report, information posted on a news or blog website. The risk assessment engine may include a web-monitoring tool for each player that is part of a matchup or over-under, such that information about the player is collected and represented to an operator. Additionally, the risk assessment engine may be regularly updated based upon wagers that occur. For example, the risk assessment engine may provide a listing of the 10 highest matchups with the greatest risk. The risk could be based simply on an imbalance in sales or on a more complex formula. Additionally, the risk assessment engine 162 may monitor all of the selections by users and identify if there are imbalances based upon groups of matchups, over-unders, and mix that show an imbalance in the selected matchups. The risk assessment engine includes a graphical user interface that displays the matchups and over-unders with the greatest risk and reports on developing news about players where imbalances in matchup selections are occurring. For example, the 30 highest matchups that have the greatest risk may be presented and a news ticker of information about the players in the matchups may be included from either a general web search or by monitoring specific websites (sports-related websites, e.g. ESPN, NBA, MLB etc. or fantasy sports-related websites) for the names of the players in the matchups. Thus, the risk assessment engine, allows for monitoring of risk in real-time.

In embodiments of the invention, the risk assessment engine can be automated based upon threshold values to remove matchups or over-unders. For example, there may be a monetary threshold for a matchup that causes the matchup to be removed, such as a $500,000 differential in bets on one player or if more than 80% of the wagers are on one player.

The risk assessment engine 162 passes the matchups to the selection engine 159. The selection engine 159 may then further eliminate some of the matchups and over-unders. For example, matchups or over-unders that include a participant from a favored team of the user may be preferred. Similarly, matchups or over-unders that include participants from a team that the user does not like is given a lower priority. Other factors may be used by the selection engine 159 in determining the matchups to present as discussed above.

The game engine 158 then sends the pruned matchups and over-unders from the selection engine 159 along with images of the participants in the matchups, statistics of the participants and other data needed by the application game 153 for providing the intended visual and game experience to the user on the presentation device 151 through a secure network connection 154. For the tic-tac-toe game (and diamond dough variant of the tic-tac-toe game) and 3D shape games, in some embodiments, the application game 153 may present entries (squares, triangles, etc.) for the application game 153 or the user to associate each entry with one of the pruned matchups or over-unders as game components. In other embodiments, the game engine 158 uses a random or algorithmic method for selection of the game components for the entries of the tic-tac-toe board, diamond dough board, and 3D shape games. In some embodiments, the platform also uses a random or algorithmic method for determining the placement of the game components into the entries of the tic-tac-toe board, diamond dough board, and 3D shape games. In some embodiments, more than the nine required squares of the tic-tac-toe board or diamond dough board are created for association with a matchup or over-under game. Similarly, for a ranking array game, in some embodiments, the application game 153 presents an array of squares for the application game 153 or the user to associate each square with one of the pruned matchups or over-unders and ranking each square in a row of the array. In other embodiments, the game engine 158 uses a random or algorithmic method for selection of the game components for the entries of the ranking array. In some embodiments, the platform also uses a random or algorithmic method for determining the placement of the game components into the entries of the ranking array.

It should be recognized that the platform 152 and the application 153 are client programs that run locally on the presentation device of the user. The various components of the activity server system can communicate with one another through an Application Programming Interface (API) 170. The API allows for the communication of the game information between the application 153 and the gaming engine 158. Additionally, the API can be used for supplying both tools such as the matchup & over-under tool and the risk assessment engine to a presentation device of the operator 164 in the form a client programs 172, so that the operator may remotely monitor and make changes to the game without the need to be directly connected to the activity server system 150. The application game 153 receives this data and incorporates the data into one or more templates for presentation on the display associated with the presentation device 151. Communication continues between the game engine 158 and the application game 153 until the end of the session.

The user's selection is saved and stored in a database 157 associated with the user's account. The game engine 158 includes a settlement engine 171 that also determines whether the user has selected one or more winning participants, whether the winning participants are in a row of the tic-tac-toe board, whether the winning participants are in a defined winning pattern of the diamond dough board (e.g., FIGS. 18A-18E) or whether the winning participants are in a defined winning pattern of the selected entries in a 3D shape game, and whether winning participants are in a row of a ranking array (and correctly ranked). The game engine 158 informs the application game 153 whether the user has won the game based upon the game rules. The settlement engine 171 is also configured to provide payment to a winning user and may interact with the user's account information data store 157 to determine where any winnings should be transferred (e.g., a banking account, such as a checking account or other account such as PayPal account).

The activity server system 150 may also include a virtual machine to generate diagrams and descriptions for presentation to the user on the presentation device 151. The activity server system 150 may also include an integrity tool. If the individual athlete is not performing as expected, the integrity tool predicts and measures continuously the market and performance expectations of the participants of the advanced choice games.

Figure 3:
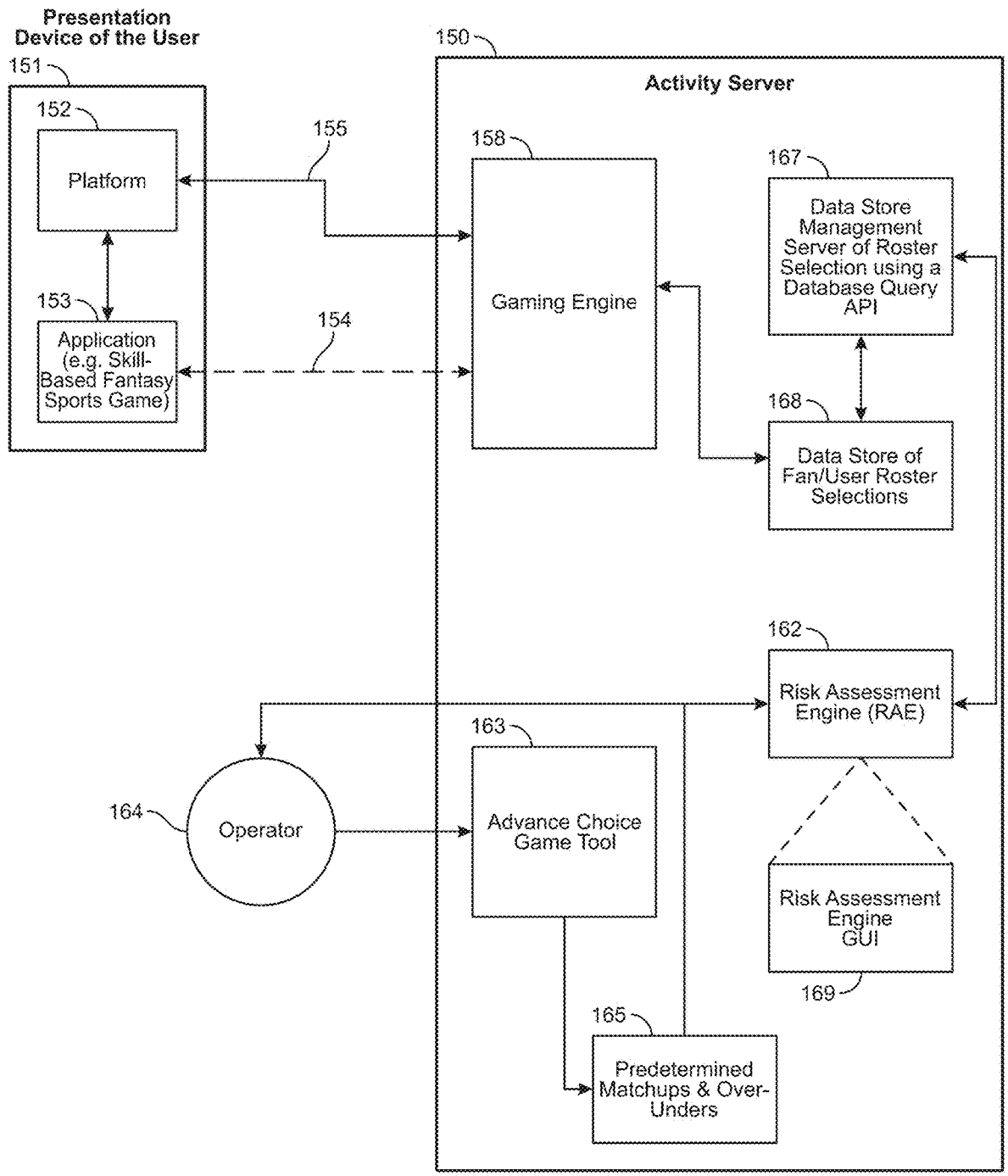
FIG. 3 is a block diagram of the platform of FIG. 2, further configured with a risk engine user interface 169 and roster listing data store 167, in accordance with an embodiment of the present invention.

FIG. 3 is a block diagram of the platform of FIG. 2, further configured with a risk engine user interface 169 and roster listing data store 167, in accordance with an embodiment of the present invention. The risk assessment engine 162 include a graphical user interface 169 to allow an operator to view a listing of correlated roster payouts (wherein a roster is the selection by a user of a pre-defined number of matchups and selected winners for those matchups or a pre-defined number of over-unders and selected over or under predictions for the presented score), or a pre-defined number of a mix thereof, and roster counts ordered by potential payout amount to determine the riskiest combinations, which would be presented at the top of a listing in the graphical user interface. As indicated above the risk assessment engine GUI 169 may be local to the risk assessment engine 162 or a client application may be available to an operator such that the GUI 169 is presented remotely on the presentation device of the operator and the operator can remotely monitor the game and any risk determined by the risk assessment engine 162. The risk assessment engine 162 may include a set of predefined thresholds or the operator may set a threshold value for each number of picks of potential payout maximums and roster count maximums. In one embodiment of the invention, the risk assessment engine is configured to highlight and present selection groups above a threshold in the graphical user interface with some indicia, such as highlighting the selection group in red. The risk assessment engine may also generate alerts, which can be auditory or may generate an e-mail notification to one or more operators. Depending upon the configuration by the operator, the risk assessment engine may automatically close individual matchups when a threshold level has been met without requiring authorization from an operator. The thresholds may be determined at the discretion of the operator, but will be based at least in part on an expected number of users submitting rosters along with historical information concerning payouts.

As shown in FIG. 3, the roster selections by user playing the fantasy game (user roster data) are sent from the presentation device of the user through the network connection 154 between the application 153 and the gaming engine 158. The data received by the gaming engine will include the ID number for the user, a description of the selected roster including the number of picks, whether the picks include a hedge, and an array of selections for each matchup or over-under within the roster. Thus, the array will include a pointer to the selected athlete in each matchup selected by the user. Additionally, other parameters may be communicated when the roster selections are transmitted by the application 152 running on the presentation device of the user 151, including the location in which the presentation device is located. On a periodic basis or at the request of an operator, the risk assessment engine queries the data store management server 167 using a database query API to query the data store of user roster selections. The database of the data store 168 contains all of the currently active user roster selections for all of the users playing the fantasy game. The API query will produce a report to the risk assessment engine. For example, the database query may produce a report that indicates the N-riskiest selections in terms of overall possible payout disparity for matchups or over-unders. It should be recognized that other database searches may be used to provide information concerning risk to the risk assessment engine. The risk assessment engine will receive the results of the database query in the form of a report, such as a data file in a predefined format in conformity with the database API. The risk assessment engine parses the report and compares the entries within the report to a threshold value that has either been preset or set by an operator. For example, the threshold could be based on a percentages of disparity, such as 80% of the users betting on one athlete or the threshold could be in the disparity of the total amount bet, such that a payout that included a matchup may exceed $500,000. Again, other thresholds can be established based upon the risk without deviating from the intended scope of the invention. It should be recognized by one or ordinary skill in the art that the database and data management server may operate as part of the activity server system or may be outside of the activity server system. Additionally, the data store management server may periodically push the results of a pre-set number of database queries to the risk assessment engine within the risk assessment engine needing to query the data store management server 167.

In one embodiment of the invention, matchups and over-unders may be presented on a customized basis to fans. Customization of matchups and over-unders occurs in the suggestion engine 159 that takes into account the user's account information stored in a datastore 157. For example, while a plurality of users may be presented with the same card or set of matchups, set of over-unders, or mixed set of matchups and over-unders, the order of how such is presented may be customized. As one example, the first presented matchup may be selected based upon the location of the user or based upon a fan's profile. If the matchups include a matchup involving Drew Brees, fans who are located in Louisiana or identify themselves as New Orleans Saints fans may be presented with a set of matchups where the first matchup is the matchup involving Drew Brees. Thus, the order or configuration of the matchups, over-unders, or mix may vary based upon geographic region, time of year, rankings of players or teams, user's input or profile or other criteria. In addition, the graphical presentation of the matchups and over-unders may be changed based upon such criteria.

Figure 4A:
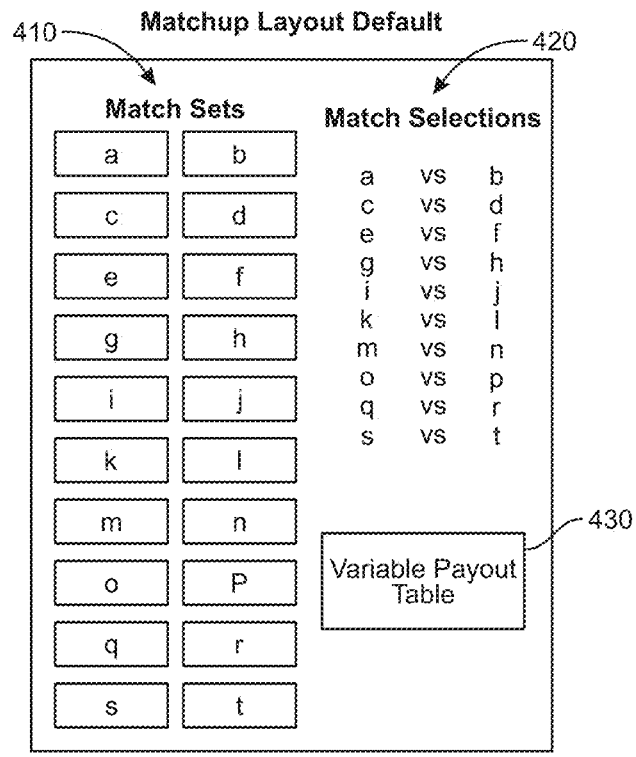
FIG. 4A shows a matchup screen layout for presenting a set of matchups selectable by a user, in accordance with an embodiment of the present invention.

FIG. 4A shows a matchup screen layout for presenting a set of matchups selectable by a user, in accordance with an embodiment of the present invention. The user interface screen includes an area 410 presenting matchup sets selectable by a user, such as "a versus b", "c versus d", "e versus f", etc. The user interface screen also includes an area 420 summarizing these matchups. The fixed odds payout of the user varies based on the number of matchups selected by the user. The user interface screen further includes an area 430 presenting a fixed odds payout table, showing the fixed odds payout corresponding to each number of selected matchups.

Figure 4B:
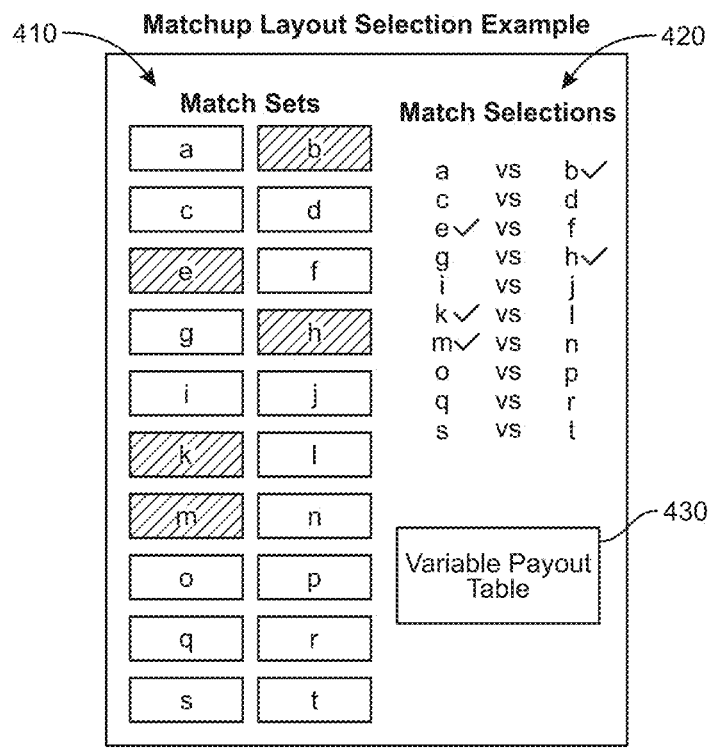
FIG. 4B shows the matchup screen layout FIG. 4A, with a user's selections from among the presented matchups, in accordance with an embodiment of the present invention.

FIG. 4B shows the matchup screen layout FIG. 4A, with a user's selections from among the presented matchups, in accordance with an embodiment of the present invention. In the matchup sets area 410 of FIG. 4B, the user selected the matchup of "a versus b", and selected "b" to win in the matchup. The user selected "b" by clicking the box containing "b" in area 410, which is shown highlighted. The user also similarly selected the matchup of "e versus f", and selected "e" to win in the matchup; the matchup of "g versus h", and selected "g" to win in the matchup; the matchup of "k versus 1", and selected "k" to win in the matchup; and the matchup of "m versus n", and selected "m" to win in the matchup. The user's selections are summarized in area 420 of the matchup layout.

FIG. 4C shows an exemplary user interface screen, displayed on a presentation device of a user, showing the user's selected matchup sets based on the matchup screen layout in FIG. 4A. The user interface screen of FIG. 4C shows three matchup sets 402, 404, 406 of the four matchup sets selected by the user. The selected matchup sets are also summarized in the "matchup picks" window 408. Each matchup 402, 404, 406 is presented with a picture of the two participants in the matchup and their corresponding statistics. The selected matchups form a game card for the user. For each selected matchup set, the user has further chosen one of the participants in the respective matchup set as the winning participant (as shown in FIG. 4B).

The user interface screen of FIG. 4C also includes a "select purchase amount" window 410 in which the user specifies the purchase amount for the selected set of four matchups. The user interface screen of FIG. 4C further includes a "current payout" table 412 that shows the current fixed odds payout based on the number of matchups selected. As the user selected four matchups, the "current payout" table 412 has the four matchup fixed odds payout information highlighted.

Figure 4D:
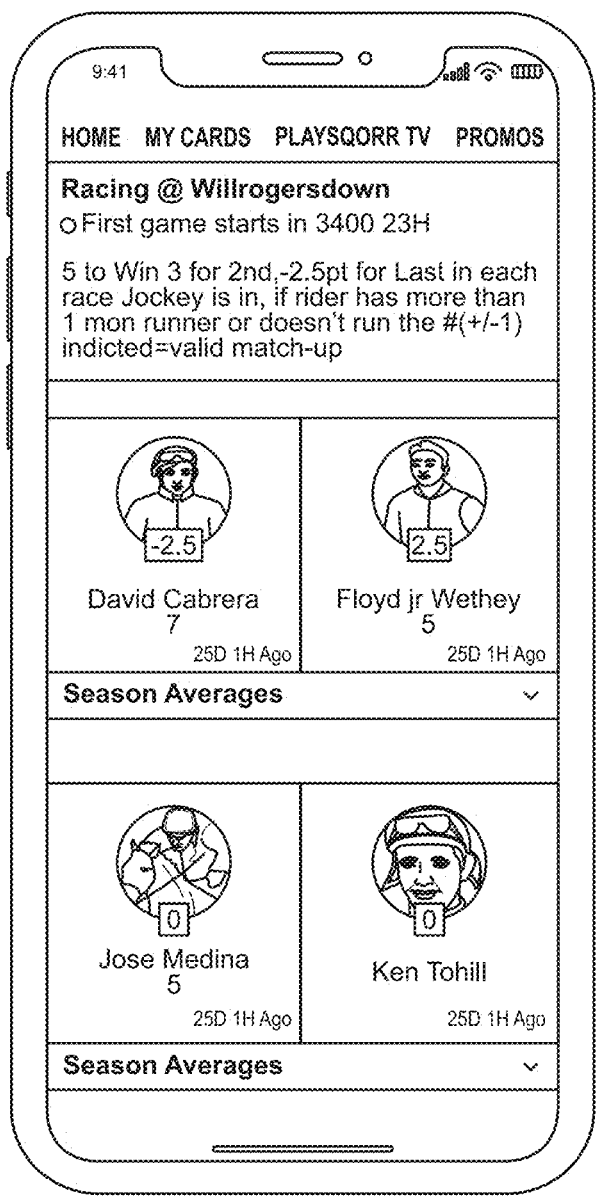
FIG. 4D shows another exemplary user interface screen, displayed on a presentation device of a user, showing the user's selected matchups based on the layout in FIG. 4A.

FIG. 4D shows another exemplary user interface screen, displayed on a presentation device of a user, showing the user's selected matchup sets based on the layout in FIG. 4A. The user interface screen of FIG. 4D includes photos of the participants in a matchup, which are selectable by the user to pick the winning participant in the matchup.

Figure 5B:
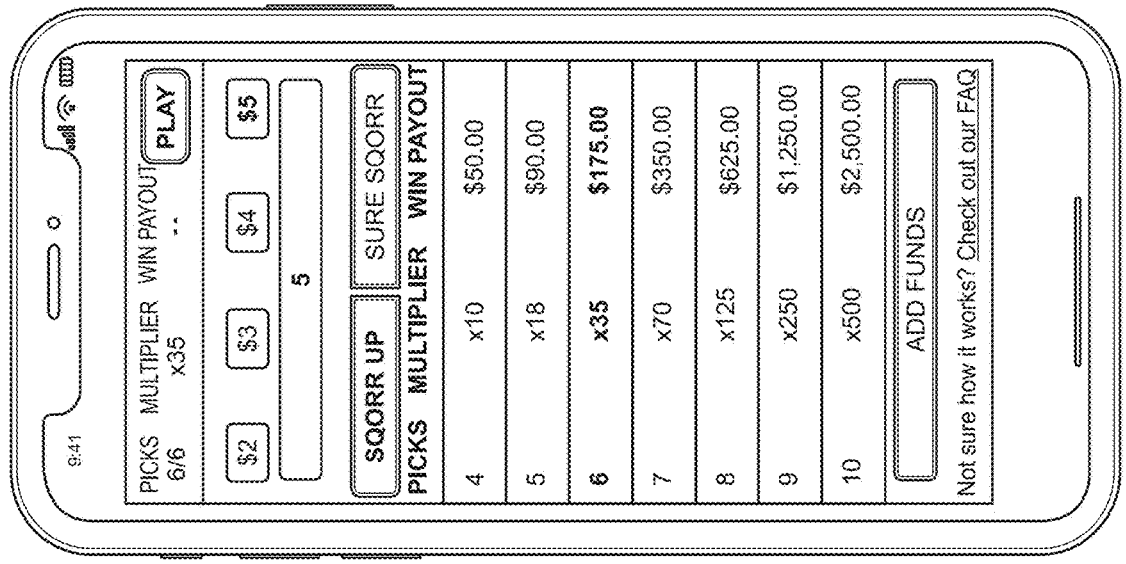
FIG. 5B shows the fixed payout for over-unders in FIG. 5A, in accordance with an embodiment of the present invention.
Figure 5A:
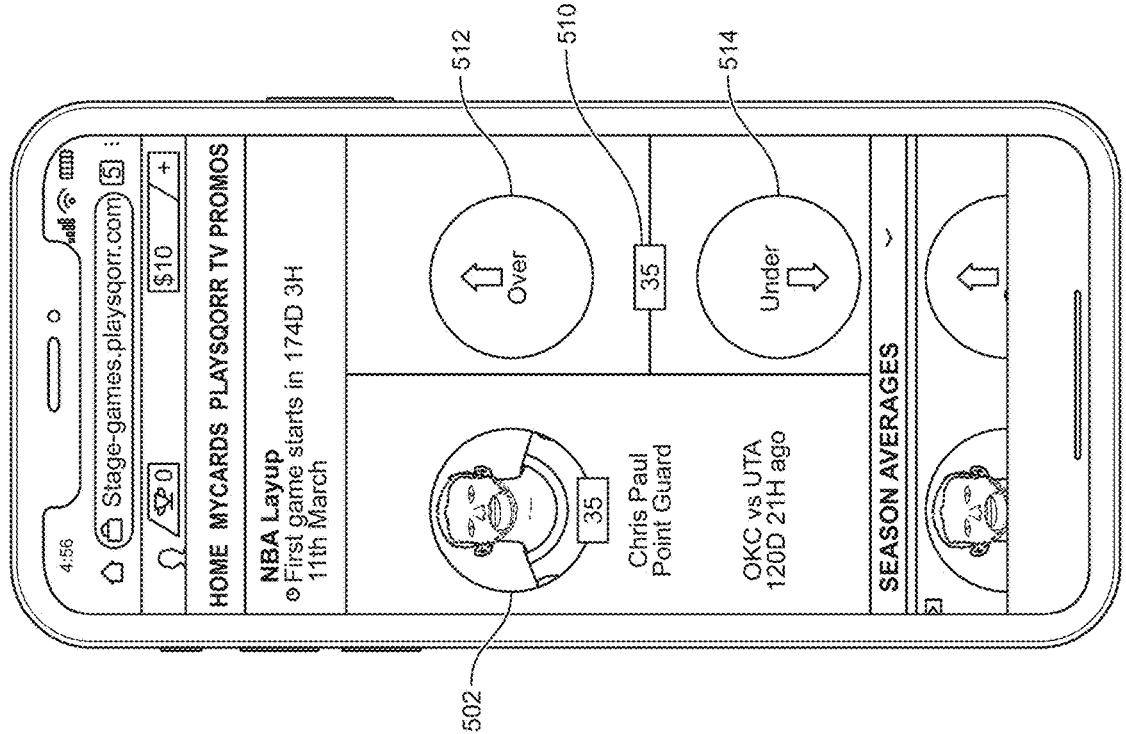
FIG. 5A shows an exemplary user interface screen, displayed on a presentation device of a user, presenting a set of over-unders selectable by a user, in accordance with an embodiment of the present invention.

FIG. 5A shows an exemplary user interface screen, displayed on a presentation device of a user, presenting a set of over-unders selectable by a user, in accordance with an embodiment of the present invention. The user interface screen includes over-under 502 that presents a predicted score 510 of 35 for Chris Paul in an upcoming sporting event in which he is a participant. The user picks whether Chris Paul will score over the score of 35, by selecting the over icon 512, or under the score 510, by selecting the under icon 514. Similar to the set of matchups in FIG. 4C, a fixed odds payout table is provided, with a fixed odds payout corresponding to the number of selected over-unders.

FIG. 5B shows the fixed payout for over-unders in FIG. 5A, in accordance with an embodiment of the present invention. As shown in FIG. 5A, the fixed odds payout vary based on the number of over-unders selected by the user for the game.

Figure 6A:
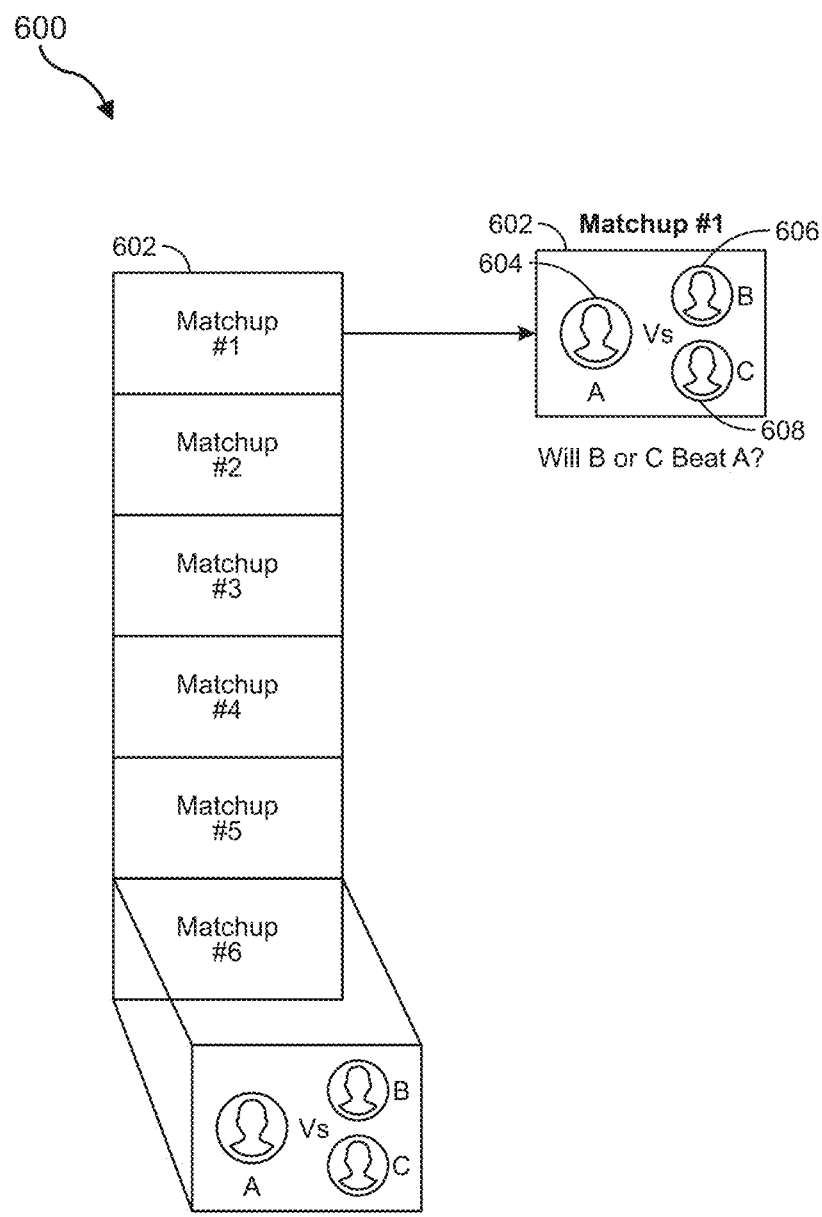
FIG. 6A shows a parlay matchup screen layout for presenting a set of parlay matchups selectable by a user, in accordance with an embodiment of the present invention.

FIG. 6A shows a parlay screen layout for presenting a set of parlays selectable by a user, in accordance with an embodiment of the present invention. The user interface screen includes parlay matchup sets 600 selectable by a user. In some embodiments, a parlay matchup pairs a participant A versus a participant B or a participant C. The parlay matchup sets 600 include parlay matchups #1 through #6. As shown by parlay matchup #1 602, a parlay matchup includes a first participant A 604 in a first upcoming event, a second participant B 606 in a second upcoming event, and a third participant C 608 in a third upcoming event. The first, second, and third event are not necessarily the same event. A user may select matchup #1 602, and then must select whether to pair, in matchup #1 602, the first participant A 604 with either the second participant B 606 or the third participant C 608. To make the selection, the user may click on the icon corresponding the participant B 606 and participant C. Similar to the set of matchups in FIG. 4C and set of over-unders in FIG. 5A, a fixed odds payout table is provided, with a fixed odds payout corresponding to the number of selected parlay matchups.

Figure 6C:
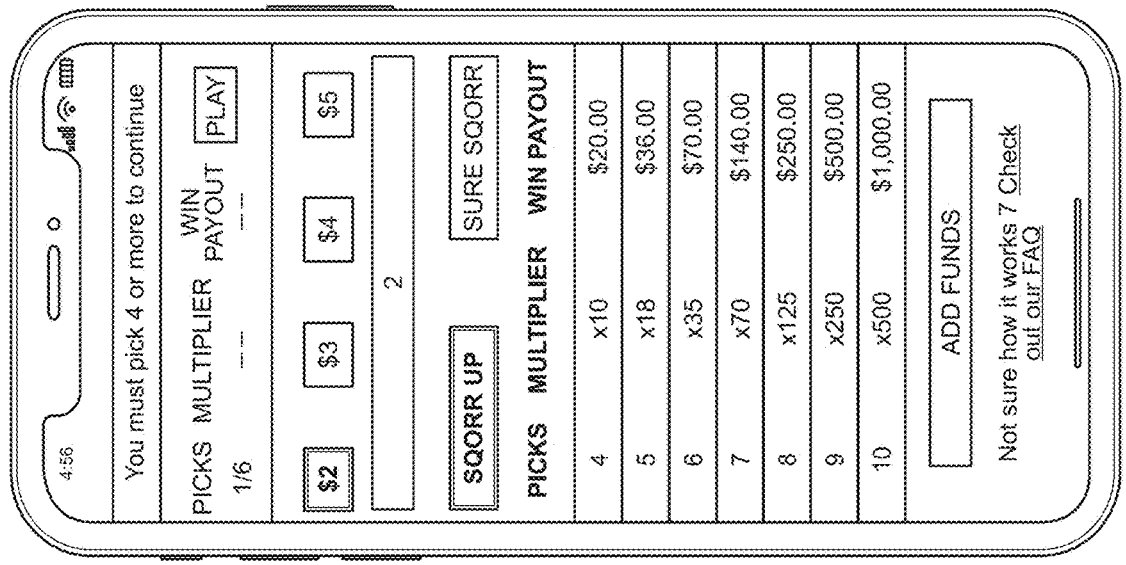
FIG. 6C shows the fixed payout for parlay matchups in FIG. 6B, in accordance with an embodiment of the present invention.
Figure 6B:
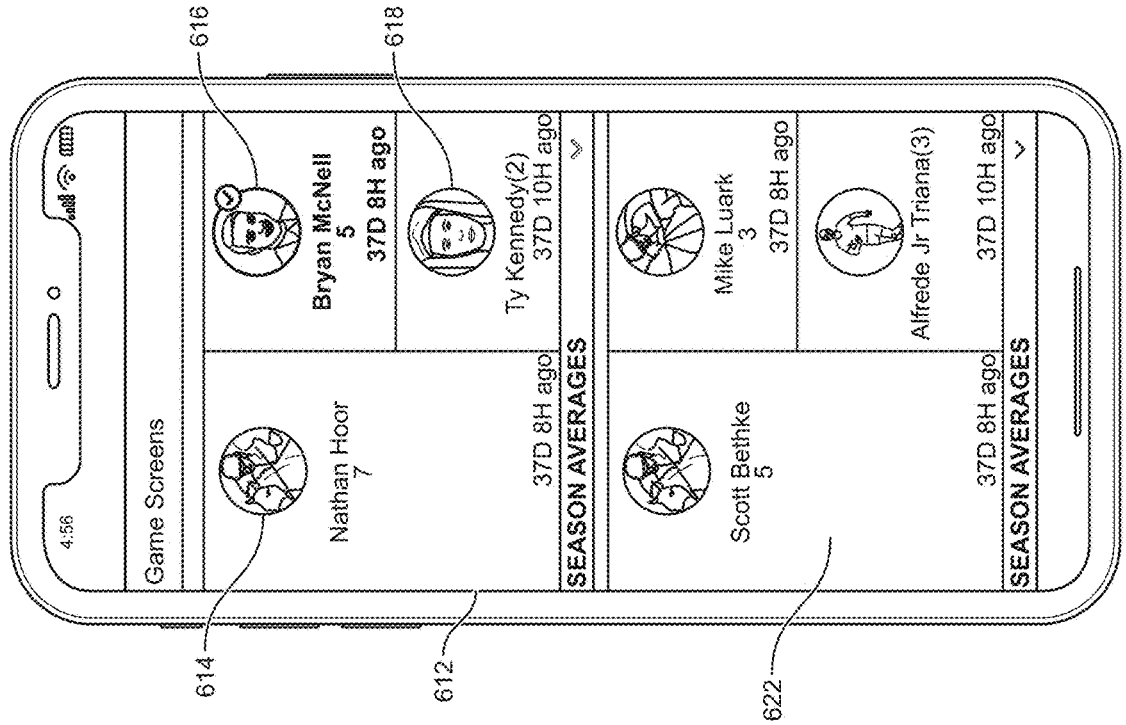
FIG. 6B shows an exemplary user interface screen, displayed on a presentation device of a user, presenting a set of parlay matchups selectable by a user, in accordance with an embodiment of the present invention.

FIG. 6B shows an exemplary user interface screen, displayed on a presentation device of a user, presenting a set of parlays selectable by a user, in accordance with an embodiment of the present invention. The user interface screen of FIG. 6B shows two parlays 612, 22 in the set. The first parlay 612 includes a first participant 614 (Nathan Hoor), a second participant 616 (Bryan McNeil), and a third participant 618 (Ty Kennedy). As indicated by the checkmark placed next to the second participant 616, the user selected to pair the first participant 614 with the second participant 616 in the matchup.

FIG. 6C shows the fixed payout for parlay matchups in FIG. 6B, in accordance with an embodiment of the present invention. As shown in FIG. 6C, the fixed odds payout vary based on the number of parlay matchups selected by the user for the game.

Figures 7A, 7B:
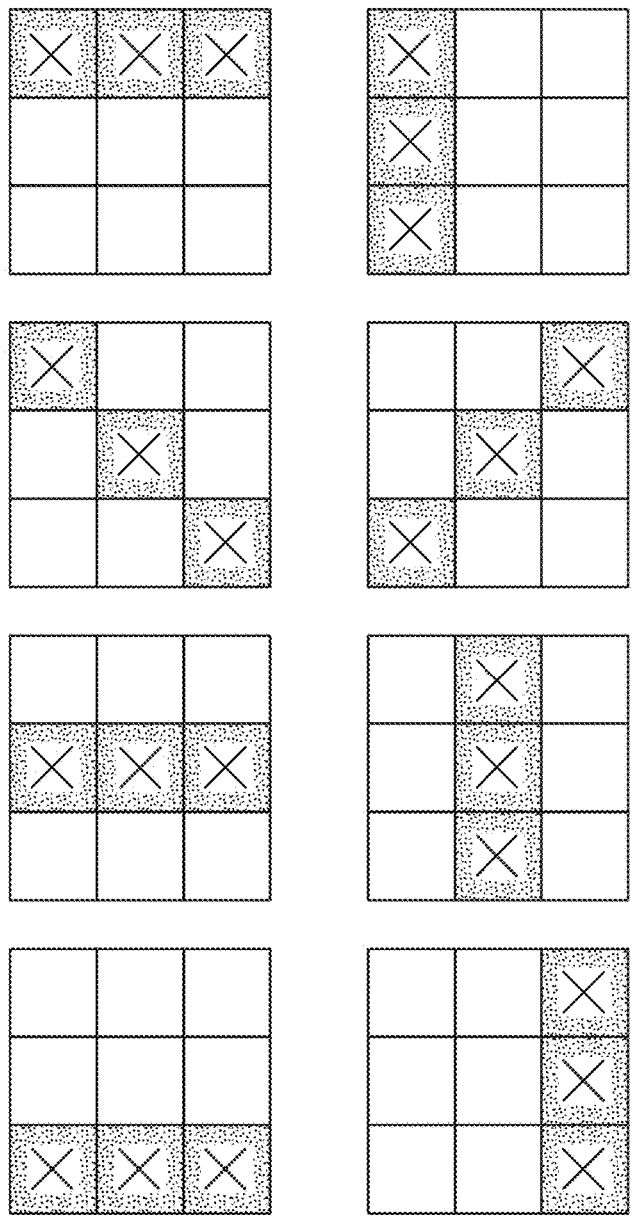
FIG. 7A shows a tic-tac-toe screen layout for presenting a set of matchups selectable by a user, in accordance with an embodiment of the present invention.
FIG. 7B shows exemplary patterns of winning in the tic-tac-toe screen layout of FIG. 7A, in accordance with an embodiment of the present invention.

FIG. 7A shows a tic-tac-toe screen layout for presenting a set of matchups selectable by a user, in accordance with an embodiment of the present invention. Tic-tac-toe is one type of array choice game provided by the platform of FIG. 2. The screen layout of FIG. 7A includes a tic-tac-toe board in which each square can be configured with a matchup. To do so, in some embodiments, the user selects the square and a user interface screen is displayed with a set of matchups from which the user may select one of the matchups. For example, a user may select the sixth square in the tic-tac-toe board, which displays a set of matchups from which the user can select one of the matchups for the sixth square. In other embodiments, the platform uses a random or algorithmic method for selection of the matchups for the squares of the tic-tac-toe board. In some embodiments, the platform also uses a random or algorithmic method for determining the placement of the selected matchups into the squares of the tic-tac-toe board. In some embodiments, more than the nine required squares of the tic-tac-toe board are created for association with a matchup or over-under game.

The selected matchup for the sixth square is referred to in FIG. 7A as matchup #6. As shown in FIG. 7A, selecting the sixth square, once associated with matchup #6, displays a user interface screen of matchup #6, and the user can select one of the participants of matchup #6 to win the matchup.

FIG. 7B shows exemplary patterns to win in the tic-tac-toe board of FIG. 7A, in accordance with an embodiment of the present invention. Each of the patterns represent a row in the tic-tac-toe board in which the user selected the winning participant for the matchup corresponding to each square of the row.

Figure 7C:
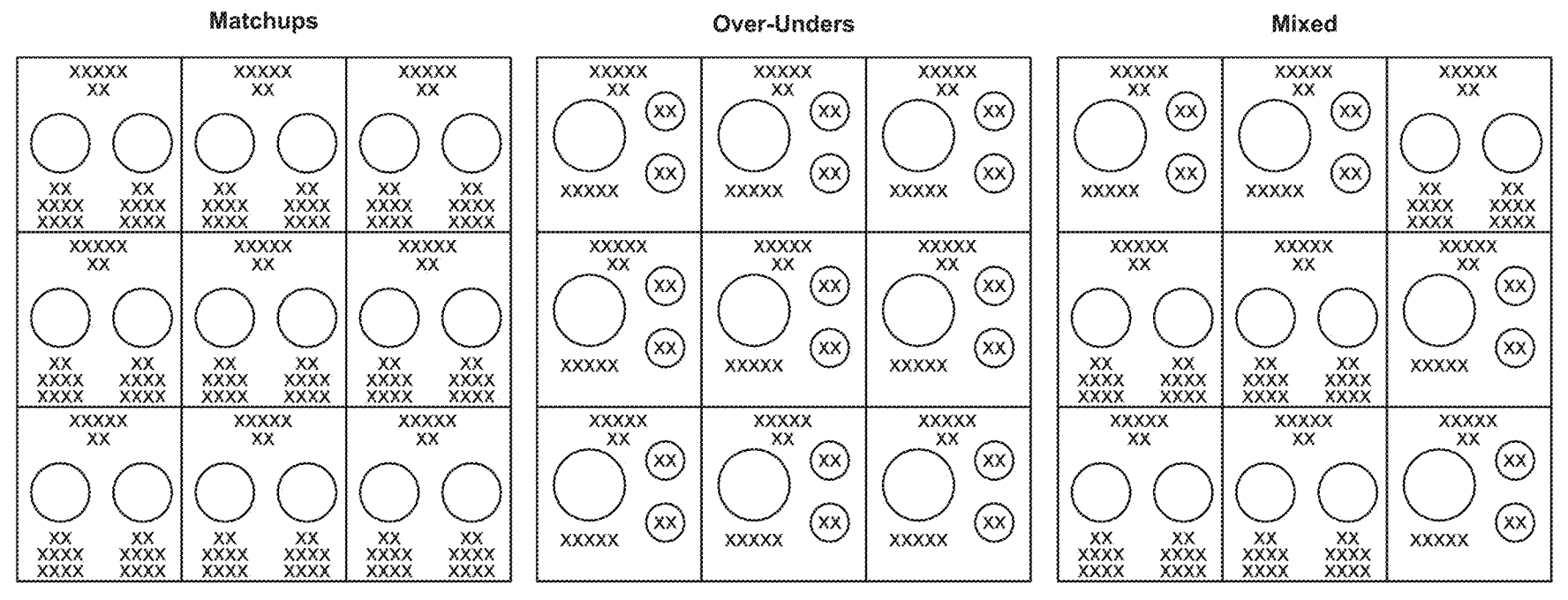

FIG. 7C shows that a tic-tac-toe screen layout of FIG. 7A that can present a set of game components, such as matchups, over-unders, or a mix of matchups and over-unders, in accordance with an embodiment of the present invention. The matchup in a corresponding square may be matchups or a parlay matchup. In some embodiment of FIG. 7C, the user selects a square and a user interface screen is displayed with a set of matchups, over-unders, or mixed matchups and over-unders from which the user may select one of the displayed items. In other embodiments, the platform uses a random or algorithmic method for selection of the matchups, over-unders, or mixed matchups and over-unders games for the squares of the tic-tac-toe board. In some embodiments, the platform also uses a random or algorithmic method for determining the placement of the selected games into the squares of the tic-tac-toe board. Once a square is associated with a parlay matchup, selecting that square display a user interface screen of the parlay matchup, and the user can select from multiple participants to pair to win against a first participant in a matchup. Once a square is associated with an over-under, selecting that square displays a user interface screen of the over-under, and the user can select whether an actual score for a specified participant will be over or under a presented score.

Figure 7D:
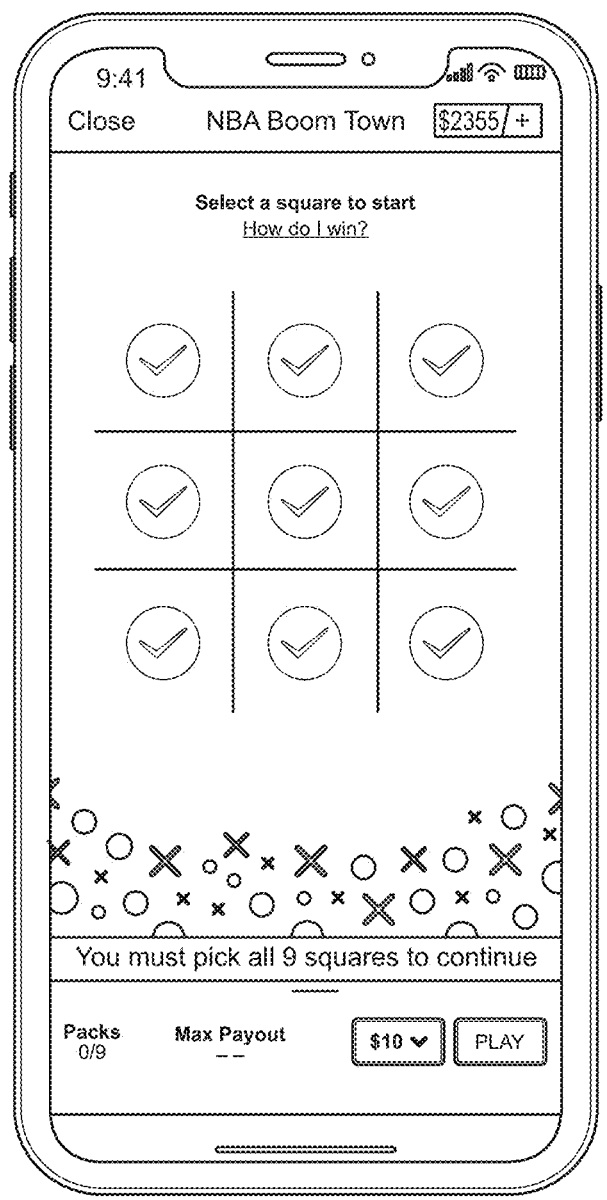
FIG. 7D shows an exemplary user interface screen, displayed on a presentation device of a user, showing an unconfigured tic-tac-toe board in the layout of FIG. 7A, in accordance with an embodiment of the present invention.

FIG. 7D shows an exemplary user interface screen, displayed on a presentation device of a user, showing an unconfigured tic-tac-toe board in the layout of FIG. 7A, in accordance with an embodiment of the present invention. In some embodiments, the user may individually select each square on the board to associate the square with a specific matchup or over-under. In other embodiments, the platform uses a random or algorithmic method for selection of the matchups, over-unders, or mixed matchups and over-unders games for the squares of the tic-tac-toe board. In some embodiments, the platform also uses a random or algorithmic method for determining the placement of the selected games into the squares of the tic-tac-toe board.

Figure 7F:
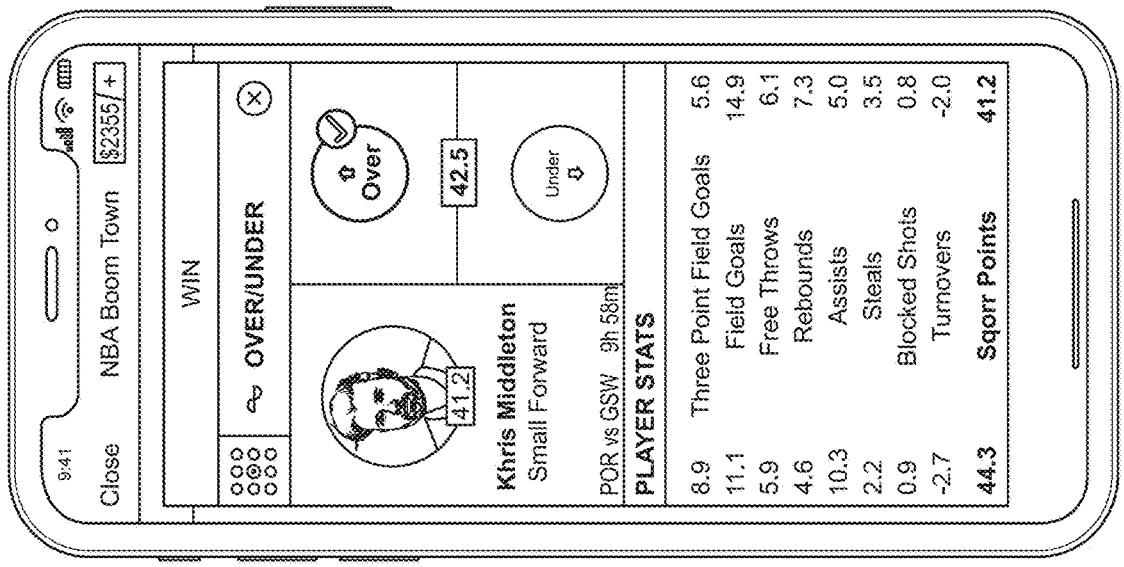
FIG. 7F shows the exemplary over-under user interface screen of FIG. 7E, with a selection by the user that the actual score of the participant will be over the present score.
Figure 7E:
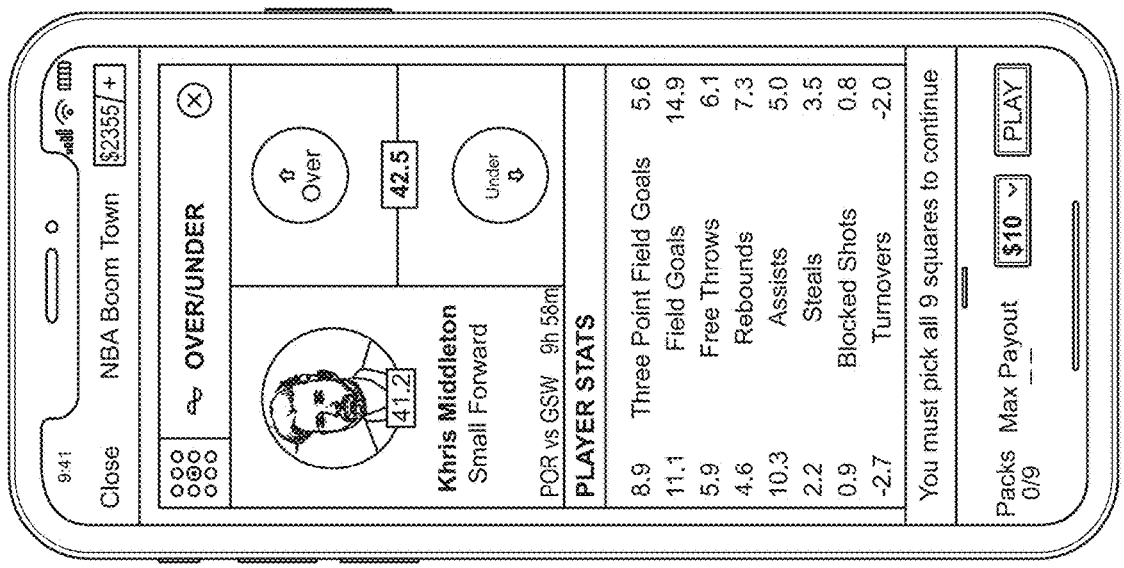
FIG. 7E shows an exemplary over-under user interface screen, displayed on a presentation device of a user, that is presented responsive to the user selecting a corresponding square in the tic-tac-toe board of FIG. 7D.

FIG. 7E shows an exemplary over-under user interface screen, displayed on a presentation device of a user, that is presented responsive to the user selecting a corresponding square in the tic-tac-toe board of FIG. 7D. The over-under user interface screen of FIG. 7E is displayed in response to the user selecting a square of a tic-tac-toe board associated with the corresponding over-under depicted in the screen.

FIG. 7F shows the exemplary over-under user interface screen of FIG. 7E, with a selection by the user that the actual score of the participant will be over the present score. The over-under interface screen of FIG. 7F shows that the user selected that the participant depicted in the over-under interface screen will achieve a score over the presented score in a corresponding event. The user will win (e.g., receive an "O") in the corresponding square if the participant actually scores over the presented score, and will lose (e.g., receive an "X") in the corresponding square if the participant actually scores under or meets the presented score.

Figure 7H:
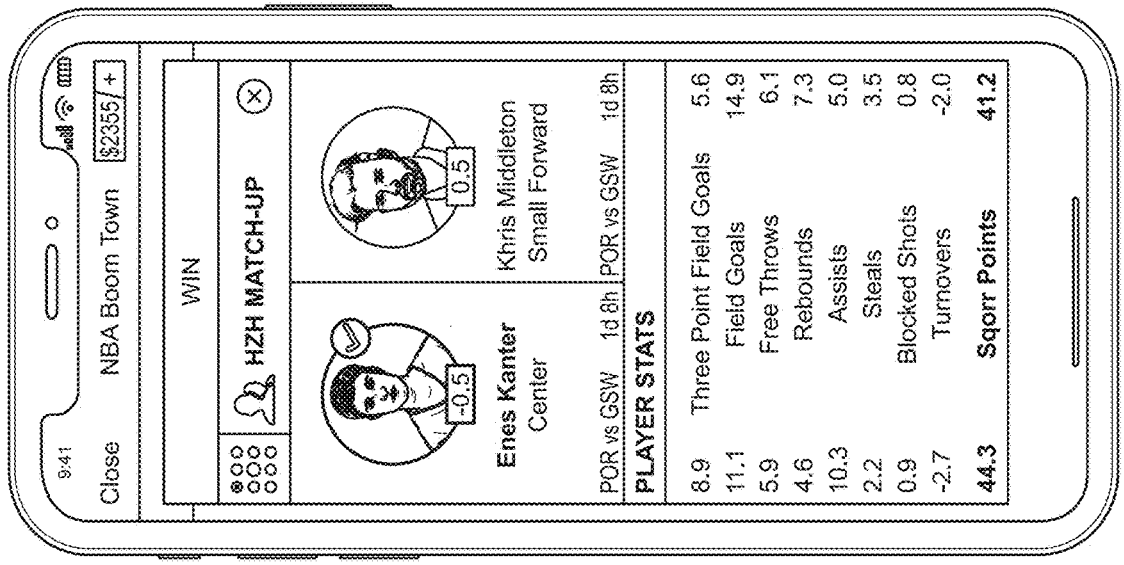
FIG. 7H shows the exemplary matchup user interface screen of FIG. 7G, with the first participant of the matchup selected as predicted to win by the user.
Figure 7G:
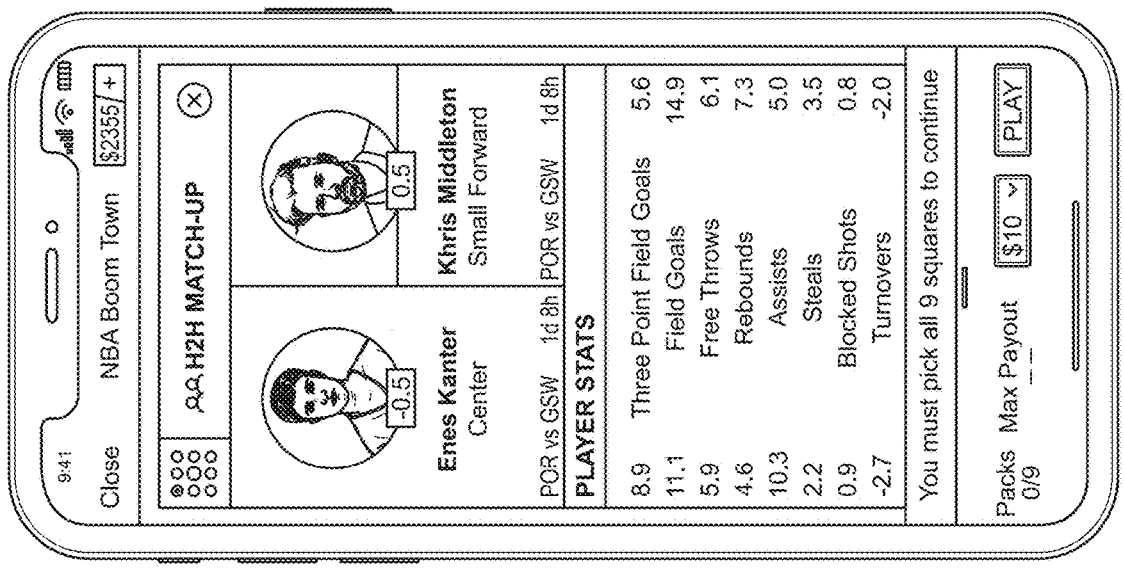
FIG. 7G shows an exemplary matchup user interface screen, displayed on a presentation device of a user, that is presented responsive to the user selecting a corresponding square in the tic-tac-toe board of FIG. 7D.

FIG. 7G shows an exemplary matchup user interface screen, displayed on a presentation device of a user, that is presented responsive to the user selecting a corresponding square in the tic-tac-toe board of FIG. 7D. The matchup user interface screen of FIG. 7G is displayed in response to the user selecting a square of a tic-tac-toe board associated with the corresponding matchup depicted in the screen.

FIG. 7H shows the exemplary matchup user interface screen of FIG. 7G, with the first participant of the matchup selected to win by the user. The match-up user interface screen of FIG. 7H shows that the user selected that the first participant depicted in the user interface screen will achieve a score higher than the second participant depicted in the user interface screen. The scores of the first and second participants are not necessarily from participation in the same event. The user will win (e.g., receive an "O") in the corresponding square if the first participant actually received the higher score, and will lose (e.g., receive an "X") in the corresponding square if the participant actually receives a lower or tied score.

Figure 7J:
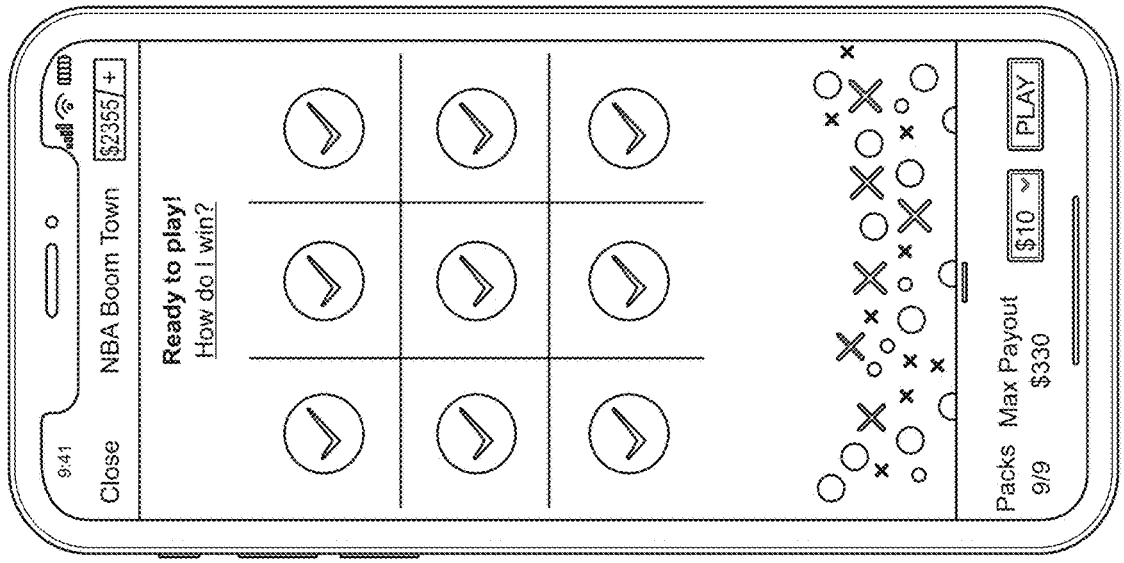
FIG. 7J shows the tic-tac-toe board of FIG. 7D with a checkmark depicted in all of the squares of the tic-tac-toe board, indicating each square is configured with a matchup or over-under.
Figure 7I:
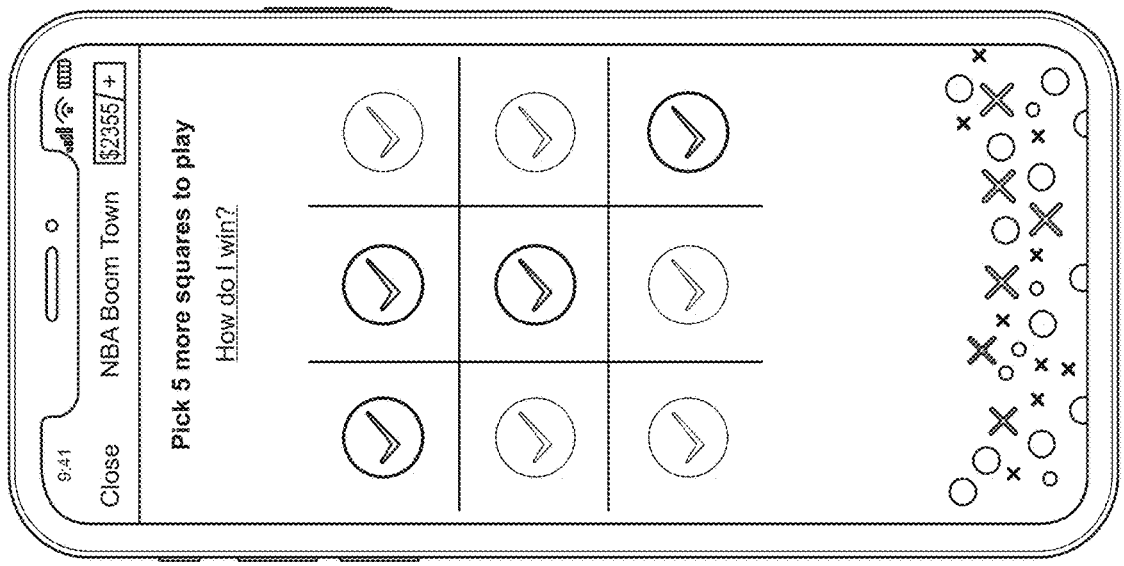
FIG. 7I shows the tic-tac-toe board of FIG. 7D, with a checkmark depicted in each square of the tic-tac-toe board configured with a matchup or over-under.

FIG. 7I shows the tic-tac-toe board of FIG. 7D, with a checkmark depicted in each square of the tic-tac-toe board configured with a matchup or over-under. Based on these checkmarks, a user can determine which squares of the tic-tac-toe board still need to be associated with a matchup or over-under.

FIG. 7J shows the tic-tac-toe board of FIG. 7D with a checkmark depicted in all of the squares of the tic-tac-toe board, indicating each square is configured with a matchup or over-under.

Figure 7L:
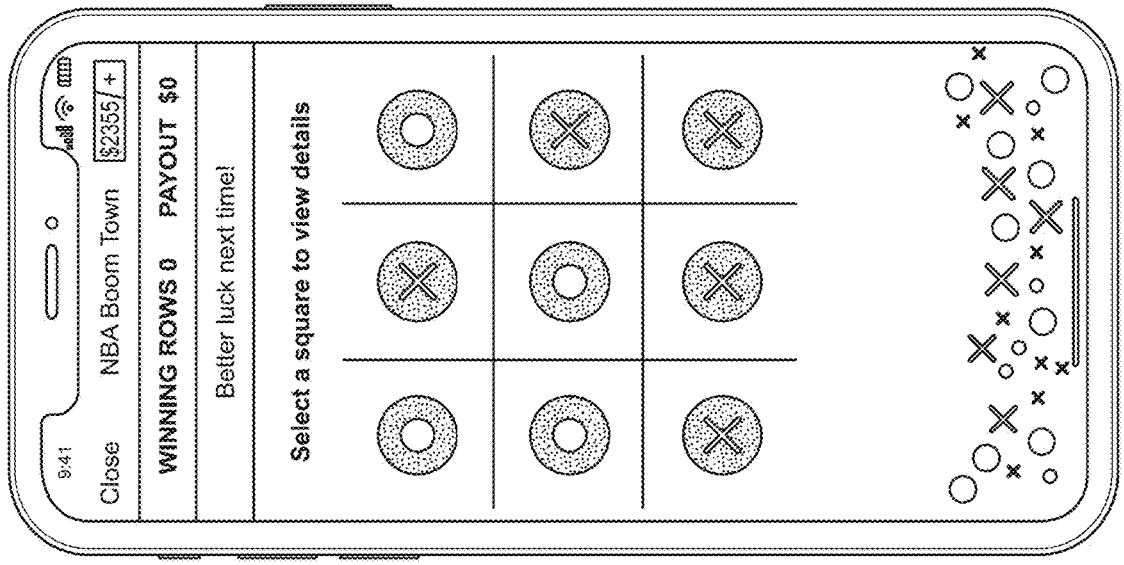
FIG. 7L shows the tic-tac-toe board of FIG. 7D with results determined for each square, which is accordingly marked with an "X" or "O"
Figure 7K:
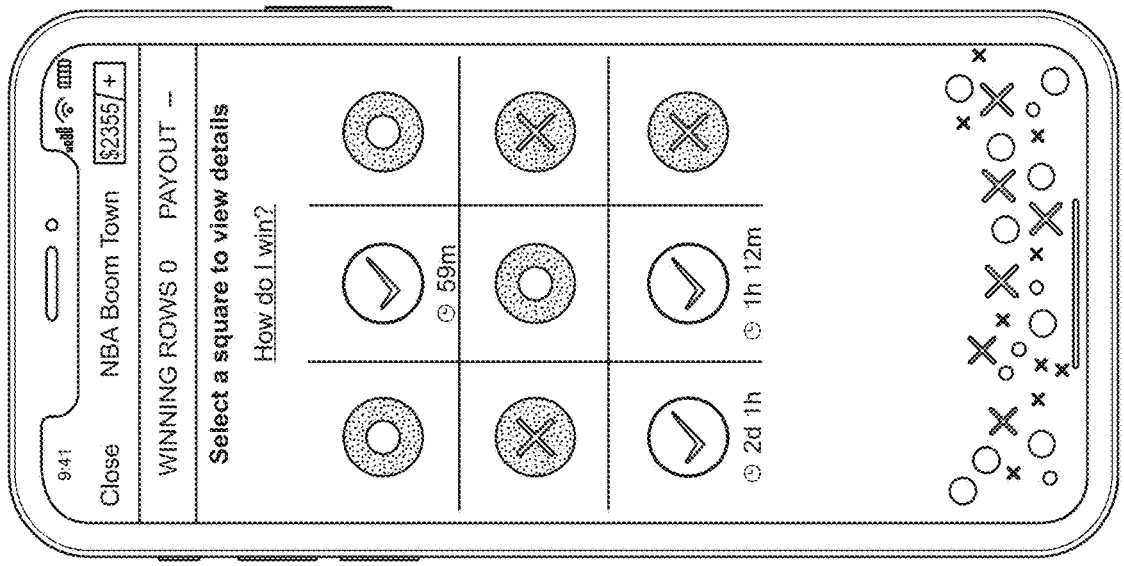
FIG. 7K shows the tic-tac-toe board of FIG. 7D, with the squares corresponding to determined results marked accordingly with an "X" or an "O"

FIG. 7L shows the tic-tac-toe board of FIG. 7D, with the squares associated with matchups or over-unders in which results have been determine marked accordingly with an "X" or an "0". Squares marked with an "0" indicate that the user picked the winning participant in the associated matchup or correctly selected that the actual score was over/under in the associated over-under. Squares marked with an "X" indicate that the user picked the losing participant in the associated matchup or incorrectly select that the actual score was over/under in the associated over-under.

FIG. 7L shows the tic-tac-toe board of FIG. 7D, such that the results for each matchup or over-under has been determined, and the associated square is marked accordingly with an "X" or "0".

Figure 7N:
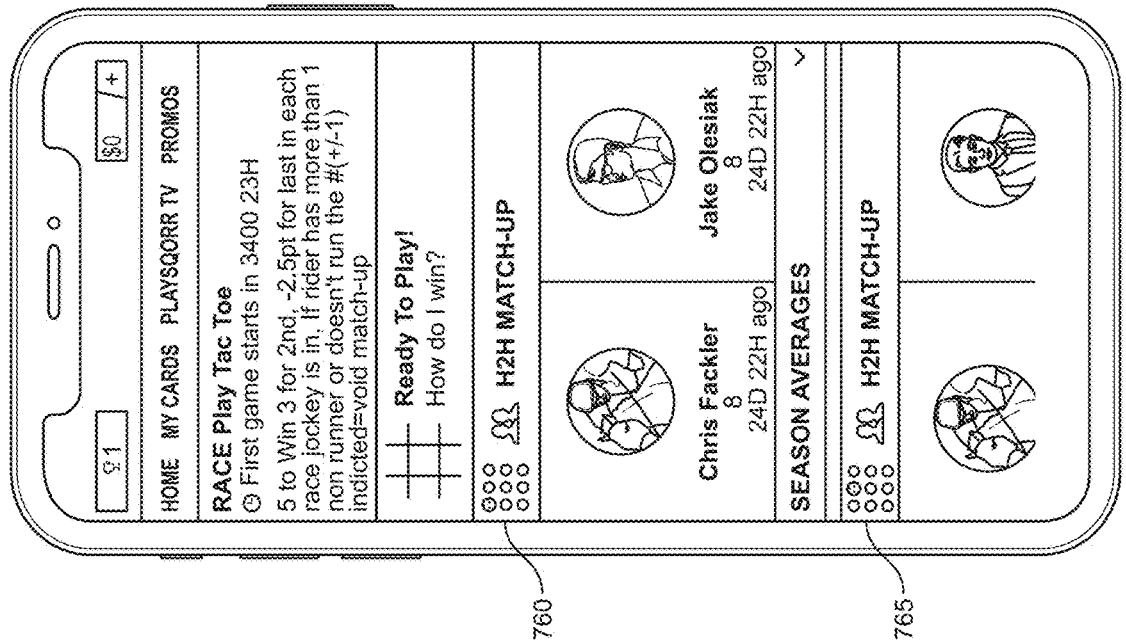
FIG. 7N shows an exemplary user interface screen, displayed on a presentation device of a user, presenting matchups included in a tic-tac-toe game, in accordance with an embodiment of the present invention.
Figure 7M:
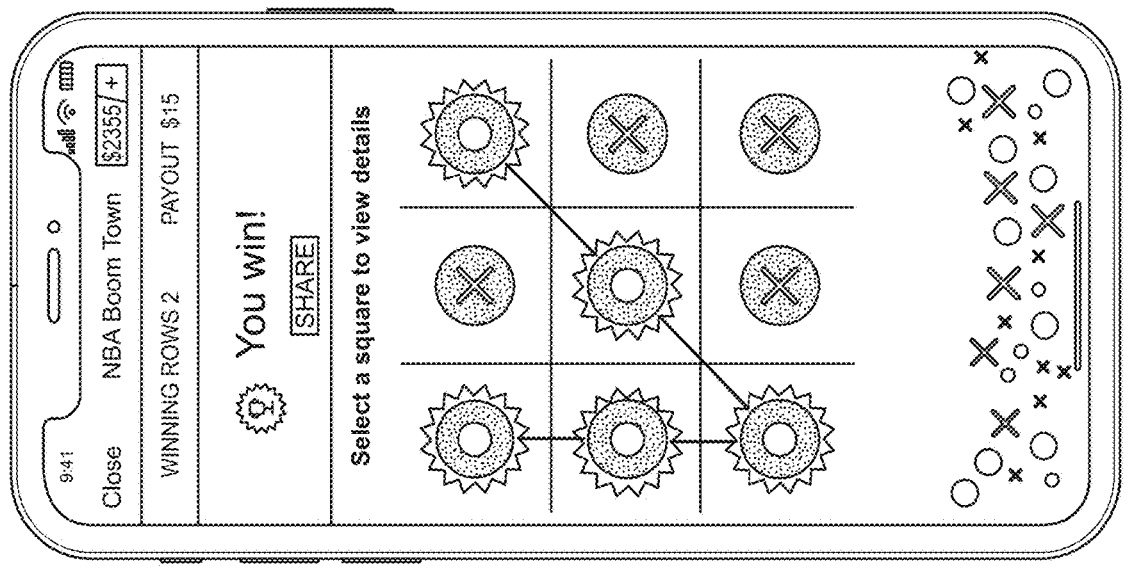
FIG. 7M shows the tic-tac-toe board of FIG. 7L, indicating winning rows that contain an "O" in each square therein.

FIG. 7M shows the tic-tac-toe board of FIG. 7L, indicating winning rows that contain an "0" in each square therein. In the indicated rows, for each square the user selected a winning result in the matchup or over/under associated with the respective square.

FIG. 7N shows an exemplary user interface screen, displayed on a presentation device of a user, presenting matchups included in a tic-tac-toe game, in accordance with an embodiment of the present invention. In FIG. 7N, two of the matchups included in the tic-tac-toe board are shown. For the first displayed matchup, the icon 760 in the upper-left of the screen indicates the position in the tic-tac-toe board in which the first matchup is associated. For the second displayed matchup, the icon 765 in the upper-left of the screen indicates the position in the tic-tac-toe board in which the second matchup is associated.

Figure 7O:
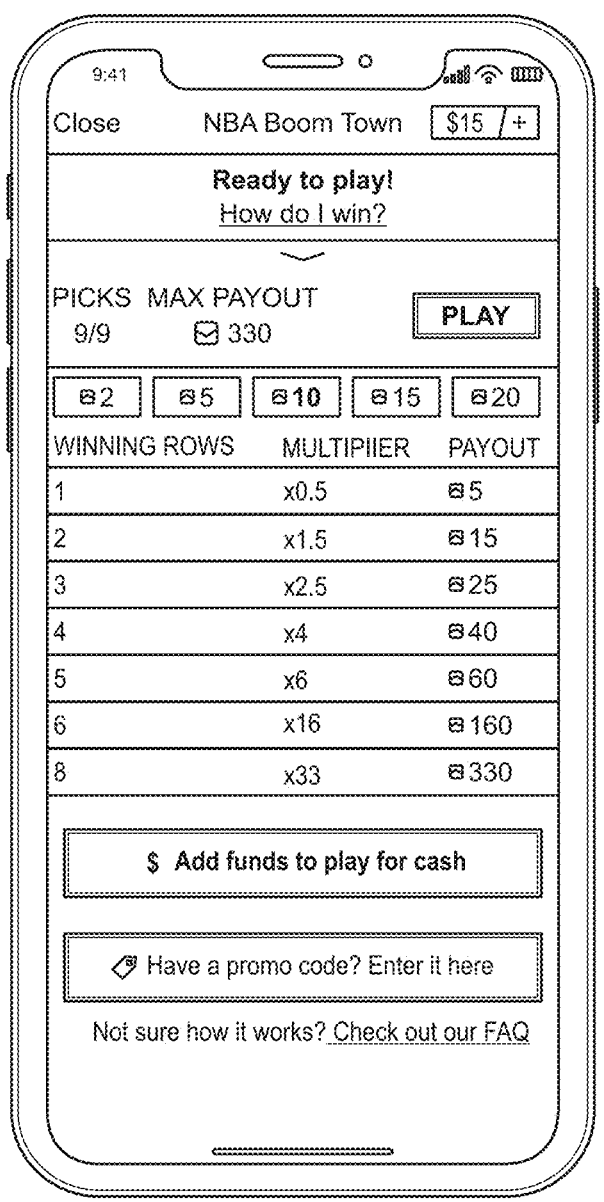
FIG. 7O shows the fixed payout for rows of winning squares in the tic-tac-toe board of FIG. 7J.

FIG. 7O shows the fixed odds payout for winning rows in the tic-tac-toe board of FIG. 7J. As shown in FIG. 7O, the fixed odds payout vary based on the user's number of winning rows in the tic-tac-toe game.

FIGS. 18A-18E shows a diamond dough screen, configured with a set of game components selected by a user, indicating various winning patterns that correspond to fixed odds payouts, in accordance with an embodiment of the present invention. Diamond dough is one type of array choice games provided by the platform of FIG. 2. The diamond dough game is also referred to as the "X's and O's" game. As in the other advanced choice games, in embodiments, the game components may include choices of winning athletes, teams, or other choices of outcome in an event. The screen layout of FIG. 18A includes a tic-tac-toe board, rotated for presentation as a diamond, in which each square is configured with the game component of a matchup or over-under. For example, in some embodiments, the user selects one of the squares and a user interface screen is displayed with a set of matchups from which the user may select one of the matchups to assign to that square. In other embodiments, the platform uses a random or algorithmic method for selection of the matchups for the squares of the diamond dough board. In some embodiments, the platform also uses a random or algorithmic method for determining the placement of the selected matchups into the squares of the diamond dough board. In some embodiments, more than the nine required squares of the diamond dough board are created for assignment with a matchup or over-under game.

The diamond dough and tic-tac-tac tough games may be won by forming successive defined "X" patterns, namely "pattern 1, pattern 2, pattern 3, pattern 4, pattern 5, each with a fixed odds payout or a dynamic fixed odds payout determined based on whether the game components form such pattern is a matchup (A vs B), parlay matchup (A vs B, A vs. C), or over-under.

Figure 18A:
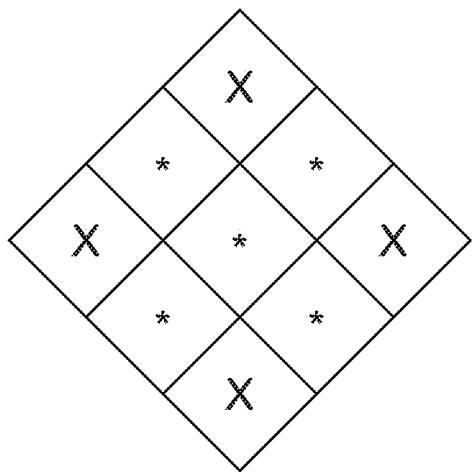
FIGS. 18A-18E shows a diamond dough screen, configured with a set of game components selected by a user, indicating various winning patterns that correspond to fixed odds payouts, in accordance with an embodiment of the present invention.

FIG. 18A shows an exemplary geometric pattern to win in the diamond dough game, in accordance with an embodiment of the present invention. Note that throughout FIGS. 18A-18E, "X" denotes success (i.e., user selected the winning participate of the matchup or over-under assigned to that square), while "*" denotes that the matchup or over-under assigned to that square has not yet been decided or failed. In some embodiments, for deciding progressive payouts, winning selections take precedence of non-winning selections. The winning pattern in FIG. 18A may be referred to as a "Four Bagger." In embodiments, this pattern provides a fixed odds payout at 10:1.

Figure 18B:
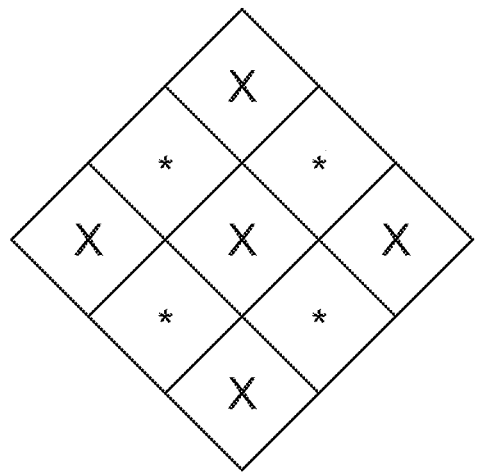

FIG. 18B shows another exemplary geometric pattern to win in the diamond dough game, in accordance with an embodiment of the present invention. The winning pattern of FIG. 18B may be referred to as a "Four Bagger Bullseye." In embodiments, this pattern provides a fixed odds payout at 20:1. This winning pattern requires the user to have selected the winning participate for the match-up or over-under assigned to the center square, which doubles the user's fixed odds payout relative to the "Four Bagger" pattern of FIG. 18A.

Figure 18C:
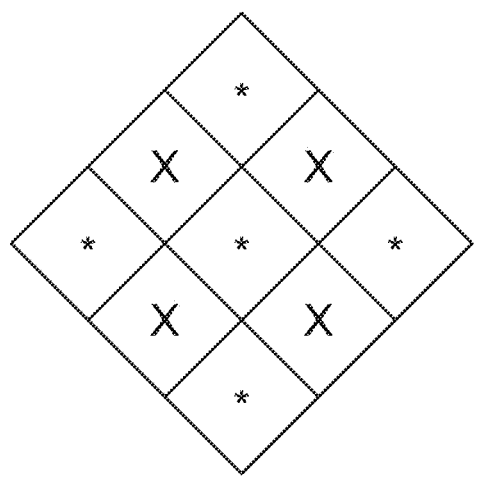

FIG. 18C shows a further exemplary geometric pattern to win in the diamond dough game, in accordance with an embodiment of the present invention. The winning pattern of FIG. 18C may be referred to as a "Four Gapper." In embodiments, this pattern provides a fixed odds payout at 10:1.

Figure 18D:
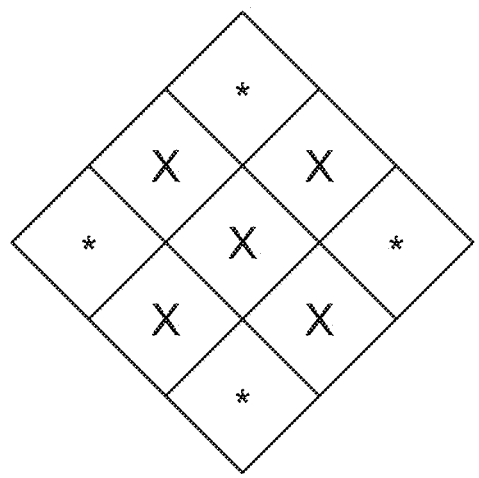

FIG. 18D shows another exemplary geometric pattern to win in the diamond dough game, in accordance with an embodiment of the present invention. The winning pattern of FIG. 18D may be referred to as a "Four Gapper Bullseye." In embodiments, this pattern provides a fixed odds payout at 20:1. This winning pattern requires the user to have selected the winning participate for the match-up or over-under assigned to the center square, which doubles the user's fixed odds payout relative to the "Four Gapper" pattern of FIG. 18C.

Figure 18E:
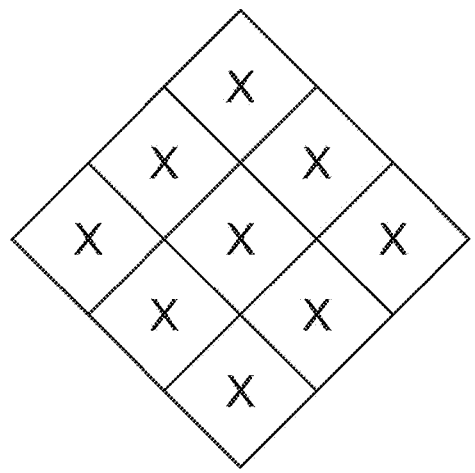

FIG. 18E shows a further exemplary geometric pattern to win in the diamond dough game, in accordance with an embodiment of the present invention. The winning pattern of FIG. 18E includes a winning match-up or over-under selection for each square of the game board (9/9 successful selections). In embodiments, this pattern provides a fixed odds payout at 200:1.

Figure 19A:
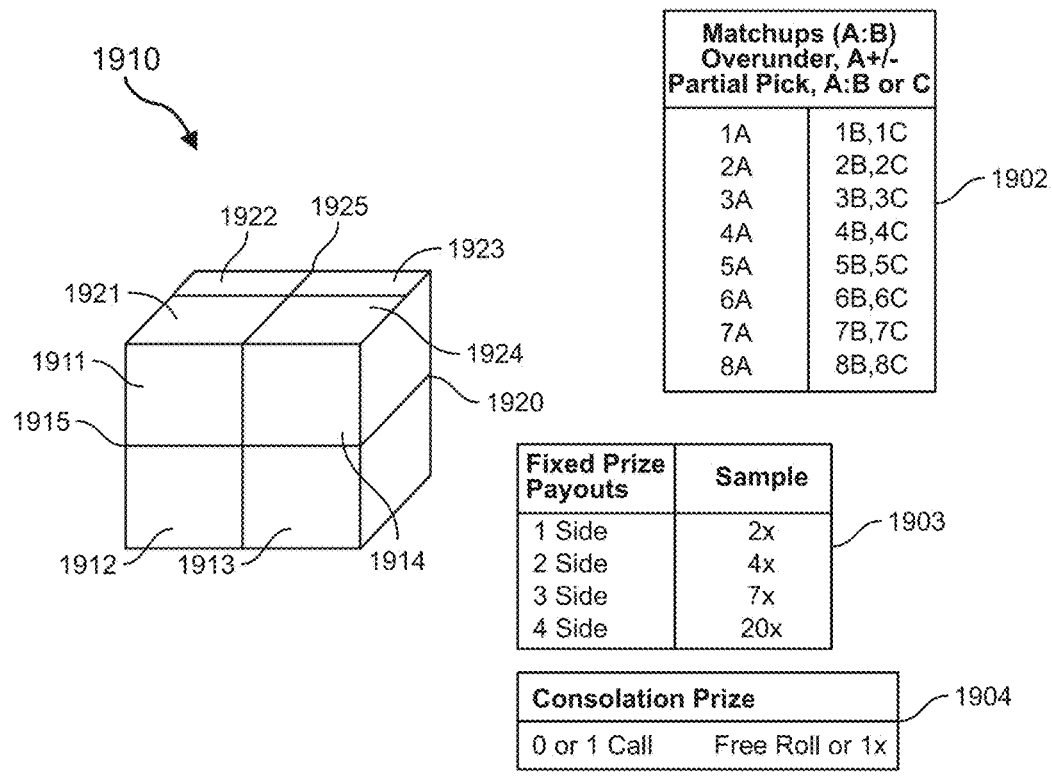
FIGS. 19A and 19B show an exemplary user interface screen, displayed on a presentation device of a user, presenting a 3D cube game that includes sets of matchups and over-unders, in accordance with an embodiment of the present invention.
Figure 19B:
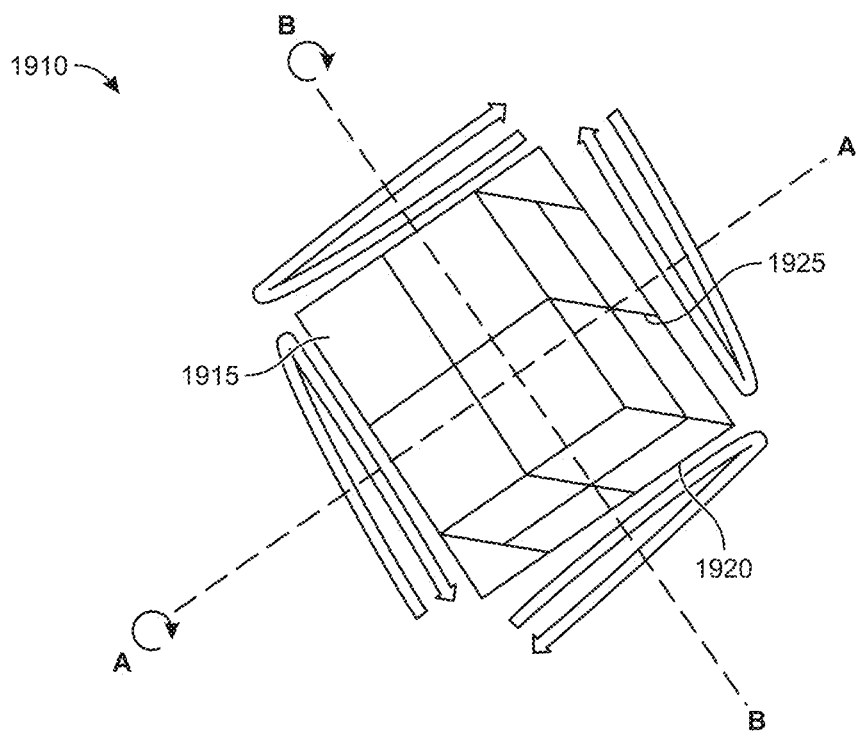

FIGS. 19A and 19B show an exemplary user interface screen, displayed on a presentation device of a user, presenting a 3D cube game that includes sets of matchups (regular and parlay), over-unders, and lottery plays in accordance with an embodiment of the present invention. In some embodiments, the 3D cube game is presented to the user in a 2-dimensional (2D) display and, in other embodiments, the 3D cube game is presented to the user in a 3D display, such as in an augmented reality or a virtual reality environment. The 3D cube game is one type of 3D advanced choice game or chance-based game provided by the platform of FIG. 2. As in the other games, in embodiments, the game components may include choices of winning athletes, teams, lottery plays, or other choices of outcome in an event. Some embodiments provide six options of athletes, teams, or other events for presenting in the 3D cube game.

In the embodiment of FIG. 19A, the game is configured through graphical interaction with a presented 3D cube 1910. The cube 1910 has six faces, including the faces 1915, 1920, 1925 shown in FIGS. 19A-19B. Each face is configured with a set of entries (shaped as squares). For example, face 1915 has the four entries 1911, 1912, 1913, 1914, and face 1925 has the four entries 1921, 1922, 1923, 1924. As shown in FIG. 19B, through the user interface game screen, the user can graphically interact with the 3D cube 1910, so as to rotate the 3D cube 1910 about the A and B axes to graphically display a set of the cube faces. In some embodiments, the user graphically chooses a subset of the displayed set of cube faces, thereby selecting the entries on the chosen subset of cube faces for use in playing the game. In other embodiments, the user selects individual entries on the display set of cube faces.

In the example of FIG. 19B, the cube 1910 is rotated to graphically display three cube faces 1915, 1920, 1925, and the user graphically chooses, from among the three displayed faces, a group of two faces 1915, 1925. The 8 (2×2×2) entries 1911, 1912, 1913, 1914, 1921, 1922, 1923, 1924 on the chosen two faces 1915, 1925 are, thereby, selected for use in playing the game. In some embodiments, such selection of the entries is made prior to determination of fixed odds payout rewards. Each of these selected entries 1911, 1912, 1913, 1914, 1921, 1922, 1923, 1924 is configured with the game component of a matchup, standard or parlay (partial pick) matchup, lottery play, or over-under, and a winning pick for that configured game component. In some embodiments, for each selected entry, the user interface game screen is displayed with a set of matchups or lottery plays from which the user may select one of the matchups or lottery plays to assign to that entry. In other embodiments, the platform uses a random or algorithmic method for selection of the game component for each entry of the chosen cube faces 1915, 1925.

In some embodiments, the entries are lottery plays. In such embodiments, each entry is a random or human made selection from a pool of possible selections. The winning selection is chosen at random from a pool of possible selections. The pool of selections can be unique to each entry or the same pool for the entire 3D chance-based game.

In one embodiment of the game, the fixed odds payouts are based on the number of faces that have all winning selections. For example, in FIG. 19A, for face 1915 to be a winner, entries 1911, 1912, 1913, and 1914 would all have to be winners. The fixed odds payout structure would be characterized for each amount of faces correct. For example, the payout structure could be: 1 correct face—1.5×; 2 correct faces—3.5×; 3 correct faces—6×; and all correct faces—15×. Such a payout structure is designed to be at a discount from a fair value based on the odds of winning each lottery play. I.e. based on the mathematical average, a percentage of prizes paid out will be less than 100% of the money taken in. The amount less than 100% is the particular discount from the fair value.

In this embodiment, the larger cube 1910 is made of 8 smaller cubes, each smaller cube having 3 faces. In the 2×2×2 embodiment shown in FIG. 19A, there are only prizes for 1, 2, 3, and 6 faces correct, because one could not have 4 correct faces without having all 6 correct faces. Each face of the smaller cube is indicative of the same entry, and thus the same selection of that entry. Therefore, for example, entry 1911 and 1921 are the same. Thus, there are 8 possible entries for a 3D game on a 2×2×2 cube. In skill-based embodiments each of the 8 entries could be a match-up, allowing the user to make a skill based selection of at least 2 possible choices. In a chance-based embodiment, each of the 8 entries could be a lottery play. In some embodiments, the lottery play has a user or computer select a random number or symbol from a pool, and then a winning number or symbol is drawn from a pool, wherein the entry is a winner if the selected number or symbol matches the winning number or symbol.

In embodiments of the 2×2×2, the cube is presented on a graphical user interface that allows a user to rotate the cube. The cube can also be rotated similar to a rubik's cube, such that only 1 full face is being rotated, along with half of the faces of 4 other faces (the half adjacent the 1 full face being moved). This allows the user to construct combinations of entries on various faces.

Table 1902 shows that for each of the selected entries, for example entry 1 1911, the user may select the game component for that entry as a matchup between participants 1A and 1B, a parlay matchup between participant 1A and participant 1B or 1C, or an over-under predicting participant 1A's performance will be over/under (+/−) a specified score. For each selected game component, the user further selects a winning pick, such as the winning participant 1A or 1B in the case that the entry 1 1911 was configured as a matchup.

By such graphical interaction rotating the displayed 3D cube, the user may select from numerous permutations of entries for playing the game. In some embodiments, the user may select multiple games formed by different permutations of the faces of the 3D cube, which may be played together.

In some embodiments, to win the game, the user's winning selections must form one of a set of defined patterns among the selected entries. In some embodiments, a defined pattern is all of the entries on one or more of the selected cube faces. In some embodiments, each defined pattern is assigned a fixed odds payout for a reward (cash, token, promotion, etc.) for the user, which may be based on the types of game components (e.g., matchup, parlay matchup, lottery play, and/or over-under) used in the entries forming the defined pattern. In some embodiments, a set of successive patterns are defined, with each successive pattern assigned a corresponding fixed odds payout. In some embodiments, as shown in table 1903 of FIG. 19A, the fixed odds payout may be determined based on the number of selected cube faces. In some embodiment, as shown in FIG. 19A, the user may be awarded a consolation prize 1904, such as a free game, by making a winning pick in the game component of one of the selected entries. FIG. 19A shows that in embodiments of the 3D cube game, as in the other advanced choice games, the fixed odds payout may be simple fixed odds payout, a fixed odds progressive payout, a dynamic fixed odds payout, and a dynamic fixed odds progressive payout. All the embodiments described in FIG. 19A can also be used for a chance-based game.

In some embodiments, if the user's winning picks do not form a defined pattern for winning the game, a color scheme (e.g., red) is applied to the losing picks, a color scheme (e.g., green) is applied to the winning picks, or both. The picks with the same applied color scheme are positioned together on a single cube face and a reward (cash, token, promotion, free game, etc.) may awarded based on the picks forming a defined pattern on the single cube face. In some embodiments, the user may purchase the application of such color scheme using token, cash, promotions, etc.

Figure 19C:
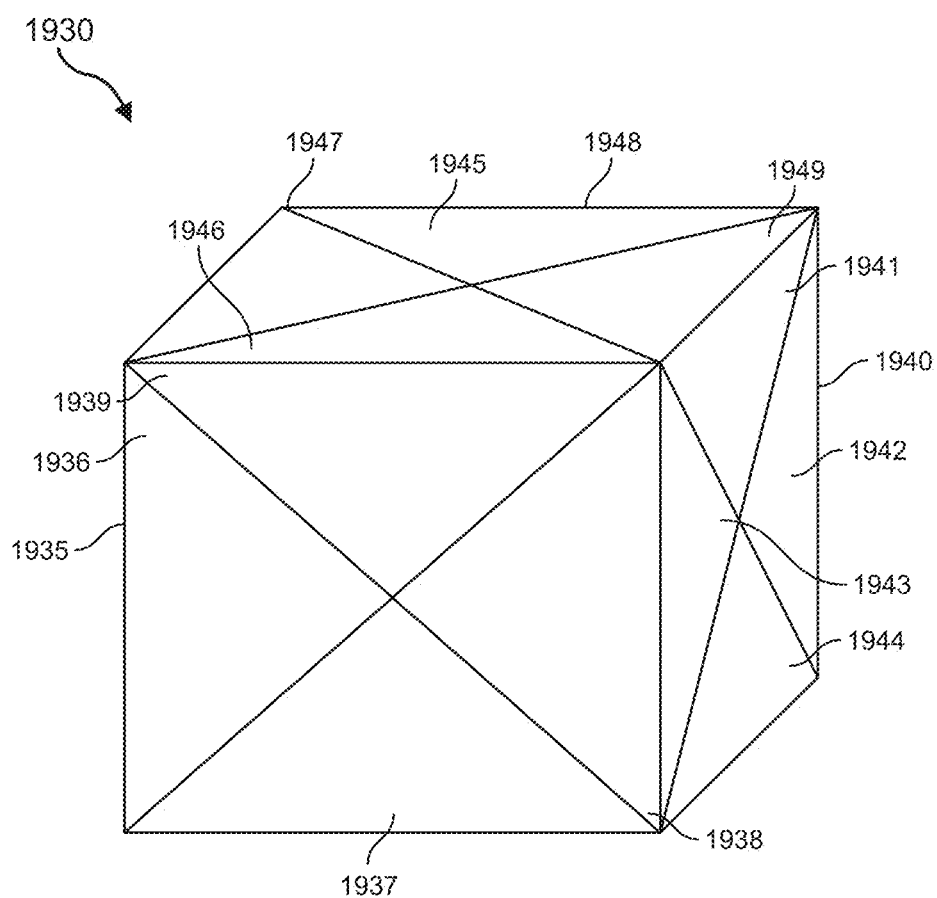
FIGS. 19C and 19D show an exemplary user interface screen, displayed on a presentation device of a user, presenting another 3D cube game that includes sets of matchups and over-unders, in accordance with an embodiment of the present invention.
Figure 19D:
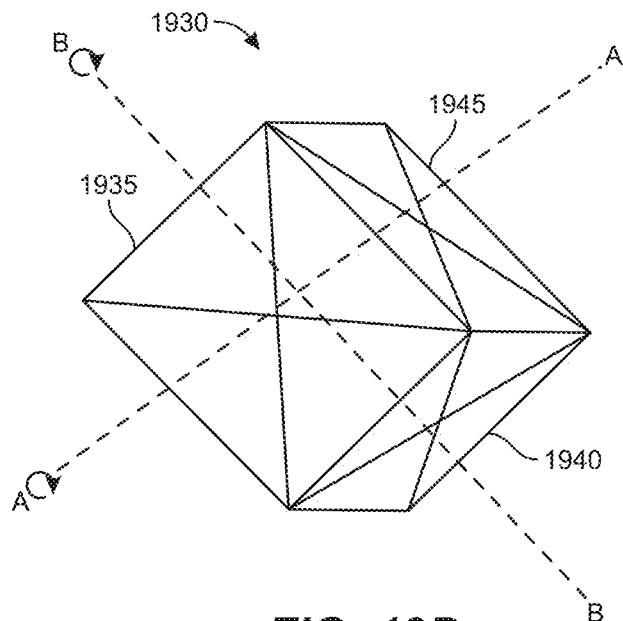

FIGS. 19C and 19D show an exemplary user interface screen, displayed on a presentation device of a user, presenting another 3D cube game that includes sets of matchups (regular and parlay) and over-unders, in accordance with an embodiment of the present invention. In some embodiments, the 3D cube game is presented to the user in a 2-dimensional (2D) display and, in other embodiments, the 3D cube game is presented to the user in a 3D display, such as in an augmented reality or a virtual reality environment. The 3D cube game is one type of 3D advanced choice game provided by the platform of FIG. 2. As in the other advanced choice games, in embodiments, the game components may include choices of winning athletes, teams, or other choices of outcome in an event. Some embodiments provides six options of athletes, teams, or other events for presenting the 3D cube game.

In the embodiment of FIG. 19C, the game is configured through graphical interaction with a presented 3D cube 1930. The cube 1930 has six faces, including the faces 1935, 1940, 1945 shown in FIG. 19C. Each face is configured with a set of entries (shaped as triangles). For example, face 1935 has the four entries 1931, 1932, 1933, 1934, face 1940 has the four entries 1941, 1942, 1943, 1944, and face 1940 has four entries 1946, 1947, 1948, 1949. As shown in FIG. 19D, through the user interface game screen, the user can graphically interact with the 3D cube 1930, so as to rotate the 3D cube 1930 about the A and B axes to graphically display a set of the cube faces. In some embodiments, the user graphically chooses a subset of the displayed set of cube faces, thereby selecting the entries on the chosen subset of cube faces for use in playing the game. In other embodiments, the user selects individual entries on the display set of cube faces.

In the example of FIG. 19D, the cube 1930 is rotated to graphically display three cube faces 1935, 1940, 1945, and the user chooses a group consisting of all three faces 1935, 1940, 1945. The 12 entries 1931, 1932, 1933, 1934, 1941, 1942, 1943, 1944, 1946, 1947, 1948, 1949 on the chosen three faces 1935, 1940, 1945 are, thereby, selected for use in playing the game. In some embodiments, such selection of the entries is made prior to determination of fixed odds payout rewards. Each of these selected entries 1931, 1932, 1933, 1934, 1941, 1942, 1943, 1944, 1946, 1947, 1948, 1949 is configured with the game component of a matchup, standard or parlay (partial pick) matchup, or over-under, and a winning pick for that configured game component. In some embodiments, for each selected entry, the user interface game screen is displayed with a set of matchups from which the user may select one of the matchups to assign to that entry. In other embodiments, the platform uses a random or algorithmic method for selection of the game component for each entry of the chosen cube faces 1935, 1940, 1945.

In some embodiments, to win the game, the user's winning picks must form one of a set of defined patterns among the selected entries. In some embodiments, a defined pattern is all of the entries on one or more of the selected cube faces. In some embodiments, each defined pattern is assigned a fixed odds payout for a reward (cash, token, promotion, free game, etc.) to the user, which may be based on the types of game components (e.g., matchup, parlay matchup, and/or over-under) configured in the entries forming the defined pattern. In some embodiments, a set of successive patterns are defined, with each successive pattern assigned a corresponding fixed odds payout. In embodiments of the 3D cube game of FIGS. 19C-19D, as in the other advanced choice games, the fixed odds payout may be simple fixed odds payout, a fixed odds progressive payout, a dynamic fixed odds payout, and a dynamic fixed odds progressive payout. In some embodiments, the fixed odds payout is fixed and fixed progressive based on the number of selected faces. In embodiments, the platform provides the 3D cube game, together with prizing, risk management, and services, to multiple clients.

In some embodiments, if the user's winning picks do not form a defined pattern for winning the game, a color scheme (e.g., red) is applied to the losing picks, a color scheme (e.g., green) is applied to the winning picks, or both. The picks with the same applied color scheme are positioned together on a single cube face and a reward (cash, token, promotion, free game, etc.) may be awarded based on the picks forming a defined pattern on the single cube face. In some embodiments, the user may purchase the application of such color scheme using token, cash, promotions, etc.

Figure 19E:
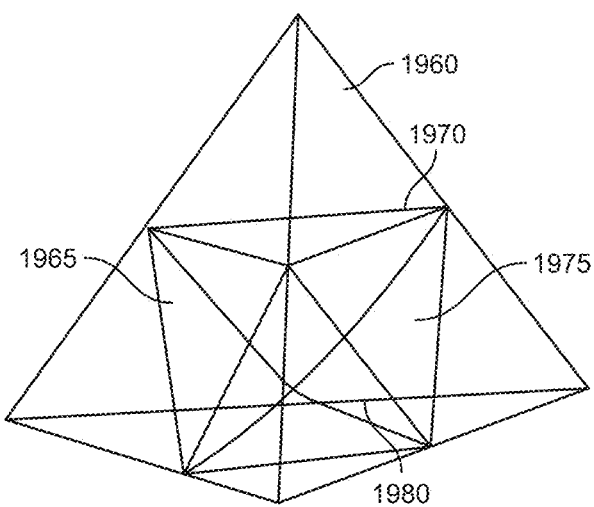
FIG. 19E shows an exemplary user interface screen, displayed on a presentation device of a user, presenting a 3D pyramid game that includes sets of matchups and over-unders, in accordance with an embodiment of the present invention.

FIG. 19E shows an exemplary user interface screen, displayed on a presentation device of a user, presenting a 3D pyramid game that includes sets of matchups (regular and parlay) and over-unders, in accordance with an embodiment of the present invention. In some embodiments, the 3D pyramid game is presented to the user in a 2-dimensional (2D) display and, in other embodiments, the 3D pyramid game is presented to the user in a 3D display, such as in an augmented reality or a virtual reality environment. The 3D pyramid game is one type of 3D advanced choice game provided by the platform of FIG. 2. As in the other advanced choice games, in embodiments, the game components may include choices of winning athletes, teams, or other choices of outcome in an event.

In the embodiment of FIG. 19E, the game is configured through graphical interaction with a set of displayed 3D pyramids 1960, 1965, 1970, 1975, 1980. The pyramids include a base pyramid 1960 with four smaller pyramids 1965, 1970, 1975, 1980 positioned within the base pyramid 1960. In some embodiments, the base pyramid and three of the smaller pyramids have three sides, which each function as a game entry, and one of the smaller pyramids has four sides, which are function as a game entry.

As shown in FIG. 19E, through the user interface game screen, the user can graphically interact with the 3D pyramids 1960, 1965, 1970, 1975, 1980 so as to choose a subset of the 3D pyramids, thereby selecting the entries on the chosen subset of pyramids for use in playing the game. In other embodiments, the user can graphically interact with the 3D parameters so as to select one entry (face) from each of a subset of the pyramids 1960, 1965, 1970, 1975, 1980. In some embodiments, such selection of the entries is made prior to determination of fixed odds payout rewards. Each of these selected entries is configured with the game component of a matchup, standard or parlay (partial pick) matchup, or over-under, and a winning pick for the configured game component. In some embodiments, for each selected entry, the user interface game screen is displayed with a set of matchups from which the user may select one of the matchups to assign to that entry. In other embodiments, the platform uses a random or algorithmic method for selection of the game component for each entry of the selected pyramids.

In some embodiments, to win the game, the user's winning picks must form one of a set of defined patterns among the selected entries. In some embodiments, a defined pattern is all of the entries on one or more of the selected pyramids. In some embodiments, each defined pattern is assigned a fixed odds payout for a reward (cash, token, promotion, free game, etc.) to the user, which may be based on the types of game components (e.g., matchup, parlay matchup, and/or over-under) configured in the entries forming the defined pattern. In some embodiments, a set of successive patterns are defined, with each successive pattern assigned a corresponding fixed odds payout. In embodiments of the 3D pyramid game of FIG. 19E, as in the other advanced choice games, the fixed odds payout may be simple fixed odds payout, a fixed odds progressive payout, a dynamic fixed odds payout, and a dynamic fixed odds progressive payout. In some embodiments, the fixed odds payout is fixed and fixed progressive based on the number of faces (entries) on the selected pyramids. For example, the fixed odds payout may increase based on the number of pyramids or pyramids entries included in the game.

FIG. 8 shows a ranking array screen layout for presenting matchups and over-unders selectable by a user, in accordance with an embodiment of the present invention. The screen layout of FIG. 8 includes an arrow, in which each square in the array be configured with a matchup or over-under. The matchup may be an over-under matchup or a parlay match. To configure a square, in some embodiments, the user selects the square and a user interface screen is displayed with a set of game components, such as matchups, over-unders, or a mix of matchups and over-unders from which the user may select one. In other embodiments, the platform uses a random or algorithmic method for selection of the matchups, over-unders, or mixed matchups and over-unders games for the squares of the array. In some embodiments, the platform also uses a random or algorithmic method for determining the placement of the selected games into the squares of the array.

Once a square associated with a matchup, selecting the square displays a user interface screen of the matchup, and the user can select one of the participants to win the matchup. Once a square associated with a parlay matchup, selecting the square displays a user interface screen of the parlay, and the user can select from among multiple participants to pair against a first participant in a matchup. Once a square is associated with an over-under, selecting the square displays a user interface screen of the over-under, and the user can select whether the actual score of a specified participant will be over or under a presented score.

Once each square in row is associated with a selected matchup or a selected over-under, the user then ranks each square in the row. For example, the user sequentially assigns a value (1, 2, 3, etc.) to each square in the row to indicate expect first, second, third, etc. place performance of its associated matchup/over-under against the performance of the associated matchups/over-unders of the other squares in the row. For example, the user may rank: in row 1 that square 1A to have a higher score than 1B and 1C; in row 2 that square 2C will have a higher score than 2A and 2B; and in row 3 that square 3B will have a higher score than 3A and 3B.

In embodiments, the user selects which participant player or participant team will have the best risk adjusted prediction of performance based on fantasy or performance or of total points scored for the team. The score may be a calculated marginal score, such that the user specifies its own score and the squares are ranked based on highest (1), next (2), and lowest (3) with respect to that score.

In some embodiments, a fixed odds payment is awarded with respect to the ranking array, such that winning on all matchups in a row and correctly ranking the matchups is a 25-1 payout. In some embodiments, a fixed odds progress payment is awarded. For example, the payout may be as follows. Winning on all three matchups in a row and ranking them all correcting may result in a 15-1 payout. Winning on all three matchups in a row but only ranking of the three correctly may result in a 3-1 payout. Winning on all three matchups in a row but ranking none correctly may result in a free game.

Figure 9A:
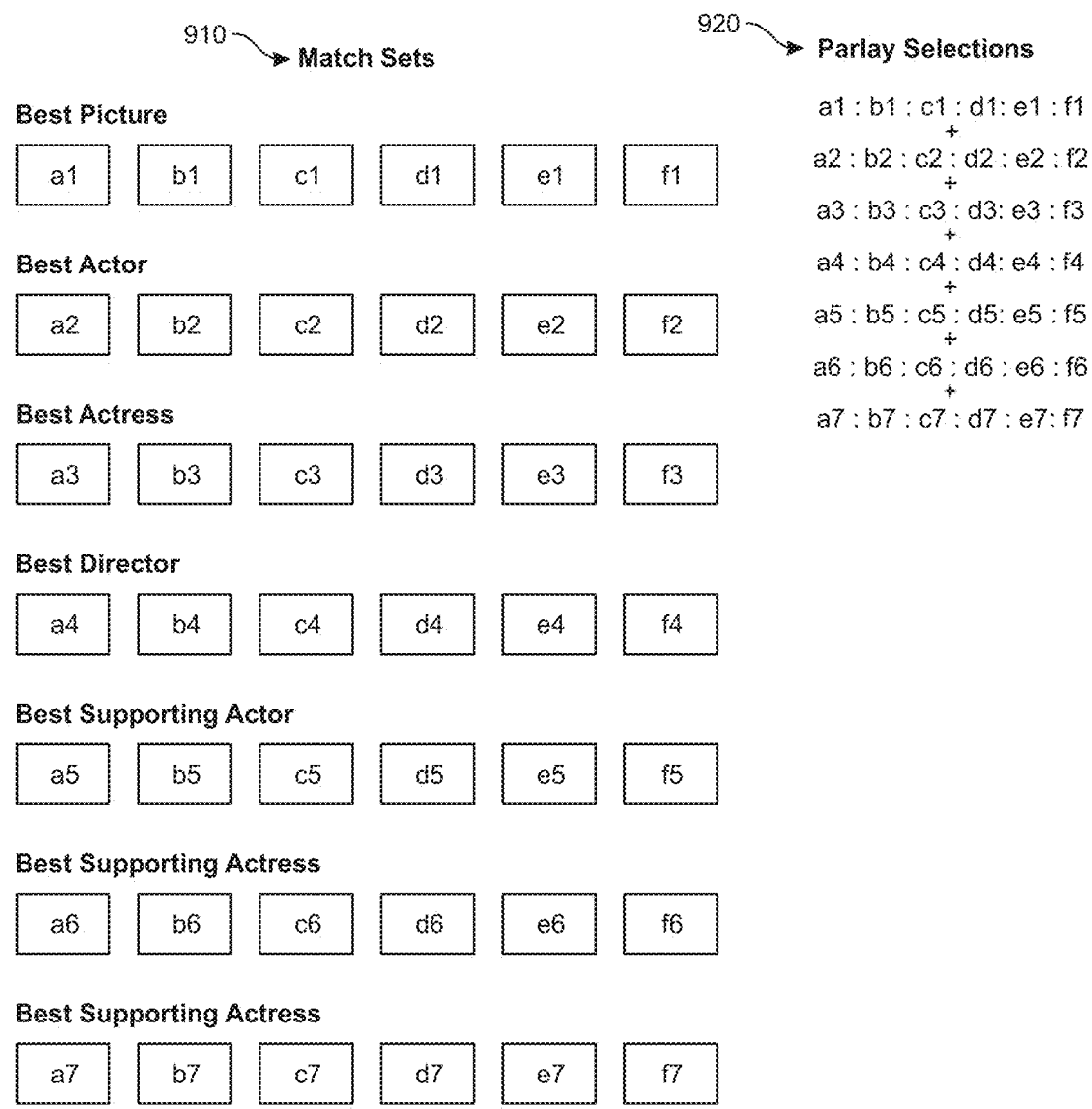
FIG. 9A shows a categories screen layout for presenting categories of participants selectable by a user, in accordance with an embodiment of the present invention.

FIG. 9A shows a categories screen layout for presenting categories of participants selectable by a user, in accordance with an embodiment of the present invention. In the example game shown in FIG. 9A, the matchup categories are for an entertain event, the Academy Awards. The user interface screen includes an area 910 presenting categories matchup sets selectable by a user. For example, the area 910 include the matchup category "Best Pictures" with the participant choices a1 through f1. The area 920 also includes the matchup category "Best Actor" with the participant choices a2 through f2. The user interface screen also includes an area 920 summarizing the matchup choices for each displayed category. A fixed odds payout is awarded based on the number of categories in which the user chooses to make participant selections.

Figure 9B:
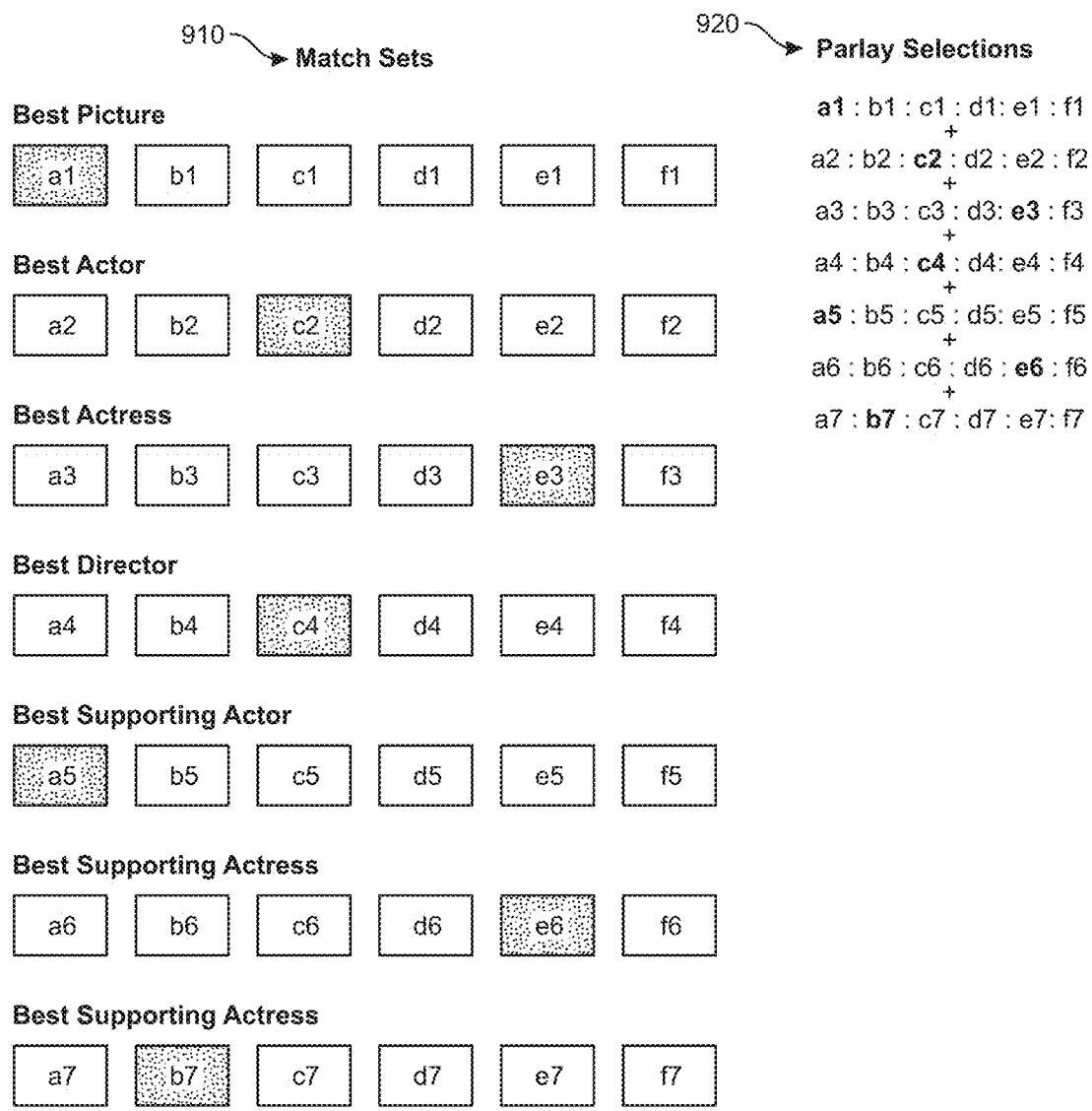
FIG. 9B shows the categories screen layout of FIG. 9A, with a user's selections for each of the presented categories, in accordance with an embodiment of the present invention

FIG. 9B shows the categories screen layout of FIG. 9A, with a user's selections for each of the presented categories, in accordance with an embodiment of the present invention. The screen of FIG. 9B shows that the user selected to play each matchup category. For example, the user selected participant a1 in the matchup category of "Best Picture" and participant c2 in the matchup category of "Best Actor." The summary area 920 of the screen shows the user's selections for each matchup category in bold.

Figure 9C:
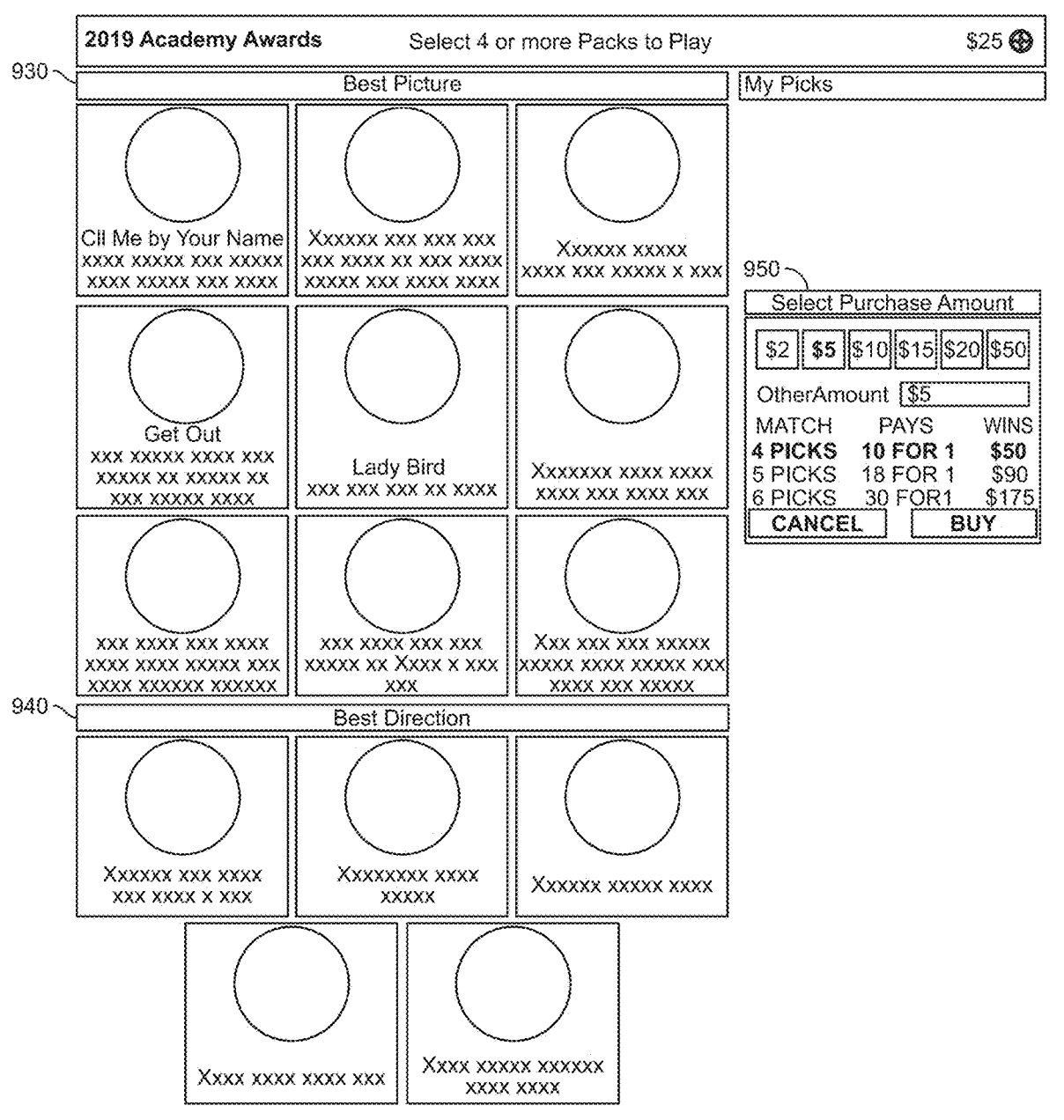

FIG. 9C shows an exemplary user interface screen, displayed on a presentation device of a user, based on the layout of FIG. 9A, showing the categories selected by the user. FIG. 9C shows that that the user selected four matchup categories to play in a game, and displays two of the four matchup categories ("Best Picture" and "Best Director"). The area 950 on the screen of FIG. 9C shows the user's purchase amount and fixed odds payout for the user's four-category selection.

FIG. 9D shows an exemplary user interface screen, displayed on a presentation device of a user, based on the layout of FIG. 9B, showing a participant selected by the user in each selected category. For example, in the user-selected category of "Best Picture," the screen shows that the user selected the participant of "Lady Bird" and in the user-selected category of "Best Director," the screen shows that the user selected the participant of "Christoper Nolan." The user's selections are summarized in the area 960 of the screen.

FIG. 10A shows an exemplary user interface screen, displayed on a presentation device of a user, presenting a set of matchups with participant selections related to an election, according to an embodiment of the present invention. The user interface screen of FIG. 10A includes ten Election games 1002, including 1. President electoral, 2. President popular, 3. Senate, etc. Each Election game 1002 corresponds to a matchup 1004 that includes a selection between two participants. In some embodiments, the matchup is a parlay matchup. For example, the Election game 1. President electoral corresponds to a matchup between the participants of the Republican candidate's vote percentage and the Democrat candidate's vote percentage. The user may select which of the ten election games to play and then select a winning participate for each of the corresponding matchups. For example, the user may select to play the Election game 1. President electoral and select the Republican candidate's vote percentage as the winning participant for the corresponding matchup. A fixed odds payout may be awarded based on the number of matchups in which the user chooses to make participant selections.

FIG. 10B shows an exemplary user interface screen, displayed on a presentation device of a user, presenting a set of over-under with selections related to an election, according to an embodiment of the present invention. The user interface screen of FIG. 10B includes the same ten Election games 1002 as FIG. 10A. However, in FIG. 10B, each Election game 1002 corresponds to an over-under 1006 that includes a selection of whether a specified participant will go over or under a specified value. For example, the Election game 1. President electoral corresponds to an over-under that includes a selection of whether the specified Republican or Democrat candidate will go over or under a specified poll value. The user may select which of the ten election games to play and then select whether the specified participant will go over or under the specified value. For example, the user may select to play the Election game 1. President electoral and select the specified Republican or Democrat candidate will go over the specified poll value. A fixed odds payout may be awarded based on the number of over-unders in which the user chooses to make participant selections. In some embodiments, the Election games 1002 correspond to a mix of matchups and over-unders.

Figure 10C:
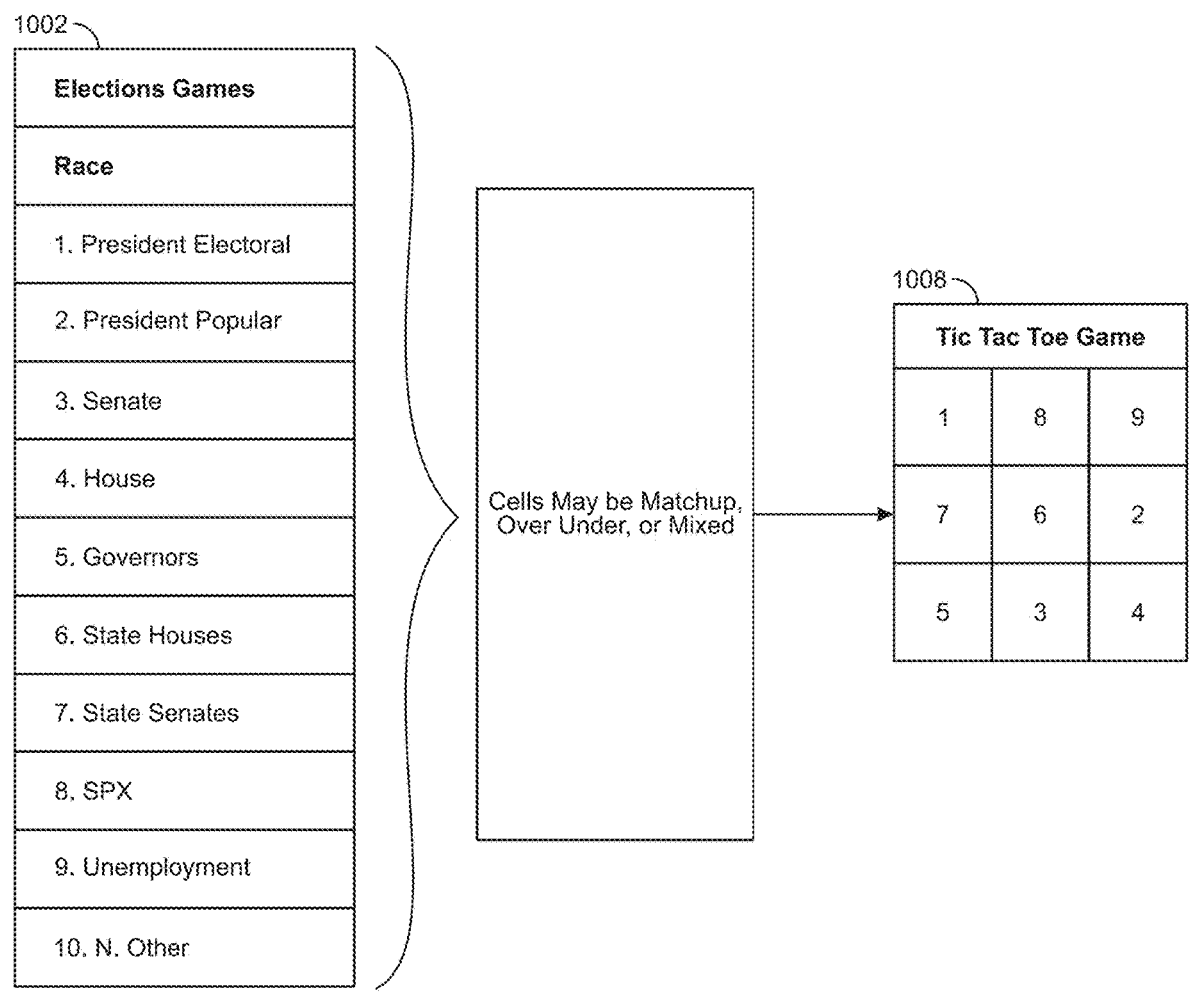
FIG. 10C shows an exemplary user interface screen, displayed on a presentation device of a user, presenting a tic-tac-toe board with selections related to an election, according to an embodiment of the present invention.

FIG. 10C shows an exemplary user interface screen, displayed on a presentation device of a user, presenting a tic-tac-toe board with selections related to an election, according to an embodiment of the present invention. The user interface screen of FIG. 10B includes the same ten Election games 1002 as FIGS. 10A and 10B. In the screen of FIG. 10C, each of the games 1002 correspond to a square (cell) in a tic-tac-toe board 1008. For example, square 1 corresponds to 1. President electoral, square 2 corresponds to 2. President popular, etc. Each of the square in the tic-tac-toe board 1008 is associated with a matchup or over-under that corresponds to the electoral game of that square. For example, square 1 corresponds to Election game 1. President electoral and is associated with a matchup or over-under for the President electoral game. For example the square may be associated with the matchup that corresponds to the Election game 1. President electoral in FIG. 10A or be associated the over-under that corresponds to the Election game 1 in FIG. 10B.

For each of the squares, the user selects a winning participate (if the square is a matchup) or whether the specified participant will go over or under a specified value (if the square is an over-under). The fixed odds payout may be awarded based on the user's number of winning rows in the tic-tac-toe board 1008.

Figure 10D:
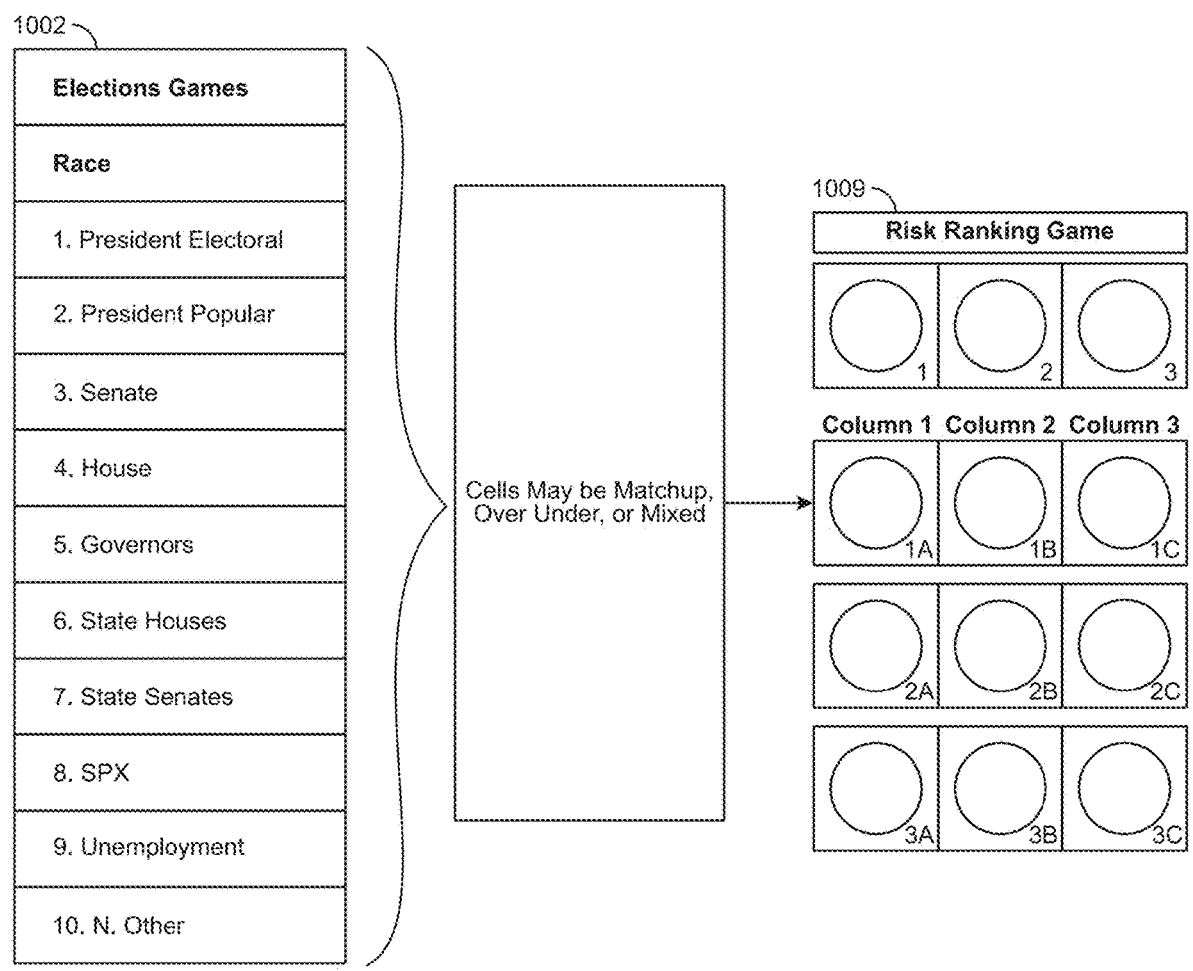
FIG. 10D shows an exemplary user interface screen, displayed on a presentation device of a user, presenting a ranking array with selections related to an election, according to an embodiment of the present invention.

FIG. 10D shows an exemplary user interface screen, displayed on a presentation device of a user, presenting a ranking array with selections related to an election, according to an embodiment of the present invention. The user interface screen of FIG. 10B includes the same ten Election games 1002 as FIGS. 10A, 10B, and 10C. In the screen of FIG. 10D, each of the games 1002 correspond to an entry (cell) in a ranking array 1009. For example, entry 1A may correspond to 1. President electoral, square 1B may correspond to 2. President popular, etc. Each of the entries in the ranking array 1009 is associated with a matchup or over-under that corresponds to the electoral game of that entry. For example, entry 1 corresponds to Election game 1. President electoral and is associated with a matchup or over-under for the President electoral game. For example, the entry may be associated with the matchup that corresponds to the Election game 1. President electoral in FIG. 10A or be associated the over-under that corresponds to the Election game 1 in FIG. 10B.

For each of the entries, the user selects a winning participate (if the square is a matchup) or whether the specified participant will go over or under a specified value (if the square is an over-under) and ranks the selections of each of the entries. The fixed odds payout may be awarded based on the user's number and ranking of winning rows in the ranking array 1009.

Figure 20:
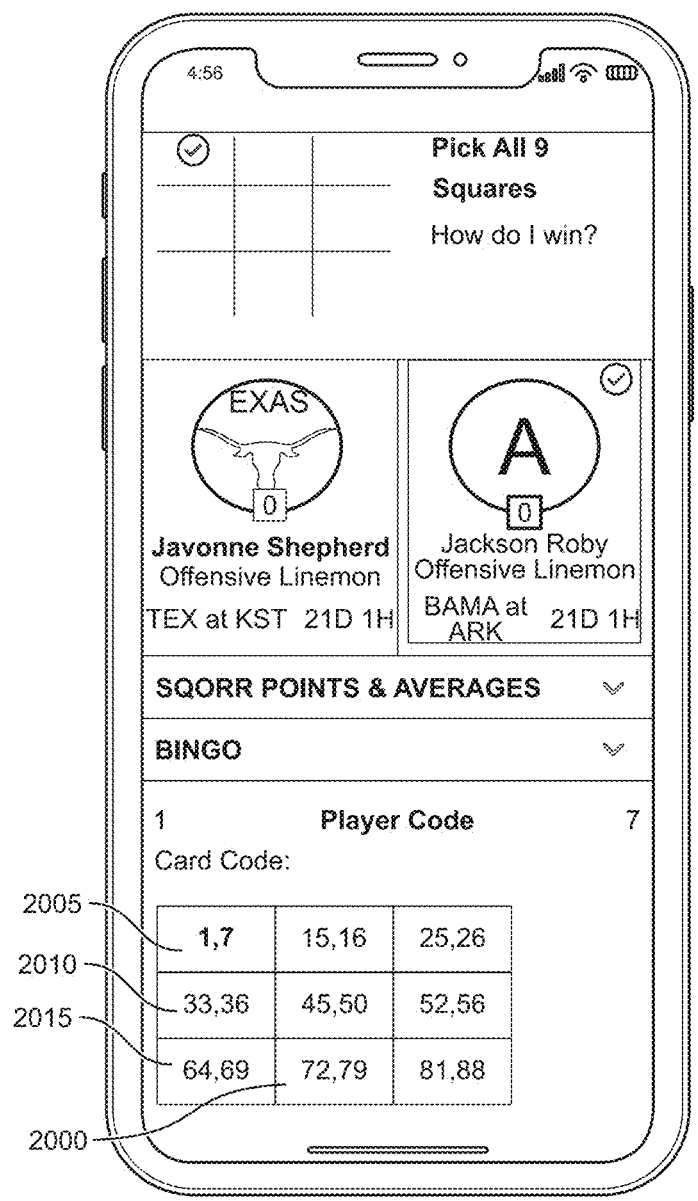
FIG. 20 is a user interface screen, displayed on a presentation device of a user, presenting a skill-based game for play in bingo format, in accordance with an embodiment of the present invention.

FIG. 20 is a user interface screen, displayed on a presentation device of a user, presenting a skill-based game for play in bingo format, in accordance with an embodiment of the present invention. In some embodiments, the skill-based game is an array choice game, such as the tic-tac-toe game shown in FIGS. 7A-7O or the x's and o's game shown in FIGS. 18A-18E. In some embodiments, the skill-based game is a 3D advanced choice game, such as the 3D cube game shown in FIGS. 19A-19D or the 3D pyramid game shown in FIG. 19E. Other embodiments, the skill-based game may be another type of advanced choice game.

FIG. 20 shows an array of entries 2000 in a skilled-based game. The array of entries 2000 may comprise an array choice game, or may comprise the entries positioned on a set of faces of a displayed object in a 3D advance choice game. The array of entries 2000 in FIG. 20 has 9 entries, including entries 2005, 2010, and 2015. A game component (e.g., matchup, parlay matchup, or over-under) is selected for each entry of the array of entries. The selected game components may include athletes, teams, or other choices of outcome in an event. The selected game component for each of the array of entries 2000 is assigned a generated random number (card code), resulting in a mathematically unique card. For example, in FIG. 20, the game component selected for entry 2005 is assigned the card code "1"; the game component selected for entry 2010 is assigned the card code "33"; and the game component selected for entry 2015 is assigned the card code "64".

For each of the selected game components of the array of entries 2000, a winning participant is chosen for such game component. For example, if the game component is a matchup, one of the pair of participants (e.g., athletes, teams, etc.) is chosen as the predicted winning participant for the matchup. In some embodiments, the predicted winning participant is chosen by the user and, in other embodiment, the predicted winning participant is randomly chosen by the platform for the user. Each chosen winning participant is also assigned a random number (player code). For example, in FIG. 20, the predicted winning participant chosen for the selected game component of entry 2005 is assigned the player code "7"; the winning participant chosen for the selected game component of entry 2010 is assigned the player code "36"; and the winning participant chosen for the selected game component of entry 2015 is assigned the player code "69".

The platform selects a game component and determines the actual winning participant for such game components, which causes the entry assigned the card code corresponding to the selected game component and the player code corresponding to the actual winning participant to be a winning entry. The winning entry is marked on the user interface in the manner of a bingo card. As shown in FIG. 20, the game component corresponding to card code "1" and the participant corresponding to player code "7" are determined by the platform, which causes the entry 2005, assigned to this card code and player code, to be marked as a winning entry. Winning the game is achieved by the winning entries of the array forming a defined pattern, such as a row, column, perimeter, etc. of the array. Each pattern may be assigned a fixed odds payout as described herein. Presenting advanced choice games in this matter is consistent with requirements, in the art, for Class II games.

Figure 11A:
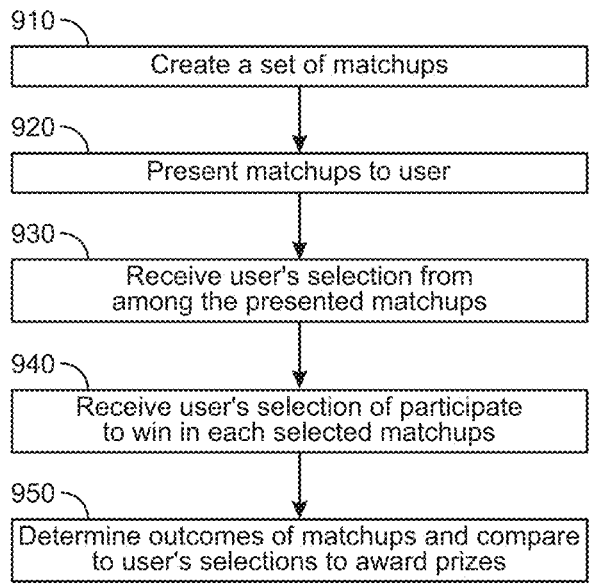
FIG. 11A is a flow chart illustrating a method of presenting a matchup to a user, according to an embodiment of the present invention.

FIG. 11A is a flow chart illustrating a method of presenting a matchup to a user, according to an exemplary embodiment of the invention. In embodiments, the method of FIG. 11A is executed by the activity server of FIG. 2 or the system of FIG. 3. In this method, a first process 910 creates a set of matchups. Examples of such matchups are shown in FIGS. 4A-4D.

In some embodiments, each matchup of the set of matchups includes a pair of event or activity participants. It will be appreciated by a person of ordinary skill that the event or activity may be any number of actual sports, games, other competitions, or any other form of entertainment activity or other event. The pair of participants may be teams or individual players in the event or activity.

As one example, a matchup may comprise a matchup of two football players relative to their participation in one or more football games that those players are playing in (the players may be playing in the same or different games). The matchups may match players based upon various criteria, such as playing position, etc. In one embodiment, the matchup may match two or more participants against two or more other participants. For example, a matchup may pit a first quarterback and running back pairing (the players may be on the same team or different teams and be playing the in the same or different games) against a second quarterback and running back pairing. Additionally, groups of more than two participants, such as three, four, or even more participants or players may be utilized in the matchups. Further, it is possible for the number of first participants in a matchup to be different than the number of second participants. For example, a matchup may pit a quarterback and a running back pairing against a second quarterback, a second running back, and wide receiver. In order for the user to win, the user must select the winning athlete of a match based on the fantasy points that are scored during an event. The fantasy point may include a handicap or biased value.

In accordance with one embodiment of the present invention, the participants of each side of a matchup are preferably pre-selected in a manner that they are closely or evenly matched with reference to an expected outcome. The matchups may be predetermined by a professional odds-maker or an odds-maker in conjunction with an automated process based upon statistical analysis.

The advantage of having evenly matched participants in a given matchup is so that the activity, including the outcome thereof (e.g., whether the user is a winner or loser), will require a significant amount of skill or knowledge from the user. First, the user will use their skill in attempting to pick those matchups, which if uneven, the user is more likely to select the winner of those matchups. As to selected matchups which appear to be even, skill is involved in the user attempting to predict the winner of the matchup (e.g. if the matchup is uneven, such as where a very good player is pitted against a very bad player, little skill is necessary in predicting the winner; but as to matchups which are very even, great skill is required to successfully select the winner (if the user is to achieve a success rate of over 50% as would generally be expected for truly even matchups)).

In one embodiment of the invention, multiple matchups are generated for presentation to one or more user participating in the fantasy activity. The total number of matchups, which are generated, may vary and depend, for example, on the number of matchups, which a user must select in order to participate in the activity. However, the minimum number of matchups that the user must select is a sub-set of the total number of matchups from which the user may select. In this manner, part of the skill involved in the activity is the fan's determination of which matchups to play from the set of matchups that is presented to the fan.

Further, the matchups presented to the one or more fans, including the number of matchups presented, may vary during the course of the fantasy activity. For example, matchups that involve one or more participants that have already completed an actual game may be removed and be replaced with one or more matchups involving participants that will play an actual game in the future. Matchups may also be changed based on a number of other criteria including for example, an injury to a participant, game cancellations, and a number of times a particular matchup is selected by the fans, etc. For example, if a particular matchup is selected by a certain percentage of fans, it may become clear that this matchup is not considered to be an even match and therefore, this matchup may be removed from the list of available matchups.

In one embodiment of the invention, 40 matchups are generated. Each matchup preferably uses different sets of participants (whereby each of the 40 matchups are different from one another). The set of matchups may be presented in a "card" type format (although the card may be virtual). As described below, different cards (or sets of matchups) may be generated and presented to fans, including at different times. Also, as further described below, the number of matchups on a card may be reduced or vary from time to time based on game, risk analysis, player injury or other factors effecting game play or rules. If a believed even pre-determined matchup becomes un-evenly matched because of either a real (e.g. injury) or perceived condition (e.g. a great majority of fans select one participant of a matchup), the matchup may be removed from the pool of matchups available for future fans selection.

The matchups may be generated in a number of ways. For example, a suggestion engine may use defined criteria to create a number of proposed matchups. The operator may use a matchup tool to create one or more final sets of matchups, such as by filtering and selecting final matchups from those generated by the suggestion engine or by generating other matchups.

A second process 920 of the method in FIG. 11A presents the set of matchups to a user, such as via the user's presentation device 151. In some embodiments, a user that wishes to participate in selecting matchups is first authenticated by the platform and then the set of matchups is presented for selection by the user.

A third process 930 of the method receives user selection from among the set of matchups. For example, a user may select matchups 1, 11, 14 and 34 out of forty possible matchups presented to the user. A fourth process 940 of the method receives user selection of a participant predicted to win in each selected matchup. For example, relative to matchup 1, the user may select the first participant (where that participant may comprise a single player or multiple players in the first position of that matchup). For another example, relative to matchup 11, the user may select the second participant (such as a single player or multiple players in the second position of that matchup). In some embodiments, the selected matchups and the selected winners are the user's roster data.

Various information or interfaces may be used to display information to the user regarding the matchups and selections. For example, after a user makes a selection, a summary may be presented to the user regarding the matchups they have elected to play and their selections. For example, after the user elected to play the D. Brees/E. Manning matchup and selected D. Brees, a summary of that selection may be displayed with other elected matchups and selections.

A fifth process 950 determines the outcome of the matchups, which are compared to the user's selections to determine rewards for the activity. In accordance with an embodiment of the invention, scores are assigned to the participants of each matchup. These scores may be based upon objective criteria, which relate to the relevant sports event or other event and cannot be manipulated by the user.

Figure 11B:
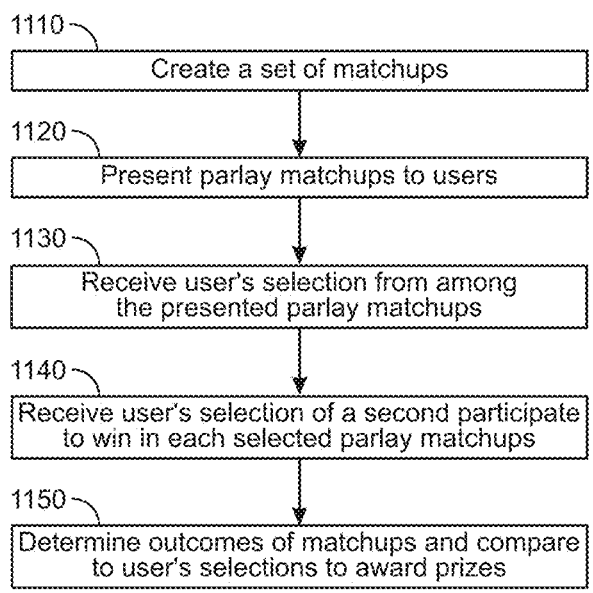
FIG. 11B is a flow chart illustrating a method of presenting parlay matchups to a user, in accordance with an embodiment of the present invention.

FIG. 11B is a flow chart illustrating a method of presenting parlay matchups to a user, in accordance with an embodiment of the present invention. A parlay matchup is a specific type of matchup in which the users select from multiple participants, one participant to pair to win against a first participant in the matchup.

In embodiments, the method of FIG. 11B is executed by the activity server of FIG. 2 or the system of FIG. 3. In this method, a first process 1110 creates a set of parlay matchups. The above description of the creation of matchups, with respect to FIG. 11A, also applies to the parlay matchups. Examples of such parlay matchups are shown in FIGS. 6A-6B.

A second process 1120 of the method in FIG. 11B presents the set of parlay matchups to a user, such as via the user's presentation device 151. In some embodiments, a user that wishes to participate in selecting parlay matchups is first authenticated by the platform and then the set of matchups is presented for selection by the user.

A third process 1130 of the method receives user selection from among the set of parlay matchups. For example, a user may select parlay matchups 1, 11, 14 and 34 out of forty possible matchups presented to the user. A fourth process 1140 of the method receives user selection of a second participant, from among multiple shown participants, to pair to win against a first specified participant in each selected matchup. For example, relative to parlay matchup of 1, the user may select either player 2 or player 3 to be paired to win against a specified first participant (player 1). In some embodiments, the selected matchup and the selected winner are the user's roster data.

A fifth process 1150 determines the outcome of the parlay matchup, which are compared to the user's selections to determine rewards for the activity.

Figure 11C:
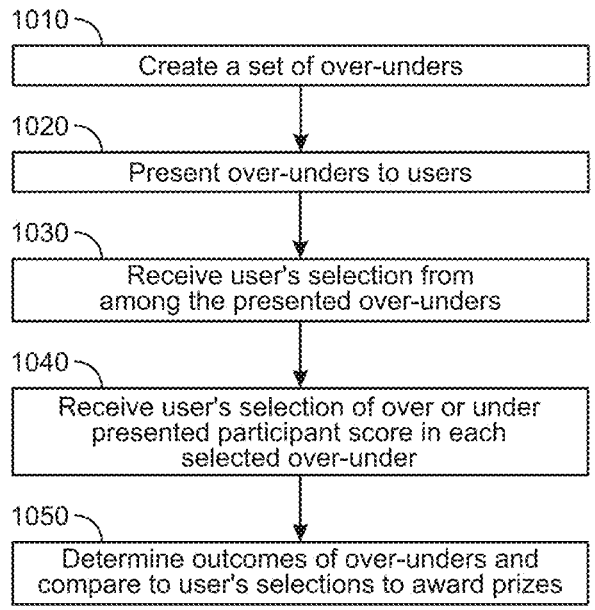
FIG. 11C is a flow chart illustrating a method of presenting an over-under to a user, in accordance with an embodiment of the present invention.

FIG. 11C is a flow chart illustrating a method of presenting an over-under to a user, in accordance with an embodiment of the present invention. In embodiments, the method of FIG. 11C is executed by the activity server of FIG. 2 or the system of FIG. 3. In this method, a first process 1010 creates a set of over-unders. An example of such over-unders is shown in FIG. 5A.

In some embodiments, each over-under of the set of over-unders includes a present score for a participant in an upcoming event or activity, together with an "Over" option and an "Under" option. A user selects the "Over" option to indicate that the user predicts that the participant's actual score (e.g., performance score, fantasy score, etc) will be over the presented score, and select the "Under" option to indicate that the user predicts that the participant's actual score will be under the presented score. It will be appreciated by a person of ordinary skill that the event or activity may be any number of actual sports, games, other competitions, or any other form of entertainment activity or other event. The pair of participants may be teams or individual players in the event or activity.

As one example, an over-under may present a predicted score for a football player in an upcoming football game or a combined score (e.g., averaged) for the football player in multiple upcoming football games. The presented score may be based upon various criteria, such as playing position, team playing against, predicted conditions for the game, etc. The user then selects the "Over" or "Under" option to indicate whether the user predicts the actual score will be over or under the presented score. In order for the user to win, the performance or fantasy score during the event must be over the presented score (if the user selected the "Over" option) or under the presented score (if the user selected the "Under" option). The fantasy score may include a handicap or biased value.

In accordance with one embodiment of the present invention, the participant's score in an over-under is pre-selected in a manner that closely predicts an expected outcome. The presented score may be predetermined by a professional odds-maker or an odds-maker in conjunction with an automated process based upon statistical analysis.

The advantage of having a closely predict score presented to the user in an over-under is so that the activity, including the outcome thereof (e.g., whether the user is a winner or loser), will require a significant amount of skill or knowledge by the user in deciding whether the actual score will be over/under the presented score. First, the user will use their skill in attempting to pick whether the actual score will be over or under, which if the presented score is not closely predicted, the user is more likely to select the winner of the over-under. As to selected over-under which the presented score appears to be closely predicted, skill is involved in the user attempting to winning pick of the presented score being over or under the actual score.

In one embodiment of the invention, multiple over-unders are generated for presentation to one or more users participating in the fantasy activity. The total number of over-unders, which are generated, may vary and depend, for example, on the number of over-unders which a user must select in order to participate in the activity. However, the minimum number of over-unders that the user must select may be a sub-set of the total number of over-unders from which the user may select. In this manner, part of the skill involved in the activity is the user's determination of which over-unders to play from the set of over-unders that is presented to the user.

Further, the over-unders presented to a user, including the number of over-unders presented, may vary during the course of the fantasy activity. For example, over-unders that involve a participant that has already completed an actual game may be removed and be replaced with one or more over-unders involving participants that will play an actual game in the future. Over-unders may also be changed based on a number of other criteria including for example, an injury to a participant, game cancellations, and a number of times a particular matchup is selected by the fans, etc. For example, if a particular over-under is selected by a certain percentage of fans, it may become clear that this over-under is not considered to have a closely predicted score and therefore, this over-under may be removed from the list of available over-unders.

In one embodiment of the invention, 40 over-unders are generated. Each over-under using a different participant (whereby each of the 40 over-unders are different from one another). The set of over-unders may be presented in a "card" type format (although the card may be virtual). As described below, different cards (or sets of over-unders) may be generated and presented to user, including at different times. Some cards may include a combination of over-unders and matchups. Also, as further described below, the number of over-unders on a card may be reduced or vary from time to time based on game, risk analysis, player injury or other factors effecting game play or rules. If a believed closely predicted over-under is no longer such because of either a real (e.g. injury) or perceived condition (e.g. a great majority of users select over or under for the over-under), the over-under may be removed from the pool of over-unders available for future user selection.

The over-unders may be generated in a number of ways. For example, a suggestion engine may use defined criteria to create a number of proposed over-unders. The operator may use a matchup tool to create one or more final sets of over-unders, such as by filtering and selecting final over-unders from those generated by the suggestion engine or by generating other over-unders.

A second process 1020 of the method in FIG. 11C presents the set of over-under to a user, such as via the user's presentation device 151. In some embodiments, a user that wishes to participate in selecting over-unders is first authenticated by the platform and then the set of matchups is presented for selection by the user.

A third process 1030 of the method receives user selection from among the set of over-unders. For example, a user may select over-unders 1, 11, 14 and 34 out of forty possible matchups presented to the user. A fourth process 1040 of the method receives user selection of over or under the presented score of an event participant in each selected matchup. For example, relative to over-under 1, the user may select that the actual score of an associated participant will be over the presented score of that participant. For another example, relative to over-under 11, the user may select that the actual score of the associated participant will be under the presented score of that participant. In some embodiments, the selected over-under and the selected winners (over or under) are the user's roster data.

Various information or interfaces may be used to display information to the user regarding the over-unders and selections. For example, after a user makes a selection, a summary may be presented to the user regarding the over-under they have elected to play and their selections. For example, after the user selected to play the D. Brees over-under and selected D. Brees's score to be over the presented score, a summary of that selection may be displayed with other over-under and selections. In some embodiments, that select may also be displayed with selected matchups.

A fifth process 1050 determines the outcome of the over-under (e.g., actual score), which are compared to the user's selections to determine rewards for the activity.

Figure 12:
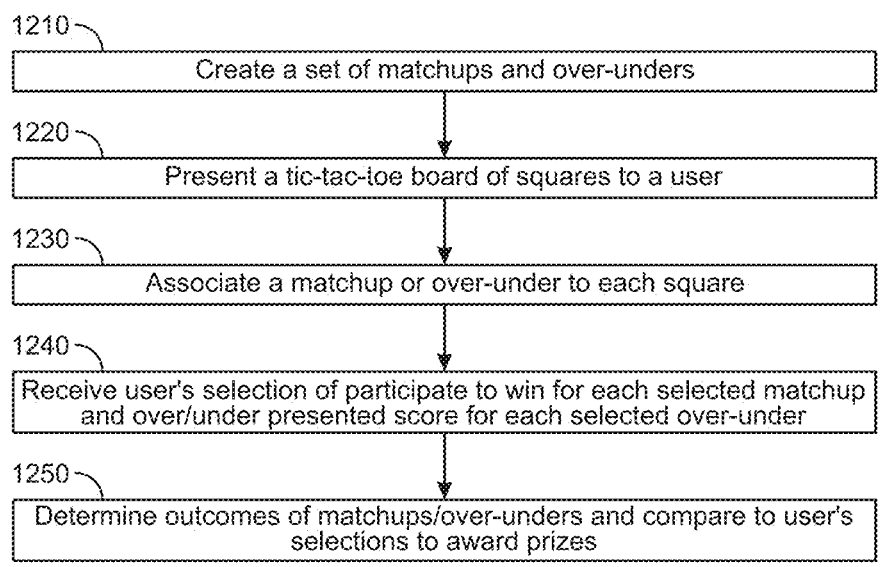
FIG. 12 is a flow chart illustrating a method of present a tic-tac-toe game of matchups and over-unders to a user, in accordance with an embodiment of the present invention.

FIG. 12 is a flow chart illustrating a method of present a tic-tac-toe game of matchups and over-unders to a user, in accordance with an embodiment of the present invention. The method of FIG. 12 may also be used to present a diamond dough game of matchups and over-unders to a user. The diamond dough game is also referred to as the "X's and O's" game. In embodiments, the method of FIG. 12 is executed by the activity server of FIG. 2 or the system of FIG. 3. Examples of the tic-tac-go game are shown in FIGS. 7A-7N, and examples of the diamond dough game are shown in FIGS. 18A-18E. In this method, a first process 1210 creates a set of matchups and over-unders. In embodiments, the matchups include both matchups and parlay matchups. The matchups may be created in accordance with process 910 of FIG. 11A and process 1110 of FIG. 11B.

A second process 1220 presents a tic-tac-toe board of squares to the user, via the user's presentation device. In the case of the diamond dough variant of tic-tac-toe game, the tic-tac-toe board is rotated for presentation as a diamond. A third process 1230 associates one of the set of matchups or over-unders to each square. In some embodiments, the activity server automatically associates one of the set of matchups or over-unders to each square, prior to the tic-tac-toe board being presented to the user. For example, the platform may use a random or algorithmic method for selection of the matchups, over-unders, or mixed matchups and over-unders games for the squares of the tic-tac-toe board. In some embodiments, the platform also uses a random or algorithmic method for determining the placement of the selected games into the squares of the tic-tac-toe board. In other embodiments, the third process 1230 received the user's selection associating a matchup or over-under to each square. A fourth process 1240, for each selected matchup, receives the user's selection of the participant predicted to win for each selected matchup. In the case of parlay matchups, the selection includes choosing from among multiple participants to select one as the second participant predicted to win against a specified first participant. The fourth process 1240, for each selected over-under, receives the user's selection of whether the actual score will be over or under presented score for each selected over-under.

A fifth process 1250 determines the outcome of the matchup or over-under associated with each square and compares the outcome to the user's selection for that matchup or over-under to award rewards. The rewards may be award based on a fixed odds payout corresponding to the number of rows, columns, and diagonals formed by the user's winning matchups, over-unders, or mix of matchups and over-unders on the tic-tac-toe board. In the case of the diamond dough game variant, the rewards may be awarded based on a fixed odds payout corresponding to the defined patterns shown in FIGS. 18A-18E formed by the user's winning matchups, over-unders, or mix of matchups and over-unders on the diamond dough board.

Figure 13A:
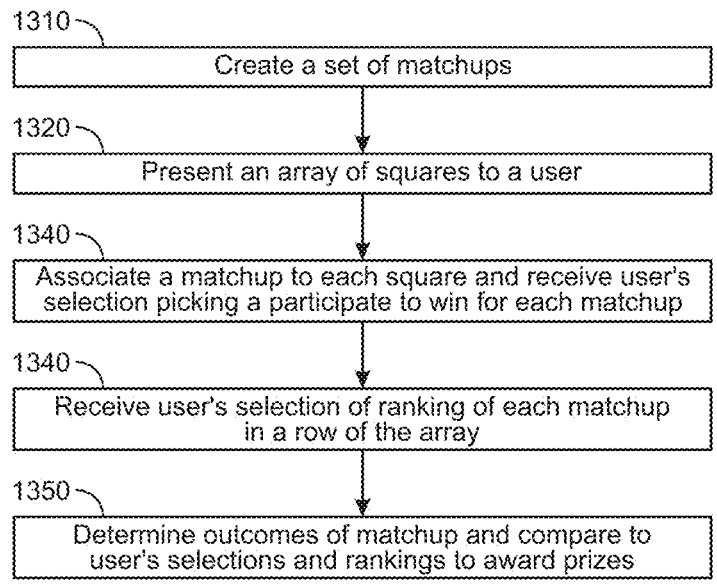
FIG. 13A is a flow chart illustrating a method of presenting a ranking array game of matchups to a user, in accordance with an embodiment of the present invention.

FIG. 13A is a flow chart illustrating a method of presenting a ranking array game of matchups to a user, in accordance with an embodiment of the present invention. In embodiments, the method of FIG. 13A is executed by the activity server of FIG. 2 or the system of FIG. 3. An example of the ranking game is shown in FIG. 8. In this method, a first process 1310 creates a set of matchups. In embodiments, the matchups include both matchups and parlay matchups. The matchups may be created in accordance with process 910 of FIG. 11A and process 1110 of FIG. 11B. In some embodiments, the first process 1310 instead creates a set of over-unders or a mixed set of over-unders and matchups.

A second process 1320 presents an array of squares to the user, via the user's presentation device. A third process 1330 associates one of the set of matchups to each square. In some embodiments, the activity server automatically associates one of the set of matchups or over-unders to each square, prior to the array being presented to the user. For example, the platform may use a random or algorithmic method for selection of the matchups for the squares of the array. In some embodiments, the platform also uses a random or algorithmic method for determining the placement of the selected matchups into the squares of the array. In other embodiments, the third process 1330 received the user's selection associating a matchup to each square. The third process 1330, for each selected matchup, also receives the user's selection of the participant predicted to win for each selected matchup. In the case of parlay matchups, the selection includes choosing from among multiple participants to select one as the second participant predicted to win against a specified first participant. The fourth process 1340, for each selected squares in a row of the array, receives the user's ranking of the associated matchup with respect to the associated matchups of the other squares in that row. The user may sequentially rank the squares of the row in numerical order, such that the square ranked 1 has the matchup that the user predicts to be the highest scoring matchup and the square ranked N has the matchup that the user predicts to be the lowest scoring matchup in the row.

A fifth process 1350 determines the outcome of the matchups associated with each square and compares the outcome to the user's selection for that matchup to award rewards. The rewards may be award based on a fixed odds payout corresponding to the number of winning matchups in row and ranking of the matchups. The rewards may be progressive, such that a reward is awarded for each square of a row having a winning matchup, but progressively larger rewards are awarded for the more correct rankings of squares in the row.

Figure 13B:
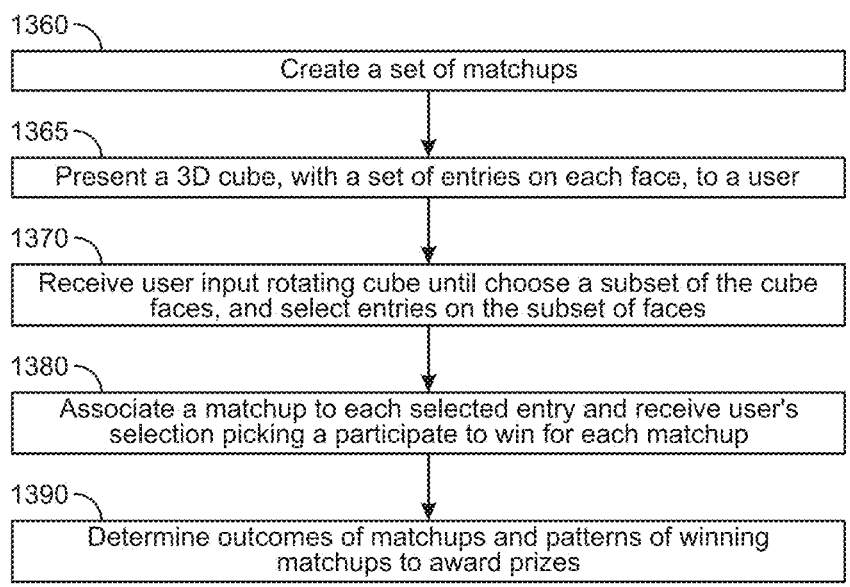
FIG. 13B is a flow chart illustrating a method of presenting a three-dimensional (3D) cube game to a user, in accordance with an embodiment of the present invention.

FIG. 13B is a flow chart illustrating a method of presenting a 3D cube game to a user, in accordance with an embodiment of the present invention. In embodiments, the method of FIG. 13B is executed by the activity server of FIG. 2 or the system of FIG. 3. An example of the 3D cube game is shown in FIGS. 19A-19B and another example in FIGS. 19C-19D. In this method, a first process 1360 creates a set of matchups. In embodiments, the matchups include both matchups and parlay matchups. The matchups may be created in accordance with process 910 of FIG. 11A and process 1110 of FIG. 11B. In some embodiments, the first process 1360 instead creates a set of over-unders or a mixed set of over-unders and matchups.

A second process 1365 presents a 3D cube, with a set of squares or triangles, functioning as entries, on each face of the cube, to the user, via the user's presentation device. A third process 1370 receives input from the user rotating the 3D cube so as to display a set of the faces of the cube. The third process 1370 further receives input from the user selecting a subset of the entries configured on the chosen faces. A fourth process 1380 associates one of the set of matchups to each selected entry. In some embodiments, the activity server automatically associates one of the set of matchups or over-unders to each of the selected entries. For example, the platform may use a random or algorithmic method for selection of the matchups for the entries. In some embodiments, the platform also uses a random or algorithmic method for determining the placement of the selected matchups into the selected entries. In other embodiments, the fourth process 1380 received the user's selection associating a matchup to each selected entry. The fourth process 1380, for each selected matchup, also receives the user's selection of the participant predicted to win for each selected matchup. In the case of parlay matchups, the selection includes choosing from among multiple participants to select one as the second participant predicted to win against a specified first participant.

A fifth process 1390 determines the outcome of the matchups associated with each selected entry and compares the outcome to the user's selection for that matchup to award rewards. The rewards may be awarded based on a fixed odds payout corresponding to the pattern formed among the entries by the winning matchups. The rewards may increase based on the number of selected cube faces. The rewards may be progressive, such that a reward is awarded for a game configured by the selection of one cube face, but progressively larger rewards are awarded for the more cube faces used to configure the game. In some embodiments, an insurance payout option is provided for the game. With this option, if a user's winning selections among the game entries do not form one of the defined patterns for winning the game, but a certain number of winning selections were made among the game entries, then the winning selections are reformatted on one of the cube faces. If the reformatted winning selections form a defined pattern, then an fixed odds payout reward is awarded to the user.

Figure 13C:
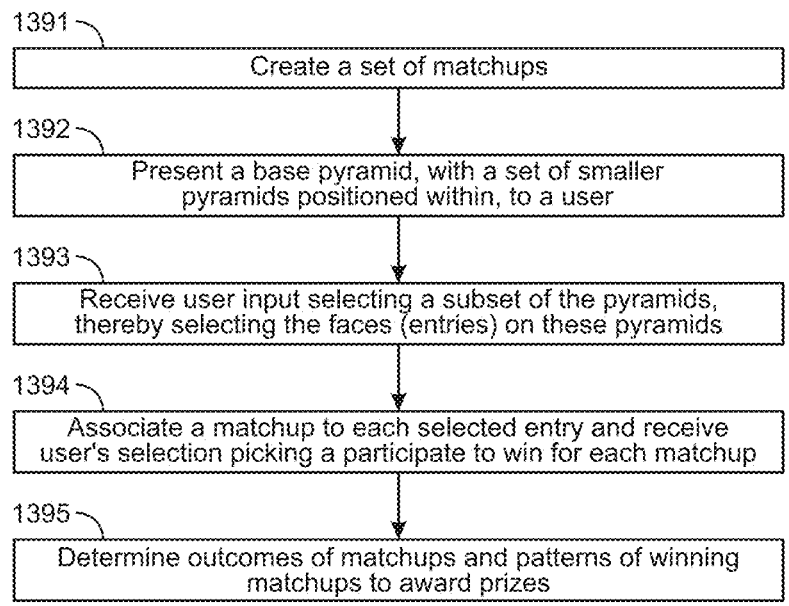
FIG. 13C is a flow chart illustrating a method of presenting a 3D pyramid game to a user, in accordance with an embodiment of the present invention.

FIG. 13C is a flow chart illustrating a method of presenting a 3D pyramid game to a user, in accordance with an embodiment of the present invention. In embodiments, the method of FIG. 13C is executed by the activity server of FIG. 2 or the system of FIG. 3. An example of the 3D pyramid game is shown in FIG. 19E. In this method, a first process 1391 creates a set of matchups. In embodiments, the matchups include both matchups and parlay matchups. The matchups may be created in accordance with process 910 of FIG. 11A and process 1110 of FIG. 11B. In some embodiments, the first process 1391 instead creates a set of over-unders or a mixed set of over-unders and matchups.

A second process 1392 presents a 3D base pyramid, with a set of smaller 3D pyramids positioned within, to the user via the user's presentation device. The faces on each pyramid functioning as entries for the game. A third process 1393 receives input from the user choosing a subset of the pyramids, and thereby selecting the entries (faces) on the selected pyramids. A fourth process 1394 associates one of the set of matchups to each entry of the selected entries. In some embodiments, the activity server automatically associates one of the set of matchups or over-unders to each of the selected entry. For example, the platform may use a random or algorithmic method for selection of the matchups for the entries. In some embodiments, the platform also uses a random or algorithmic method for determining the placement of the selected matchups into the selected entries. In other embodiments, the fourth process 1394 received the user's selection associating a matchup to each selected entry. The fourth process 1394, for each selected matchup, also receives the user's selection of the participant predicted to win for each selected matchup. In the case of parlay matchups, the selection includes choosing from among multiple participants to select one as the second participant predicted to win against a specified first participant.

A fifth process 1395 determines the outcome of the matchups associated with each selected entry and compares the outcome to the user's selection for that matchup to award rewards. The rewards may be awarded based on a fixed odds payout corresponding to the pattern formed among the entries by the winning matchups. The rewards may increase based on the number of chosen pyramids or pyramid faces. The rewards may be progressive, such that a reward is awarded for a game configured by the selection of one pyramid, but progressively larger rewards are awarded for the more pyramid or pyramid faces used to configure the game. In some embodiments, an insurance payout option is provided for the game. With this option, if a user's winning selections among the game entries do not form one of the defined patterns for winning the game, but a certain number of winning selections were made among the game entries, then the winning selections are reformatted on one of the pyramids. If the reformatted winning selections form a defined pattern, then an fixed odds payout reward is awarded to the user.

Figure 14:
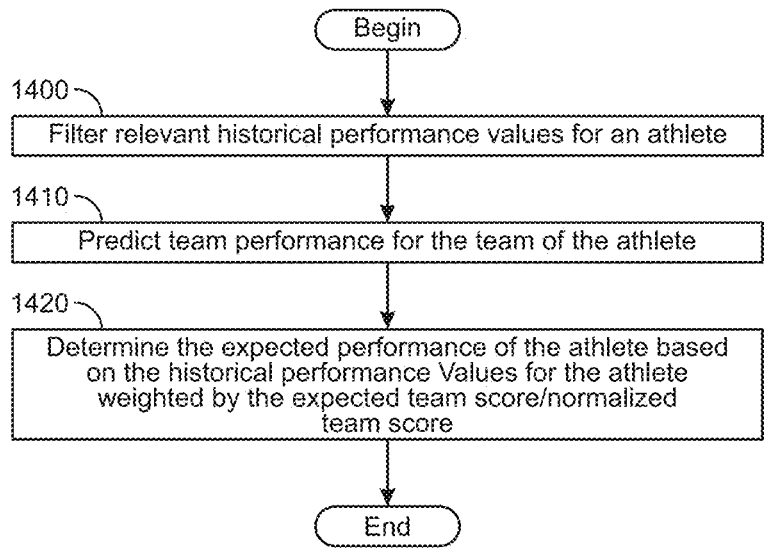
FIG. 14 is a flow chart illustrating determination of expected event performance of participants for use in creating matchups and over-unders, in accordance with an embodiment of the present invention.

FIG. 14 is a flow chart illustrating determination of expected performance of participants in events to be used for creating matchups and over-unders, in accordance with an embodiment of the present invention.

A first process 1400 filters the historical performance values are filtered in accordance with the preferences of the operator to determine a historical fantasy point total for the athlete (i.e. player) being evaluated. The filtering of the historical data may be based upon a number of factors including duration. The fantasy point total may be an average of fantasy points for a previous number of games (e.g. 20, 5, 2 etc.). Another filter that may be applied is a selection of an algorithm for calculating the fantasy points total. In one embodiment, a median algorithm is used to remove skew from statistical outliers. In another embodiment, an average algorithm is used. Another filter may be based upon a threshold condition. The fantasy points for a player may be limited to games in which the player played a minimum number of minutes or a percentage of the game (e.g. 60%, 70% etc.). The historical fantasy points may also be filtered according to venue so that average or median fantasy points over a set of games are based on whether the games are played at home or away. The historical fantasy points may also be filtered according to the opposition. For example, in baseball the historical information for a player, can be filtered in accordance with the pitcher handedness, such that the player's performance versus a right- or left-handed pitcher may be evaluated. This is especially useful in making matchups or over-unders for upcoming games in which the opposing pitcher is known and therefore the handedness of the pitcher can be taken into account. Each of these factors affects the historical performance numbers.

A second process 1410 adjusts the player-rating based upon the expected fantasy points for the upcoming game so that the player-rating is a composite of the historical fantasy points rating (average/median per game) and the expected fantasy points for an upcoming game. The expected fantasy points for a player may be calculated based upon the expected team performance for that same game. The algorithm assumes a strong correlation between the performance of a player and that of the team. For example, if an NBA team is expected to score 10% more team points than usual, the methodology assumes that the individual player will score 10% more points and therefore, will have 10% more fantasy points than the historical average/median for that player.

In order to calculate the expected fantasy points, the third process 1420 weighs the calculated historical fantasy points by the athlete's predicted team score divided by the historical team score.

$$FPTS_{expected} = FPTS_{historical}\left[\frac{\text{TeamScore}_{expected}}{\text{TeamScore}_{historical}}\right]$$

One method for calculating the expected team score begins with the published Las Vegas Totals and Point Spreads. For example, if the bookmaker odds predict that 200 points will be scored in an NBA game and that the Point Spread is −6 points for the athlete's team, then the expected team score for our athlete is [200−(−6)] *0.5=103

$$\text{TeamScore}_{expected} = \left[\frac{\text{GameScore}_{total} - \text{PointSpread}}{2}\right] = \left[\frac{200-(-6)}{2}\right] = 103$$

Total game score and point spread are either entered into the system by the operators, or they are imported from a bookmaking site or API. The historical team score is also calculated. There are several ways to calculate the historical team score. In one embodiment, the average of all expected team scores for all of the players in the player ranking tool list of players. In some embodiments, the historical team score is calculated from the same set of games that are used to calculate the athlete's fantasy points in the column for last 20 games played.

The above-described methodology for the player-ranking tool provides a matchmaker with a list of players ordered as closely as possible to their game day performances. Thus, in this embodiment, the player-ranking tool allows operators (matchmakers) to create matchups and over-unders quickly and easily. As an adjunct, the player-ranking tool can also be used for warning the matchmakers when creating an unevenly matched matchup and presenting suggested matchup cards to the matchmaker. The player-ranking tool is designed to assist the matchmaker in making matches and removing matches from play. Thus, the matchmaker can override any of the suggestions by the matchmaker can overrule any suggestions from the player-ranking tool.

Figure 15C:
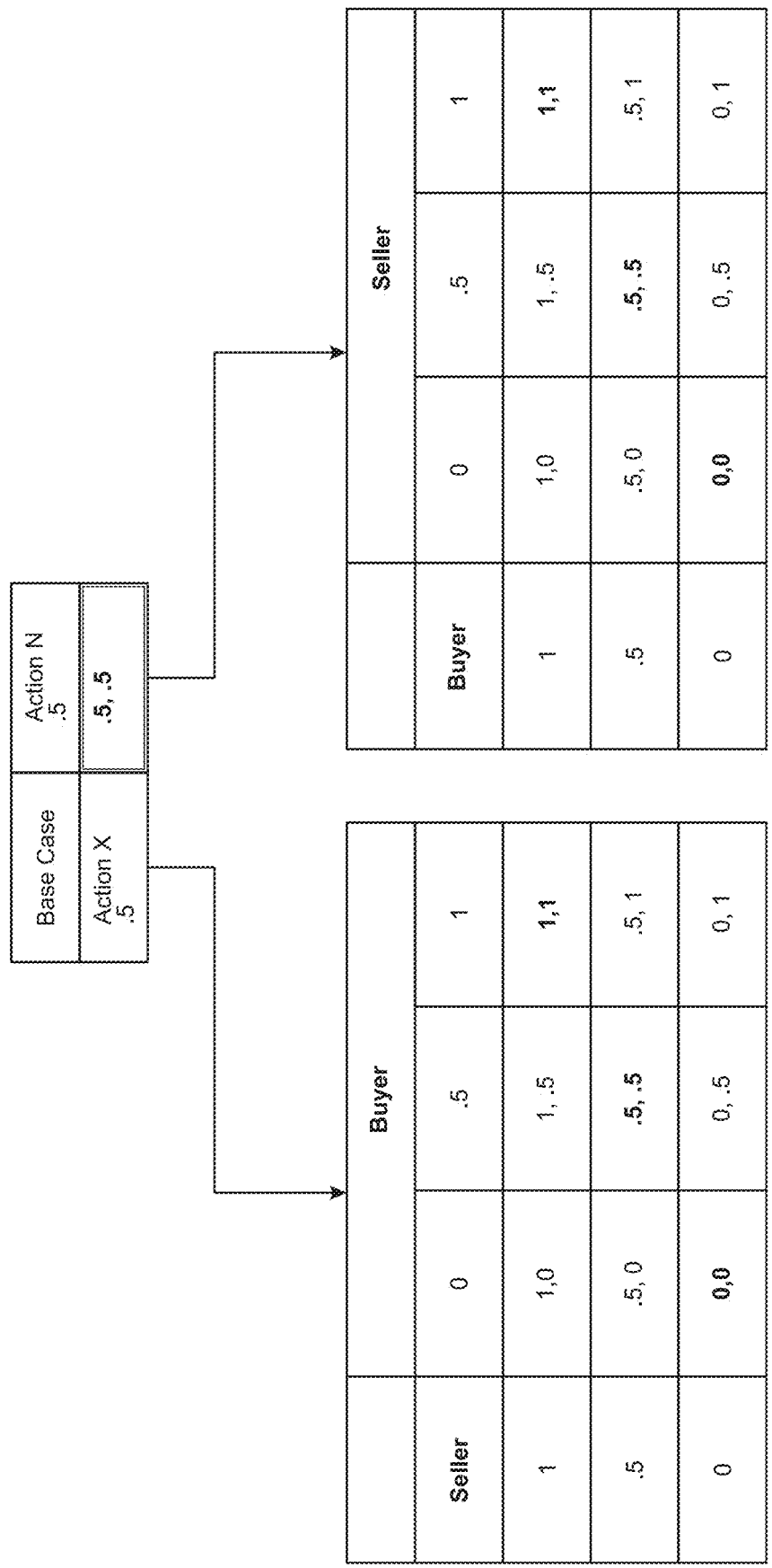

FIGS. 15A-C are block diagrams showing the determination of risk used to assign fixed odds payout to matchups and over-unders, in accordance with an embodiment of the present invention. In some embodiments, each of the advanced choice games, including 3D advance choice games, is provided in a computational platform that produces a single expression of risk as an event market for all the activities associated with such game.

The challenge for creating game products from joint and several events is embedded in the idea of a game itself. One category of game that is generally understood is Oskar Morgenstern and John von Neumann's explication of the Prisoner's Dilemma, wherein the games of cooperation, incomplete information, and optimization are characterized by the set of possible outcomes.

In the prisoner's dilemma the game is assumed to have positive and negative out puts, with the simple version being two player each with a positive and a negative outcome. The game is assumed to be one cooperation to evade a negative outcome-if both players behave optimally both are successful, if neither cooperates both realize negative outcomes, and two possibilities for partial results of partial cooperation.

A uniformity of outcomes either both mutually negative or bother mutually positive represent the contestants weighting of their information and the result of the mutual actions. One can treat these as equivalent to market instructions, with a mutual negative decision around a sell game as resulting in a sell decision, and a mutual decision around a buy game resulting in buy decision.

In the event of machine learning there exist two categories, supervised and unsupervised learning, Supervised Learning uses decision trees, naïve Bayes classification, ordinary least squares regression, logistic regress, support vector machines, and ensemble methods amongst others. Unsupervised learning uses clustering algorithms (such as Eigen vectors), principle component analysis, singular value decomposition, and other tools and methodologies. Both are producing signals that produce expected values where the ratio of "true" to "false" is better than random, i.e. has a ratio that is better than the coin toss of 50% probability. While adjusted probability is typically the result of a what is called a Bayesian Nash equilibrium, that is not the only form of game production. The expected value can be also represented as a state of the data that may also form the expectation of probabilistic outcome.

In such a circumstance the above Prisoners Dilemma becomes a set of high confidence intervals of 0.5 (50%) probabilities and can be represented as an array set for each characteristic or information signal that produces the expected result. As such the reading or a game theory around an event has advanced to a set of statements around the data itself rather than the expected value of cooperation. In such a set, the instructions for the probability are around the "memory" of the game, i.e. its data being available to calculate, and the calculation instructions themselves.

As shown in FIGS. 15A and 15B, the result of this is that partial payouts on both buy and sell games can now be calculated. Three states of informational result exist in a machine learning game: a buy decision, a sell decision, both starting from the base decision. As such any game therefore be set as being the result of an array set of 0.5 probability sets (shown in FIG. 15B) as the game in digital format depends on the player deciding whether they agree with the base case.

As shown in FIG. 15C, a game can now be created from any array which the game is executed whereby the probability of outcome is a machine learning based expectation of an equivalent result whereby the game contestant identifies an expectation where they believe the game maker is incorrect in producing a game of $(A_{NX})$, for any array set. Thus the general game is for any and all variation on a game wherein A and X may be of any value of 1 or more, and where A may or may not be equal to X. The commercial value of the game is the ability to predict the required number of contestants for any array at a payout that may be both for single or multiple outcomes and which also produces a risk statement of how stable much the prediction of 0.5 be to maintain the stability of the expected reward.

This relationship can be described as being the organization of "tuples" various arrangements of X,N in an array such that a central limit theorem relating the expected payout to the contestant can be calculated based on the number of contestants to produce a fixed payout knowable for a statistical level of risk and ordered by a central limit theorem. Such a set involves the conditional performance of the contestant in correctly ascertaining the performance of a real word athlete or athletes or other efforts resulting in a final performance at a measurement of the least means squared adjusted or some other measurement of risk adjusted expected performance. Such a measurement may be in the single incident of an athlete, team, or a real-world event. Such an event may be on a continuous polling basis, or in the form of a final polling outcome, i.e. a vote.

Moreover, the form of the X,N can also be conditional in series, such that the array can be arrangements of X,N in series as reflected by [ ]. Such a three-dimensional game also offers the same underlying games, where by a computer recursively and heuristically solves for a set of arrays which may also be considered as a machine learning based game for enthusiasts seeking to have a 2×2×2 game or a 3×3×3 game, or a 1×2×3 game. Indeed a the computer process is such that a 1×10 game is defined as being a $N_1 \times X_{10} \times \{0\}$ game—the instance of a the second array is defined as being a null set $\{0\}$ or 0 game rather than not existing at all.

FIG. 21 is a chart showing sports gaming revenue models used in the prior art in comparison with a sports gaming revenue model used in an embodiment of the present invention. Embodiments of the present invention use a different revenue model (entitled "Vetnos" in the chart of FIG. 21) because customers buy at a fixed or variable fixed discount to the theoretical value of the prediction, the total dispersion of game play (non-centralized liquidity), and either price or quantity.

In all circumstance, the fixed reward for correctly defining the array outcome of N,X can be defined by the necessary levels of customer participation for the reward payout be at an expected level. Rather than the game maker making money from the differential between two reward outcomes based upon the buyer vs. the seller of the reward, the reward payout can be defined as fixed for a previously defined level of customer activity. The revenue model exists in the discount to the reward payout at a discount to the theoretical value of the reward given the predicted required levels of customer activity. Moreover, the rewards can themselves be fixed on a progressive basis. Thus, while one may require a 6 our o6 selection to obtain a reward, fixed odds payouts can be defined for the given levels of player activity for 4 out of 6, 5 out of 6, and 6 out of 6 correct selections.

Embodiments are presented in the form of a matchup game. However, such fixed odds payout risk in the games of the present invention are not limited to matchups. An over-under of an athlete offers similar array presentations for fixed odds payout based on actual performance. An over-under on a set of a n athletes or teams in a row across (1) and x (1 or more) down a column. In this embodiment, the computational system offers fixed odds payout with a single calculable value of all risks and expected outcomes for customer activity on the platform. Other games in embodiments of the present invention (e.g., parlay matchups, tic-tac-toe, diamond dough, ranking array, 3D cube, etc.) can be calculated based on an algorithm, which is defined as a process or set of rules to be followed in calculations or other problem-solving operations. The rules can be particularly followed by a computational system that defines risk, reward and a further algorithm based on probabilities of liquidity expressed at each transaction for either cash or other reward format (possibly for token, loyalty program, merchandise, or liquidity rebate) that prove to have statistical value on the calculation of reward, risk and liquidity, i.e. customer activity.

Such algorithm exists as a separate mathematical formulation that has been deployed throughout the entire gaming platform. As a result, new games are in continuous development based on the premise of the value of fixed odds payout in either matchup or over under presentment but with single or instances or other formats.

In embodiments, rewards are available in two forms and can be continuously produced: (1) fixed odds payout with a single reward outcome; and (2) fixed odds payout with multiple reward outcomes.

The platform is data driven, which allows rewards to continuously deploy additional fixed odds payout at the player level for either athletes or teams in each of the games produced above. Moreover, the prizing or rewards can occur in the time interval both prior to the game and during the game itself.

The centralizing computational theory of the platform additionally allows multiple application programming interfaces to automatically generate similar games but across multiple events. Any sporting or athletic contest (defined as professional or amateur league or association) can be turned into game inventory. This further included racing formats such as auto or horse racing wherein the jockey and or the trainer are offered as athletes. Last, it includes awards or other reality shows, such as the Oscar, the Tony, the Grammy, the Emmy, the Country Music Awards, or game shows, all of which can be rendered to this game presentment of continuous fixed odds payout.

In sports gaming, three methods may be used to achieve a monetary benefit. First, a margin-based method takes a fee and manages a spread (margin) between buyer's price and seller's price. This method is based on game theory, and sometimes called a double-blind auction. The market-maker, through the platform, manages the prices of a seller's auction that is higher in price than in a buyer's auction. This premise of auction behavior is an essential part of game theory and use cases such as Bayesian Nash price equilibrium. One risk is that to produce liquidity and attract larger wagers, the market-maker may need to act as principal in order to serially locate an offsetting buy or sell order.

Second, a volume-based method takes a percentage of the total volume bet, with losers paying the winners on a pro rata basis from the pool of price entries. This method is called a pari mutuel or rake system-no risk to the manager, but a high number of games at various price points for wagering means the business is highly dependent on marketing spend. Further, the data used by the method cannot be centralized, virtually assuring a direct-to-consumer model and low scalability. This model has been the backbone of horse-racing, poker, and daily fantasy sports.

Third, a margin-and-volume based method offers a fixed odds payout, with a fixed reward that is at the midpoint of predicted sellers and buyers' price, but at a discount from the theoretical value expected for the payout on that midpoint for an expected number of players. Such a method is improved and used by the platform in embodiments of the present invention to determine the fixed odds payouts for the advanced choice games. This method uses machine-learning tailored to game theory. Rather than relying on the typical game theory treatment of probability, in this method, embodiments of the present invention reformulate the game theory to states of data as digital signals around the data with reward, risk, and liquidity all having a common centralized limit. Accordingly, for every level of reward and risk, this method calculates the value of that trade-off based on the value of the number of players of the games on a random basis producing a more efficient price. As every player gets the same odds, there is no need to add fractionated pools of liquidity to assure effective marketing. As the games are predictive to the midpoint, there is no need for the market-maker to accept principal risk to assure price. As primary risks of marketing and balance sheet exposure can be controlled, there is no marginal friction between margin and volume in working capital turns, i.e. no marginal OpEx or CapEx necessary to grow the business. In embodiments, the platform relies on the discount to the fair value of the model to determine the fixed odds payout.

Further, when teams are matched to payouts based on handicapped spreads, e.g., Team A at plus X points, the actual bet is on a portfolio of athletes. Fixed odds payouts of embodiments of the present invention are the foundational math for producing a sports book based on teams or other events—but using a more efficient pricing model.

Figure 16:
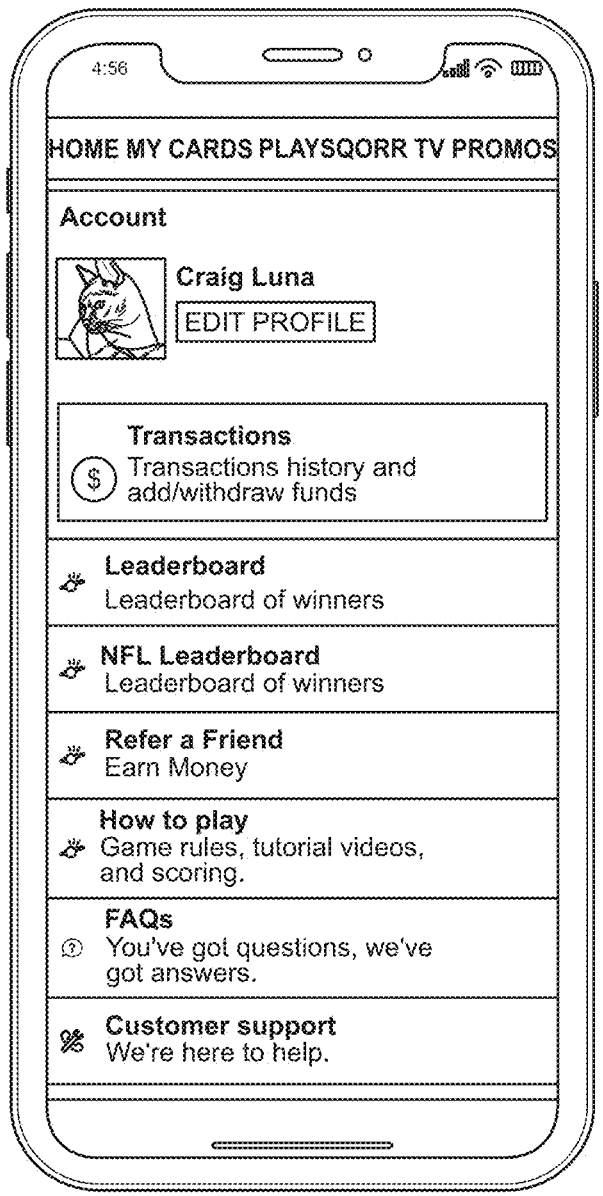
FIG. 16 is an exemplary user interface screen for a user to access and configure the user's account information, in accordance with an embodiment of the present invention.

FIG. 16 is a user interface screen for a user to access and configure the user's account information, in accordance with an embodiment of the present invention.

Figure 17A:
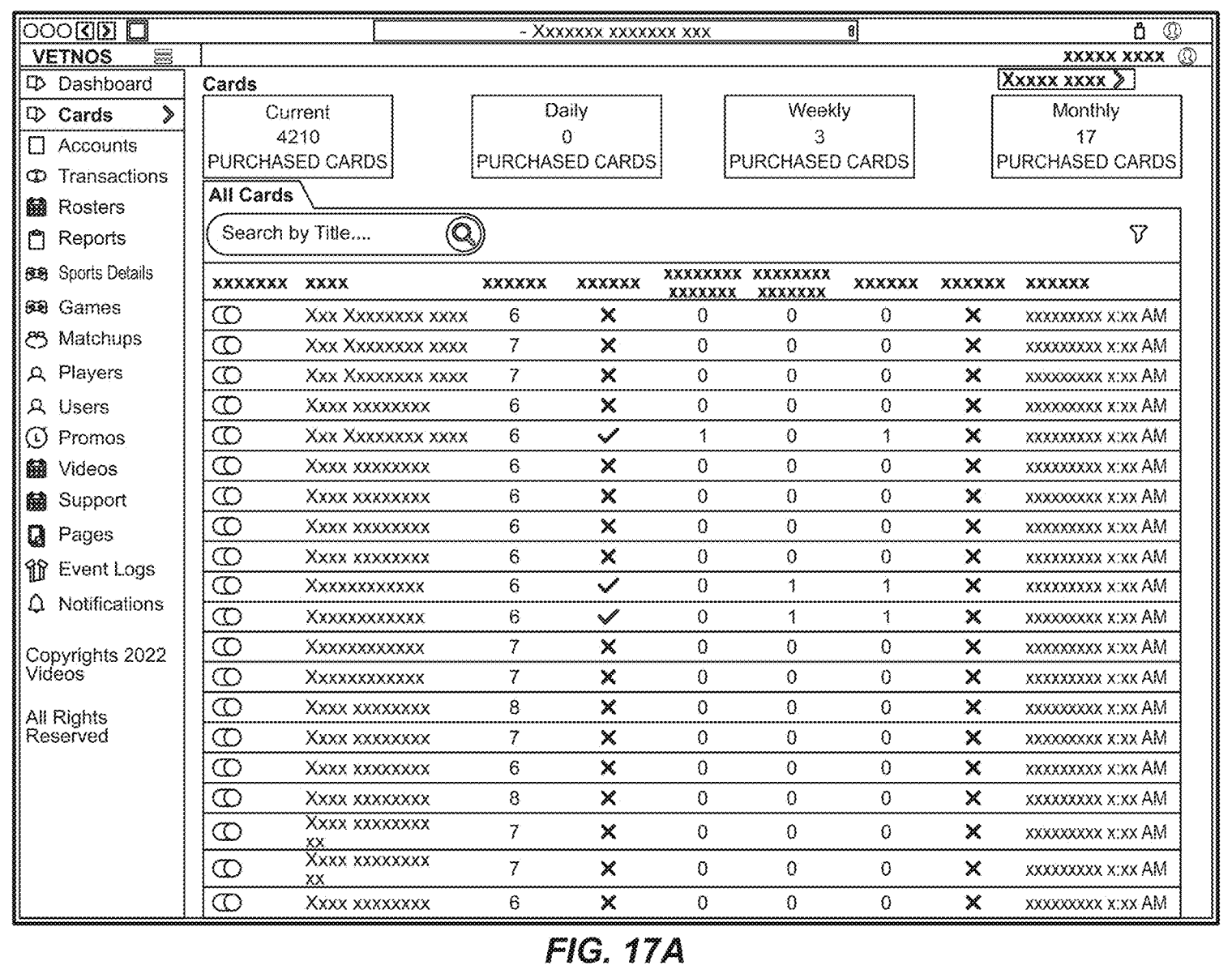
Figure 17B:
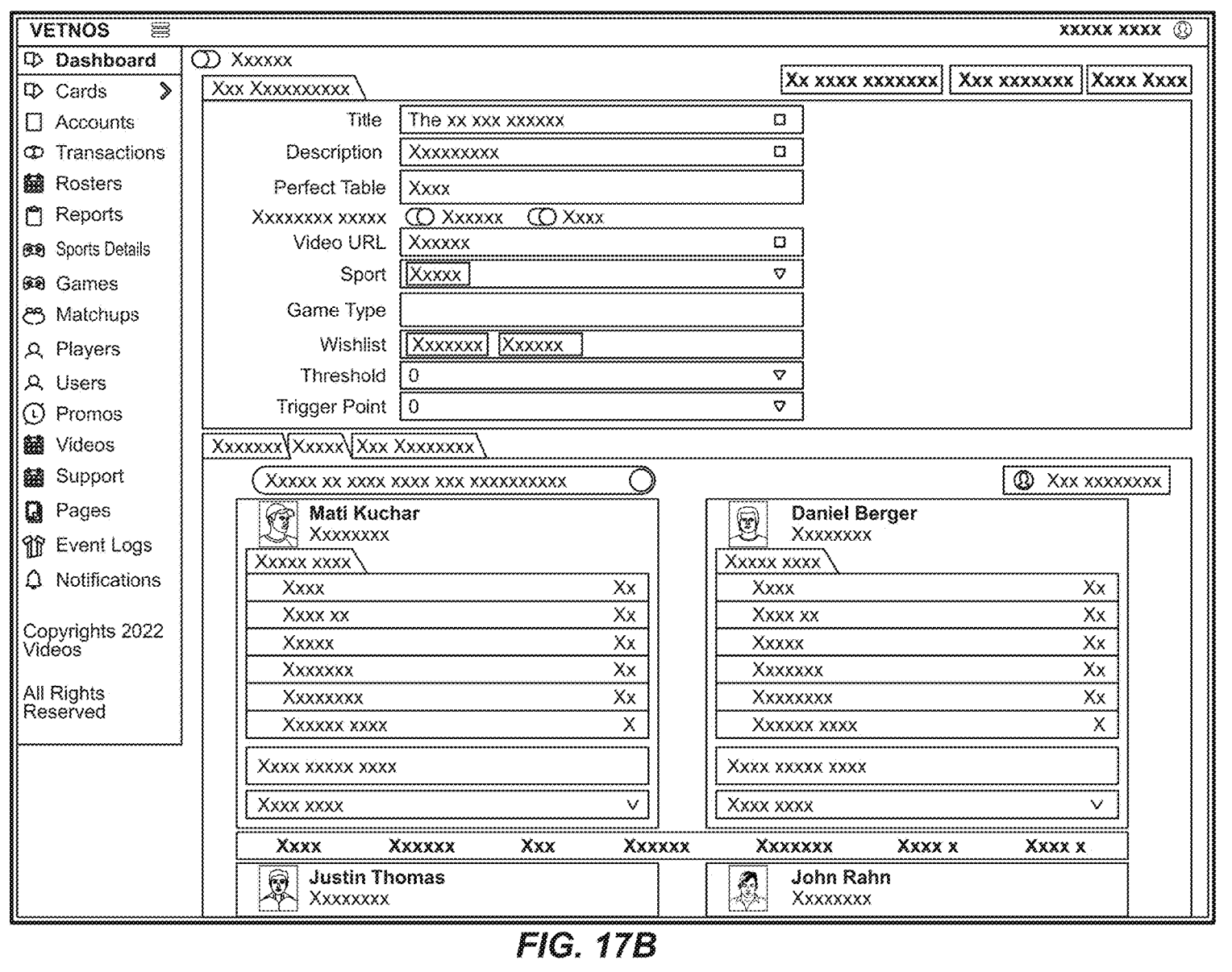
Figure 17F:
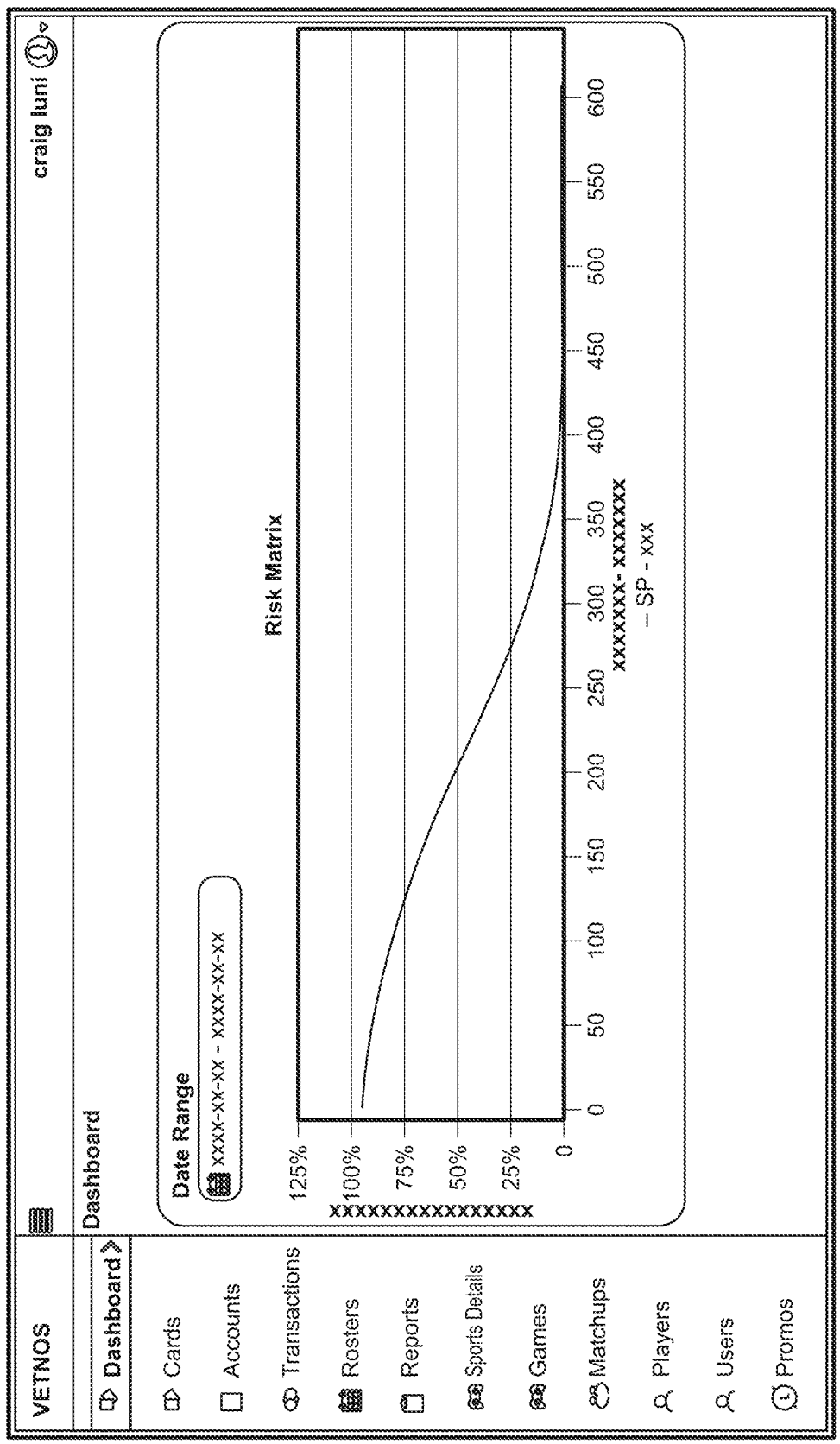

FIGS. 17A-17F are user interface screens used by an operator to configure matchups and over-unders for presentation to users, in accordance with an embodiment of the present invention. FIG. 17A is a user interface screen presenting to the operator the current sets of matchups and over-unders. The sets are configured as cards. FIG. 17B is a user interface screen presenting to the operator a form to configure a set (card) of matchups, over-unders, or mixed over-unders and matchups. FIG. 17C is a user interface screen presenting to the operator the current matchups, which may be included in a card. FIG. 17D is a user interface screen presenting to the operator players, together with the players' information, available for use in a matchup or over-under. FIG. 17E is a user interface screen presenting to the operator games, together with the games' information for use in configuring matchups or over-unders. User interface screens similar to FIGS. 17D and 17E are also provided for teams, leagues, and sports. User interface screens are also provided for other types of events besides sports. FIG. 17F is a user interface screen presenting to the operator a graph of the risk inventory associated with a set of game components, such as a particular matchup, a particular over-under, a set of matchups, a set of over-unders, or a mixed set of matchups and over-unders.

Figure 22:
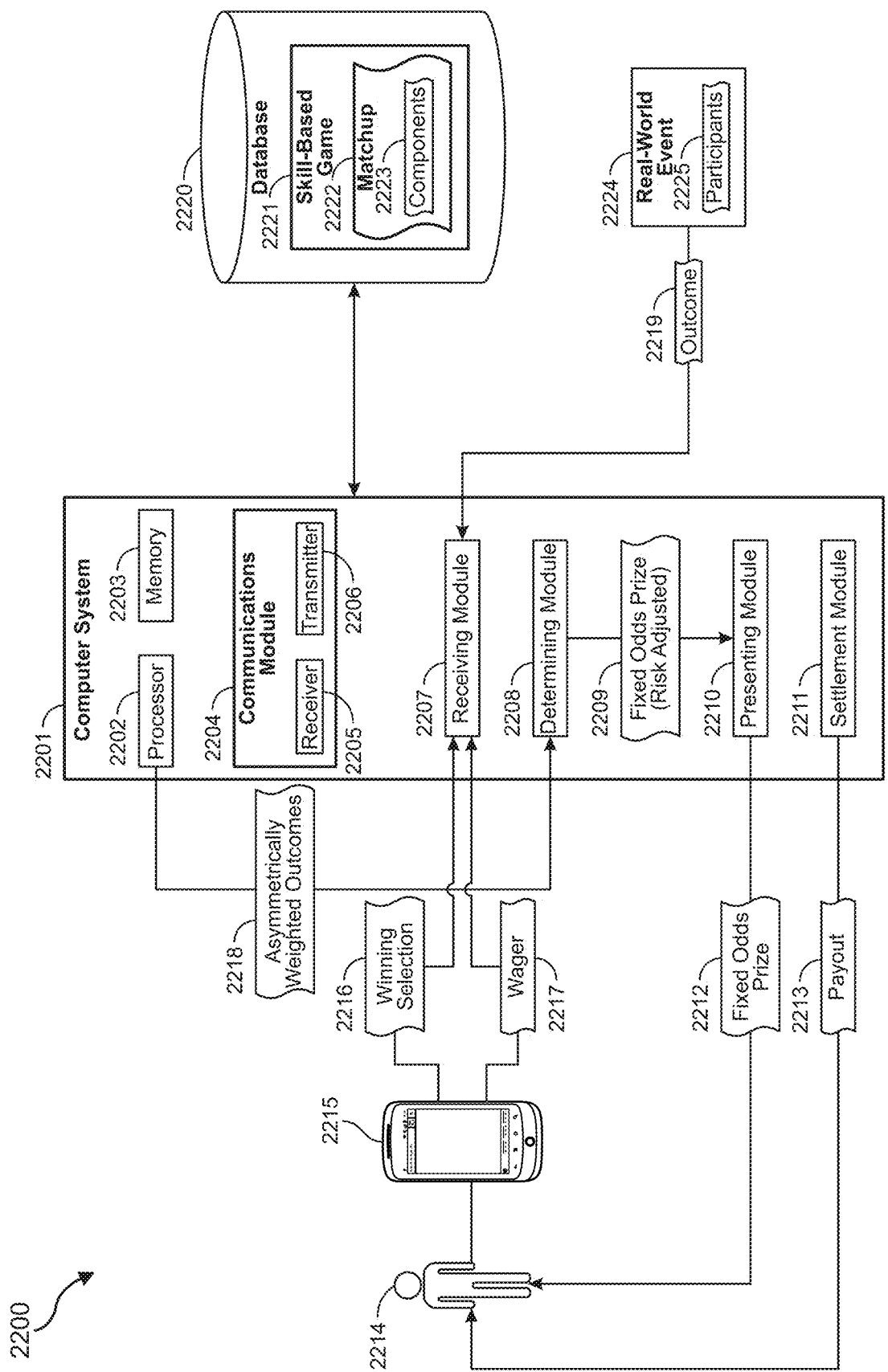
FIG. 22 shows an example computer architecture in which the embodiments described herein may operate.

Turning now to FIG. 22, a computing environment 2200 is provided in which various embodiments may be carried out, including generating and implementing asymmetrical outcomes and asymmetrical prizing in skill-based or chance-based games. The computing environment 2200 may include various electronic components and elements, including a computer system 2201 that is used, either alone or in combination with other computer systems, to perform associated tasks. The computer system 2201 may be substantially any type of computer system including a local computer system or a distributed (e.g., cloud) computer system. The computer system 2201 may include at least one processor 2202 and at least some system memory 2203. The computer system 2201 may include program modules for performing a variety of different functions. The program modules may be hardware-based, software-based, or may include a combination of hardware and software. Each program module may use computing hardware and/or software to perform specified functions, including those described herein below.

In some cases, the communications module 2204 may be configured to communicate with other computer systems. The communications module 2204 may include substantially any wired or wireless communication means that can receive and/or transmit data to or from other computer systems. These communication means may include, for example, hardware radios such as a hardware-based receiver 2205, a hardware-based transmitter 2206, or a combined hardware-based transceiver capable of both receiving and transmitting data. The radios may be WIFI radios, cellular radios, Bluetooth radios, global positioning system (GPS) radios, or other types of radios. The communications module 2204 may be configured to interact with databases, mobile computing devices (such as mobile phones or tablets), embedded computing systems, or other types of computing systems.

The computer system 2201 may further include a receiving module 2207. The receiving module 2207 may be configured to receive data from users (e.g., user 2214), computer systems, databases (e.g., database 2220), or from real-world events (e.g., 2224) or systems that report on real-world events. The receiving module 2207 may receive, for example, a winning selection 2216 from user 2214. The user 2214 may use their smartphone or other electronic device (e.g., laptop, PC, tablet, mobile device 2215, etc.) to select a component 2223 of a matchup 2222 that they believe will be winning within a skill-based or chance-based game 2221.

As noted above, the systems herein may generate many different matchups (e.g., 2222). Indeed, each real-world event 2224 may have multiple matchups associated therewith. The systems herein may implement a matchup generating module, as described above, to generate matchups for skill-based and/or chance-based games. Skill-based games, for instance, may involve a user selecting which of two components 2223 in a matchup 2222 is going to occur in an associated real-world event 2224. Chance-based games may involve selections or may simply involve a user selecting when an event, such as a bingo draw, occurs. Bingo draws may form the backbone of many different types of Class II, chance-based games. Some or all of these chance-based games may be based on bingo or may have a bingo-based algorithm that provides some or all of the random elements of the chance-based game.

Accordingly, each matchup 2222 may include multiple components 2223 whose outcomes are likely to occur according to a determined likelihood of occurrence. In some cases, the determined likelihood of occurrence for the outcomes of the different components 2223 is assigned by the computer system 2201. This assigned likelihood of occurrence may be asymmetrical. As the term is used herein, "asymmetrical" may refer to likelihoods of occurrence, likelihood of final outcomes, likelihood of winning prizes, or other likelihoods that are not equally likely to occur (e.g., 60/40). In some cases, the asymmetry may apply to games and may be executed by a game platform. The game platform may receive wagers for a particular game or entries into a game. The game platform may dictate that the chances of a component in a matchup being a winning component are more or less than 50%. A corresponding prizing platform may then determine that a reduced, risk-adjusted prize may be proffered as a prize for the asymmetric game.

In such cases, the chances of the component (e.g., 2223) in a matchup (e.g., 2222) being a winning component are out of symmetry with each other (e.g., 49/51, 48/52, 44/56, 60/40, 75/25, or some other set of asymmetrical percentages). In some embodiments, the percentages may add up to 100%, while in other cases, as will be explained further below, the percentages of the components 2223 in a matchup 2222 may add up to less than 100%. In one specific example, the processor 2202 or the game platform may determine that the likelihood of one component occurring is 54%, while the likelihood of a second component occurring in the matchup is 46%. These asymmetrically weighted outcomes 2218 may then be used by the prizing platform when determining a fixed odds prize 2209 that has been adjusted for the risk to the house of having one component that has a higher likelihood of occurring.

The receiving module 2207 of computer system 2201 may further receive real-world outcomes 2219 of real-world events 2224. As noted above, the real-world events each have participants 2225 (e.g., basketball players, baseball players, football players, golf players, racecar drivers, or other event participants). These participants 2225 may take actions in the real-world event 2224 that lead to specific outcomes 2219. These outcomes 2219 are received by the receiving module 2207 and may be used, along with the user's winning selections 2216 and wagers 2217 to determine whether the user 2214 won the matchup 2222 by selecting the winning component. And, if the user won, the computer system 2201 or the prizing platform may determine which prize should be awarded. Indeed, the determining module 2208 of computer system 2201 may be configured to generate a fixed odds prize 2209 that has been risk adjusted according to the asymmetrical weighting assigned to the outcomes 2218.

For instance, in some past systems, a skill-based or chance-based game may allow user to identify two components that are generally equally likely to occur (50/50 odds). In such cases, a fixed odds prize may reflect the 50/50 odds. In contrast, in the embodiments herein, one of the outcomes may be more likely to occur (e.g., 59%) than another outcome (e.g., 41%). As such, even though the user may not be aware that one component is more likely to occur (although in some cases, the user may be made aware), the chances of one component being the winning component may be greater than the other component 2223. And, if enough users select the component that is more likely to occur, the house or other entity backing the wager may be at a (potentially significant) disadvantage.

To counter this disadvantage when implementing matchup components with assigned, asymmetrical odds, the game platform may adjust the amount of the fixed odds prize downward to reflect the risk involved that more players will select the higher-likelihood component. In some cases, a player may be made aware that at least one of the components in a matchup is more likely to occur. This information may be presented alongside a fixed odds prize. This may entice the player to try to select which of the components is the component that is more likely to occur. The risk-adjusted prize may take into account this asymmetry and may reduce the amount of the prize accordingly. This may ensure that the provider of the skill-based game 2221 or the provider of a chance-based game can continue to provide the game over a long time frame.

The fixed odds prize 2212 may be determined before the user 2214 enters their wager 2217 in a skill-based game (or enters their entry into a chance-based game) and, thus, may be presented (by the presenting module 2210) to the player 2214 before the player makes their wager or provides their game entry. If the player or user 2214 correctly selects the winning component, the settlement module 2211 will trigger a payout 2213 to the user or to an account associated with the user according to the amount indicated in the risk adjusted fixed odds prize 2212. The asymmetric game platform and asymmetric prizing platforms may create asymmetric game play and calculate asymmetric prizes that are not related to spread, are not related to fees, or auction-based products such as bid ask on spread. Instead, the embodiments herein provide a game platform and prize platform that create matchups with intentionally asymmetrical odds of occurrence. The prizing platform then determines an appropriate, risk-adjusted prize amount that is based on the amount of risk that ensues by providing matchup components that are more (or less) likely to occur within the game. These embodiments will each be described further below with regard to Method 2300 of FIG. 23 and with regard to FIGS. 22 and 24-26B.

FIG. 23 is a flow diagram of an exemplary computer-implemented method 2300 for providing asymmetric outcomes or prizing within a skill-based game or a chance-based game. The steps shown in FIG. 23 may be performed by any suitable computer-executable code and/or computing system, including the systems illustrated in FIG. 23. In one example, each of the steps shown in FIG. 23 may represent an algorithm whose structure includes and/or is represented by multiple sub-steps, examples of which will be provided in greater detail below.

At step 2310, method 2300 includes receiving, by at least one processor 2202, in real-time from at least one user computing device (e.g., 2215) associated with at least one user 2214 within a plurality of users, at least one selected winning component 2216 for at least one matchup 2222 in a skill-based game 2221 or in a chance-based game. Each matchup 2222 within the skill- or chance-based game may include at least two components 2223 associated with at least one participant 2225 within a plurality of participants in at least one real-world event 2224. These two components 2223 are selected by the at least one processor 22202 to produce outcomes 2218 that are asymmetrically weighted within the skill-based or chance-based game.

As noted above, users may implement the systems herein to place wagers on real-world events or portions of real-world events or may create entries in a game of chance (e.g., bingo). For instance, users may bet not only on the final outcome of a game, race, or match, but may also bet on subevents within the real-world event 2224 (e.g., golf strokes within a match, basketball shots within a game, lap times within a race, football passes or handoffs within a game, or similar subevents). The processor 2202 may analyze the real-world event 2224 and/or its participants 2225 and create matchups with components 2223 that are equally likely to occur (e.g., 50/50 odds), or the processor 2202 may create matchups 2222 that have asymmetrically weighted outcomes 2218 for the two components 2223 (i.e., those two components 2223 are not equally likely to occur, but rather are intentionally unequally likely to occur).

For instance, in some cases, the processor 2202 may create matchups 2222 that have asymmetrically weighted outcomes 2218 for the two components 2223 (e.g., weighing or assigning those outcomes at 51/49, or 52/48, or 58/42, 60/40, 70/30, or some other intentionally asymmetrical likelihood of occurring). In such cases, the fixed odds prizes associated with selecting the winning component may be adjusted lower for the risk taken on by the house in providing at least one component that has a higher likelihood of winning. In such cases, the risk-adjusted prize 2209 associated with each matchup may still be equally likely to be paid out, even though the gameplay (i.e., the choice between components with asymmetrically weighted outcomes 2218 as generated by the game platform) is asymmetric.

Method 2300 next includes, at step 2320, determining, by the processor 2202, based on at least one outcome 2219 of the at least one real-world event 2224, that the predicted winning component 2216 is a winning component in the skill-based game 2221 or within a chance-based game. This determination that the predicted winning component 2216 is the winning component in the skill-based or chance-based game is based solely upon the user's selections and not on the selections of other users that are playing the skill-based or chance-based game. In this sense, the embodiments herein are not parimutuel. The amount of the risk adjusted fixed odds prize 2212 does not depend on how many other players place wagers, does not depend on the amount of the other players' wagers, and does not depend on how many other players made winning selections. Rather, the fixed odds prizes (e.g., 2212) are generated before the user 2214 makes his or her wager 2217 or provides his or her entry into the game and are fixed in amount by the prizing platform, meaning that the prize amount will not change regardless of what bets other players make or don't make.

Method 2300, at step 2330, further includes determining, by the processor 2202, a fixed odds prize 2209 that is risk adjusted according to the asymmetrically weighted outcomes 2218 of the at least two components 2223 in a matchup 2222 of the skill-based or chance-based game 2221. The risk adjusted fixed odds prize 22209 may be presented to the user 2214 prior to receiving a wager 2217 or may receive an entry for a chance-based game from the user. The determining module 2208 of computer system 2201 may determine, based on the asymmetrical weighted outcomes 2218, a fixed odds prize 2209 that is adjusted for risk based on the disparity between the two components 2223.

Indeed, as noted above, the two components 2223 may have probabilities assigned by the game platform that are not symmetrical with each other. Thus, if two components of a matchup 2222 are assigned probabilities of 55/45, the determining module 2208 may determine, based on the disparate probabilities of occurring, a prize that has been adjusted for the risk to the house in providing one component with a 55% likelihood of occurring and component with a 45% likelihood of occurring. The amount of the fixed odds prize 2209 will be adjusted lower to account for the increased risk of more users selecting the component that is determined to be more likely to occur (55% in this case).

In some cases, the amount by which the fixed odds prize is reduced may be reduced based on the degree of asymmetry. Thus, an asymmetry of 51/49 may result in a very slight reduction in the amount of the fixed odds prize, while a 54/46 asymmetry may result in a greater reduction in amount, a 60/40 asymmetry a still greater reduction in prize amount, and so on. Accordingly, in such cases, the greater the asymmetry, the greater the amount that the prize is reduced. In other cases, the amount of reduction in the prize may be nonlinear or may be subject to a specified scale. In this manner, the user 2214 may have the benefit of being able (i.e., may have the option) to choose a higher likelihood selection (even though they don't know which selection is higher likelihood), but the prize will be adjusted down from a 50/50 high amount to a risk adjusted, lower amount that includes at least one matchup component that is easier to win.

After the fixed odds prize 2209 has been determined by the prizing platform, method 2300 includes, at step 2340, automatically triggering, by the at least one processor, in real-time, a settlement process to execute the fixed odds prize to the user 2214 based at least in part on the winning component. The settlement module 2211 of computer system 2201 may receive the fixed odds prize 2212 and may provide the amount of the prize in the form of a payout 2213. The user 2214 may be notified of the fixed odds prize 2212 via their mobile device 2215 or via another computing system. The settlement module 2211 may communicate with banks, credit card companies, or other financial entities to transfer the payout 2213 to an account associated with the user 2214. This money may then be withdrawn, held, or used in future wagers 2217 or used for future entries into a chance-based game.

As noted above, the fixed odds prize 2209, which may have been adjusted for the higher risk involved in presenting at least one option that has higher odds of winning, is fixed in advance, before the user 2214 provides their wager 2217. As such, the fixed odds prize 2209 does not vary based on the number of other users within the skill-based or chance-based game 2221 that correctly selected the winning component 2223. The fixed odds prize presented to the user 2214 at the time of the wager is independent of any other players of the skill-based or chance-based game 2221. Moreover, the fixed odds prize is not determined based on the amount of fees paid by the other users within the skill-based or chance-based game. Regardless of whether other users are making wagers, the user 2214 is presented with a fixed prize that does not depend on what other users are wagering or how many other users are placing wagers. Moreover, the fixed odds prize is determined before the user's wager is made and is not made after determining the size of the betting pool, as occurs in a parimutuel system.

In at least some embodiments herein, the asymmetrically weighted outcomes assign higher odds to one of the at least two components of the matchup and assign lower odds to one of the at least two components of the matchup. In some cases, these higher or lower odds are specifically selected values. For instance, the house or backer of the skill-based game 2221 (or the backer of a chance-based game) may intentionally select 55/45, or 52/48, or 60/40, or 67/33 odds, or some other specified set of odds. The odds may be assigned to the various matchups in the skill-based or chance-based game and prizes may be risk adjusted downward accordingly. The asymmetric gameplay odds and asymmetric prizing, as noted above, are not related to spread amount, bid ask on spread (or other auction-based products), fees, or other related items. Rather, in contrast, the game platform and prizing platform determine asymmetric gameplay odds in advance, determine asymmetric prizes in advance, and present matchups having risk-adjusted prizes based on the risk of proffering matchups with higher or lower chances of occurring.

For instance, in chart 2400 of FIG. 24, the computer system 2201 of FIG. 22 has assigned asymmetrically weighted outcomes 2404 to different matchups. In this example, matchup 1 (2401) has two components: component A (2402) with an assigned 51% likelihood of occurring, and component B (2403) with an assigned 49% likelihood of occurring. Similarly, in matchup 2, component A has an assigned 52% likelihood of occurring, while component B has an assigned 48% likelihood of occurring. In matchup 3, component A has an assigned 58% likelihood of occurring, while component B has an assigned 42% likelihood of occurring. It will be understood that these example odds are chosen arbitrarily, and that substantially any values may be selected (e.g., 99.999%/0.001%, etc.).

In each case, the risk adjusted fixed odds prize 2209 may be adjusted to account for the asymmetry in the weighted outcomes. In cases where one component is more likely to occur (or is much more likely to occur), the risk to the house may be greater that players will correctly select the component that is more likely to occur in the real-world event 2224. Accordingly, the amount of the fixed odds prize 2209 may be reduced to account for this risk. In some cases, the players of the game may be made aware that the odds are uneven and that one of the components is more likely to occur (without specifying which component in the matchup). This may entice players to make greater efforts to determine which is the component that is more likely to occur and, potentially, to place larger or more frequent wagers.

In some cases, as noted above, the asymmetry in a pair of matchups may be rendered to have different probabilities. In some cases, this asymmetry may become more symmetric. For example, the asymmetric gaming platform may provide a tool that allows game providers or game managers to set the probability for one matchup at 60%, for example, and 40% for the other matchup. The asymmetric prizing platform may initially establish a fixed-amount prize for this matchup that is reduced according to the risk presented to the house or to backer of the game. In some cases, however, the prizing, which was initially asymmetric, may become more symmetric in probability, prize amount, or dollar value wagered.

For example, the game provided by the asymmetric gaming platform may include a variance in asymmetric outcomes in the gameplay. Once the player has covered the differential amount, the outcomes may effectively become 50/50 (instead of 60/40). That is to say, with gaming platform tools that support liquidity risk management, these tools can be used to adjust the prizes to more symmetric outcomes or to less symmetric outcomes, as desired. Then, over time, if a game has, for example, 2,000 entries, later entries in the game may have more symmetric outcomes as the symmetry varies over time.

Players may then be able to pick more symmetric outcomes or less symmetric outcomes as part of the gameplay. Notably, as mentioned above, such a change in symmetry is not representative of a differential, since the odds are fixed. But, as the game progresses over time, asymmetric prizing and gameplay may become more symmetric. If, for example, a user was to pay additional money to buy in to the game or buy out of the game at a later time, the odds may be changed just before the time of buy in or buy out to be more or less symmetric. This may, in effect, move the asymmetric gaming platform and associated tools from risk intermediation to risk information production (i.e., providing risk information for a game and/or prizing). This may also allow for player preference on risk distribution or preference on gameplay or prizing customization. Indeed, using such tools may allow players to choose more or less symmetry in their selected game or in the associated prizes.

In some embodiments, the methods described herein may use machine learning to perform one or more of the operations involved in the gameplay of a skill- or chance-based game. At least in some cases, machine learning may be implemented as a tool for producing asymmetric gameplay with (or without) asymmetric prizes. This machine learning tool may be provided on a platform basis, so as to be usable by a plurality of different games and game types. In some embodiments, the machine learning tool may use specific measurements and/or parametric conditions that combine to form receiver operator conditions. These receiver operator conditions may have at least a minimum level of validation.

For example, in a scenario where the gaming system is highly confident that the odds are 60/40 or 57/62 (or some other asymmetric ratio), the ratio of true false positives (i.e., the receiver operator conditions) is designed to be above random. As such, the assigned odds of winning may be modulated from an intrinsic value of 2:1, or 4:1, or 8:1, to a new value that is modified based on its asymmetric nature (e.g., 1.3:1, 3:1, 10:1, etc.). The assigned odds may increase asymmetrically, adding to the resulting asymmetric payout.

Additionally or alternatively, the machine learning tool may use statistical measurements (e.g., true positive rate, true negative rate, false positive rate, etc.) to create a gaming environment in which receiver operator conditions are above random (i.e., 0.5). Gaming platforms that use this machine learning tool, and the skill- and chance-based games that are played on this gaming platform may provide outcomes that are generally equally likely to occur (e.g., 50/50 odds). This is due to the machine learning calculations indicating, at a high confidence level, that the specified outcomes will occur 60% of the time, 40% of the time, etc. Such computations are performed dynamically, on the fly, and can be used by the gaming platform to control both the production of the asymmetrical game and the asymmetry of the prizing according to fixed odds, progressive fixed odds, variable fixed odds, or variable progressive fixed odds.

Chart 2500 of FIG. 25 illustrates an embodiment in which the asymmetrically weighted outcomes 2504 assign less than total odds to the components of the matchup. As such, the total odds in those matchups add up to less than 100%. For example, in matchup 1 (2501), component A (2502) has an asymmetrically weighted outcome of 49%, while component B (2503) has an asymmetrically weighted outcome of 43%. In matchup 2, component A has an asymmetrically weighted outcome of 46%, while component B has an asymmetrically weighted outcome of 49%, and in matchup 3, component A has an asymmetrically weighted outcome of 45%, while component B also has an asymmetrically weighted outcome of 45%. As can be seen, in each of these matchups, the total odds add up to less than 100%. This may be done intentionally to allow for variability or to manage (e.g., decrease) the overall risk to the house or backer of the game. In such cases, the amount of the fixed odds prize may be adjusted accordingly for risk. As such, for example, the decreased risk may lead to higher amounts in the fixed odds prize.

Regardless of how the outcomes are weighted, the embodiments herein may be implemented with substantially any type of skill-based game or chance-based wagering game. Such games may include, but are not limited to, spinner games, risk-ranking products, daily fantasy sports (DFS) games, 3D matching games, or even to parimutuel games. In each game, the fixed odds prize may be determined dynamically for each matchup in real time. Thus, as various real-world events are taking place in real time, the fixed odds prizes may be determined as the real-world events occur. Each fixed odds prize may thus be determined at a fixed point in time and may change for subsequent users (even users that play the game a few seconds later). The systems herein may continually take risk into consideration and may dynamically adjust for risk in real time. As such, different users, even those betting on the same components but doing it at (slightly) different times may be presented with different fixed odds prizes that have been dynamically adjusted for risk up to the moment the prize is calculated and presented to the user.

At least in some embodiments, the determined fixed odds prize 2209 may represent a prediction of the value of each matchup component. The value of the components 2223 may indicate the value of each of the components to the potential players of the game. This value is then, in turn, used to determine the amount of the fixed odds prize. In some cases, the amount of the fixed odds prize may be increased or decreased to better reflect the perceived or determined value of the matchup components 2223.

As shown in FIG. 26A, at least in some cases, a single matchup that implements asymmetric prizes 2601 may have component A, with its associated fixed odds prize A, and component B, with its associated fixed odds prize B (which is different than prize A). This allows for scenarios (as shown in FIG. 26B), in which these asymmetric prizes 2602 may include a matchup with component A (49% odds) having a fixed odds prize of $100, and a component B (46% odds) having a fixed odds prize of $120.

In some cases, the embodiments herein may be implemented in chance-based games. In at least some chance-based games, the odds of each of the matchup components occurring would be 50/50 (i.e., each of the matchup components would be equally probable to occur). In at least some of the embodiments herein, the odds of the matchup components 2223 may be asymmetrical and unequally probable to occur. In such cases, each component in the matchup may include its own risk-adjusted fixed odds prize or set of prizes. In cases where the component includes a set of two fixed odds prizes, each of those prizes may be substantially equally probable to occur. Thus, even though the gaming may include asymmetrical components (i.e., components that are asymmetrically likely to occur), the prizing may include prize amounts that are adjusted to achieve the same amount for a prize that would be awarded in a matchup that included 50/50 odds of occurring.

Accordingly, the asymmetrically weighted outcomes of the components 2223 and the separate prizes for each component in the matchup that are substantially equally likely to occur (i.e., 50/50 odds) may provide a substantially equal probability of receiving a specified prize value. This prize value, despite being used in a game with asymmetrical odds, may be equal in amount to prizes that are awarded for matchups with truly 50/50 components. Thus, even in games that implement asymmetrically weighted outcomes, higher-amount or lower-amount prizes may be randomly selected on a 50/50 basis. This randomness in prizing may offset the variability in the asymmetrically weighted outcomes. Thus, in such cases, even if the user correctly selects the outcome that is more likely to occur, that user is still subject to the randomness of the prize draw, in which a higher- or lower-amount prize may be drawn to adjust for or to offset the risk to the house. In this manner, gaming establishments may offer asymmetrical odds on games and offer randomly chosen, asymmetric prizing to offset the asymmetrical odds. In this manner, prizing may be adjusted to achieve net 50/50 odds, even in asymmetrical odds situations.

In addition to the method described above, a corresponding system may also be provided. The system may include at least one physical processor and physical memory comprising computer-executable instructions that, when executed by the physical processor, cause the physical processor to: receive, by the at least one processor, in real-time from at least one user computing device associated with at least one user within a plurality of users, at least one selected winning component for at least one matchup in a skill-based game, wherein each matchup within the skill-based game comprises at least two components associated with at least one participant within a plurality of participants in at least one real-world event, wherein the at least two components of each matchup are selected by the at least one processor to produce outcomes that are asymmetrically weighted within the skill-based game, determine, by the at least one processor, based at least in part on at least one outcome of the at least one real-world event, that the at least one predicted winning component is a winning component in the skill-based game, wherein the determination that the at least one predicted winning component is the winning component in the skill-based game is based solely upon the at least one user's selections and not on the selections of other users, determine, by the at least one processor, a fixed odds prize that is risk adjusted according to the asymmetrically weighted outcomes of the at least two components of the skill-based game, the risk adjusted fixed odds prize being presented to the user prior to receiving a wager from the user, and automatically trigger, by the at least one processor, in real-time, a settlement process to execute the fixed odds prize to the at least one user based at least in part on the winning component.

Still further, a corresponding non-transitory computer-readable medium may also be provided. The non-transitory computer-readable medium may include that includes one or more computer-executable instructions that, when executed by at least one processor of a computing device, cause the computing device to: receive, by the at least one processor, in real-time from at least one user computing device associated with at least one user within a plurality of users, at least one selected winning component for at least one matchup in a skill-based game, wherein each matchup within the skill-based game comprises at least two components associated with at least one participant within a plurality of participants in at least one real-world event, wherein the at least two components of each matchup are selected by the at least one processor to produce outcomes that are asymmetrically weighted within the skill-based game, determine, by the at least one processor, based at least in part on at least one outcome of the at least one real-world event, that the at least one predicted winning component is a winning component in the skill-based game, wherein the determination that the at least one predicted winning component is the winning component in the skill-based game is based solely upon the at least one user's selections and not on the selections of other users, determine, by the at least one processor, a fixed odds prize that is risk adjusted according to the asymmetrically weighted outcomes of the at least two components of the skill-based game, the risk adjusted fixed odds prize being presented to the user prior to receiving a wager from the user, and automatically trigger, by the at least one processor, in real-time, a settlement process to execute the fixed odds prize to the at least one user based at least in part on the winning component.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method comprising:
receiving, by at least one processor, in real-time from at least one user computing device associated with at least one user within a plurality of users, at least one selected component for at least one matchup in a skill-based, advanced choice game that is based on asymmetric payouts,
wherein each matchup within the skill-based game comprises at least two components including a first component associated with at least one athlete participant in a first real-world sporting event and a second component associated with at least one athlete participant in a second, different real-world sporting event involving a second, different sport,
wherein the at least two components of each matchup are selected by the at least one processor to produce outcomes that are asymmetrically weighted within the skill-based game, and
wherein selection of the at least two components for each matchup includes identifying and evaluating a plurality of different real-world, real-time sporting events that are simultaneously occurring in different venues performed by different athlete participants, including at least the first real-world sporting event and the second, different sporting event involving the second, different sport;
determining, by the at least one processor, based at least in part on at least one outcome of the at least one real-world event, that the at least one selected component is a winning component in the skill-based game, wherein the determination that the at least one selected component is the winning component in the skill-based game is based upon the at least one user's selections and not on the selections of other users;
determining, by the at least one processor, a fixed odds prize that is risk adjusted according to the asymmetrically weighted outcomes of the at least two components of the skill-based game, the risk adjusted fixed odds prize being presented as a value to the user, without presentation of odds values associated with the asymmetrically weighted outcomes that show the extent of the asymmetry, prior to receiving a wager from the user, wherein the fixed odds prize is reduced in value based on a likelihood that an increased number of users will select, from among the asymmetrically weighted outcomes, an asymmetrical outcome that is more likely to occur; and
automatically triggering, by the at least one processor, in real-time, a settlement process to execute the fixed odds prize to the at least one user based at least in part on the winning component.

2. The computer-implemented method of claim 1, wherein the fixed odds prize is fixed in advance before receiving the wager such that the fixed odds prize does not vary based on a number of other users within the skill-based game that correctly predict the winning component and is not determined based on an amount of fees paid by the other users within the skill-based game.

3. The computer-implemented method of claim 1, wherein the asymmetrically weighted outcomes assign higher odds to one of the at least two components of the matchup and assign lower odds to one of the at least two components of the matchup.

4. The computer-implemented method of claim 1, wherein the asymmetrically weighted outcomes assign less than total odds to the at least two components of the matchup, such that the less than total odds add up to less than 100%.

5. The computer-implemented method of claim 1, wherein the skill-based game comprises at least one of: a spinner game, a risk-ranking product, a daily fantasy sports (DFS) game, or a 3D matching game.

6. The computer-implemented method of claim 1, wherein the fixed odds prize is dynamically determined for each matchup in real time.

7. The computer-implemented method of claim 6, wherein the dynamically determined fixed odds prizes are adjusted for risk in real time, such that other users receive different fixed odds prizes.

8. The computer-implemented method of claim 7, wherein the determined fixed odds prize represents a prediction of a value of each matchup component.

9. The computer-implemented method of claim 1, wherein the fixed odds prize is determined prior to receiving wagers from at least one other user.

10. The computer-implemented method of claim 1, wherein the fixed odds prize that has been risk-adjusted includes a fixed odds prize for each component in the matchup.

11. The computer-implemented method of claim 10, wherein the asymmetrically weighted outcomes of the at least two components and the prizes for each component in the matchup provide an asymmetrical probability of receiving a specified prize value.

12. A system comprising:
at least one physical processor; and
physical memory comprising computer-executable instructions that, when executed by the physical processor, cause the physical processor to:
receive, by at least one processor, in real-time from at least one user computing device associated with at least one user within a plurality of users, at least one selected component for at least one matchup in a skill-based, advanced choice game that is based on asymmetric payouts,
wherein each matchup within the skill-based game comprises at least two components including a first component associated with at least one athlete participant in a first real-world sporting event and a second component associated with at least one athlete participant in a second, different real-world sporting event involving a second, different sport,
wherein the at least two components of each matchup are selected by the at least one processor to produce outcomes that are asymmetrically weighted within the skill-based game, and
wherein selection of the at least two components for each matchup includes identifying and evaluating a plurality of different real-world, real-time sporting events that are simultaneously occurring in different venues performed by different athlete participants, including at least the first real-world sporting event and the second, different sporting event involving the second, different sport;
determine, by the at least one processor, based at least in part on at least one outcome of the at least one real-world event, that the at least one selected component is a winning component in the skill-based game, wherein the determination that the at least one selected winning component is the component in the skill-based game is based upon the at least one user's selections and not on the selections of other users;
determine, by the at least one processor, a fixed odds prize that is risk adjusted according to the asymmetrically weighted outcomes of the at least two components of the skill-based game, the risk adjusted fixed odds prize being presented as a value to the user, without presentation of odds values associated with the asymmetrically weighted outcomes that show the extent of the asymmetry, prior to receiving a wager from the user, wherein the fixed odds prize is reduced in value based on a likelihood that an increased number of users will select, from among the asymmetrically weighted outcomes, an asymmetrical outcome that is more likely to occur; and
automatically trigger, by the at least one processor, in real-time, a settlement process to execute the fixed odds prize to the at least one user based at least in part on the winning component.

13. The system of claim 12, wherein the fixed odds prize is fixed in advance such that the fixed odds prize does not vary based on a number of other users within the skill-based game that correctly predict the winning component and is not determined based on an amount of fees paid by the other users within the skill-based game.

14. The system of claim 12, wherein the asymmetrically weighted outcomes assign higher odds to one of the at least two components of the matchup and assign lower odds to one of the at least two components of the matchup.

15. The system of claim 12, wherein the asymmetrically weighted outcomes assign less than total odds to the at least two components of the matchup, such that the less than total odds add up to less than 100%.

16. The system of claim 12, wherein each component of the matchup is associated with a different fixed odds prize.

17. The system of claim 16, wherein the different fixed odds prizes are asymmetrically weighted, such that each fixed odds prize includes a different amount that is based on the asymmetrical weighting.

18. The system of claim 12, wherein the fixed odds prize that has been risk-adjusted includes a fixed odds prize for each component in the matchup.

19. The system of claim 12, wherein determining the fixed odds prize that is risk adjusted according to the asymmetrically weighted outcomes of the at least two components of the skill-based game is performed using an automated method selected from the group consisting of artificial intelligence, machine learning, computer implemented algorithmic data analysis, and combinations thereof.

20. A non-transitory computer-readable medium comprising one or more computer-executable instructions that, when executed by at least one processor of a computing device, cause the computing device to:
receive, by at least one processor, in real-time from at least one user computing device associated with at least one user within a plurality of users, at least one selected winning component for at least one matchup in a skill-based, advanced choice game that is based on asymmetric payouts,
wherein each matchup within the skill-based game comprises at least two components including a first component associated with at least one athlete participant in a first real-world sporting event and a second component associated with at least one athlete participant in a second, different real-world sporting event involving a second, different sport,
wherein the at least two components of each matchup are selected by the at least one processor to produce outcomes that are asymmetrically weighted within the skill-based game, and
wherein selection of the at least two components for each matchup includes identifying and evaluating a plurality of different real-world, real-time sporting events that are simultaneously occurring in different venues performed by different athlete participants, including at least the first real-world sporting event and the second, different sporting event involving the second, different sport;

determine, by the at least one processor, based at least in part on at least one outcome of the at least one real-world event, that the at least one selected component is a component in the skill-based game, wherein the determination that the at least one selected winning component is the winning component in the skill-based game is based upon the at least one user's selections and not on the selections of other users;

determine, by the at least one processor, a fixed odds prize that is risk adjusted according to the asymmetrically weighted outcomes of the at least two components of the skill-based game, the risk adjusted fixed odds prize being presented as a value to the user, without presentation of odds values associated with the asymmetrically weighted outcomes that show the extent of the asymmetry, prior to receiving a wager from the user, wherein the fixed odds prize is reduced in value based on a likelihood that an increased number of users will select, from among the asymmetrically weighted outcomes, an asymmetrical outcome that is more likely to occur; and automatically trigger, by the at least one processor, in real-time, a settlement process to execute the fixed odds prize to the at least one user based at least in part on the winning component.

* * * * *